(12) United States Patent
Montana et al.

(10) Patent No.: US 11,451,033 B2
(45) Date of Patent: Sep. 20, 2022

(54) MODULAR WALL-MOUNTED ELECTRICAL CIRCUIT DEVICE SYSTEM

(71) Applicant: SWICH TECHNOLOGIES LLC, Cary, NC (US)

(72) Inventors: Christopher Montana, Cary, NC (US); Thomas Kucmierz, Cary, NC (US)

(73) Assignee: SWICH TECHNOLOGIES LLC, Cary, NC (US)

( * ) Notice: Subject to any disclaimer, the term of this patent is extended or adjusted under 35 U.S.C. 154(b) by 330 days.

(21) Appl. No.: 16/795,797

(22) Filed: Feb. 20, 2020

(65) Prior Publication Data

US 2020/0266618 A1 Aug. 20, 2020

Related U.S. Application Data

(60) Provisional application No. 62/807,896, filed on Feb. 20, 2019.

(51) Int. Cl.
*H02G 3/16* (2006.01)
*H02G 3/12* (2006.01)
(Continued)

(52) U.S. Cl.
CPC ............ *H02G 3/16* (2013.01); *H01R 13/627* (2013.01); *H01R 25/006* (2013.01);
(Continued)

(58) Field of Classification Search
None
See application file for complete search history.

(56) References Cited

U.S. PATENT DOCUMENTS 2,397,688 A 4/1946 Osinski
2,433,917 A 1/1948 McCartney
(Continued)

FOREIGN PATENT DOCUMENTS

CN 109983634 A * 7/2019 ............ H01H 71/04
WO WO-0219472 A1 * 3/2002 ............ C09K 21/00
(Continued)

OTHER PUBLICATIONS

"International Search Report" and "Written Opinion of the International Search Authority" (ISA/US) in Swich Technologies LLC, International Patent Application Serial No. PCT/US2020/018937, dated Jul. 23 2020 (21 pages).

*Primary Examiner* — Timothy J. Dole
*Assistant Examiner* — Muhammed Azam
(74) *Attorney, Agent, or Firm* — Tillman Wright, PLLC; James D. Wright; David R. Higgins

(57) ABSTRACT

A modular wall-mounted electrical circuit device assembly includes an electrical junction box, a modular circuit device, and a cover plate. The junction box has an open front, and is wall-mounted with exposed ends of building wiring disposed therein. The modular circuit device includes a base unit and an interchangeable device module and is installed in the junction box via the open front. The base unit has a junction box liner defining a main cavity having an open front and a closed rear, exterior electrical connection points connected to the building wiring, electrical contacts disposed in the rear, and a first electrical interconnect assembly connecting the electrical contacts to the connection points. The interchangeable device module has a forward-facing circuit device, rearward-facing electrical contacts, and a second electrical interconnect assembly. The interchangeable device module is removably installed in the main (Continued)

cavity, via its open front, with the respective contacts plugged together.

15 Claims, 68 Drawing Sheets

(51) Int. Cl.
*H01R 13/627* (2006.01)
*H02G 3/08* (2006.01)
*H01R 25/00* (2006.01)
*H02G 3/14* (2006.01)

(52) U.S. Cl.
CPC ............... *H02G 3/083* (2013.01); *H02G 3/12* (2013.01); *H02G 3/14* (2013.01)

(56) References Cited

U.S. PATENT DOCUMENTS

| | | | |
|---|---|---|---|
| 2,908,743 A | 10/1959 | Premoshis | |
| 3,633,782 A * | 1/1972 | Bellinger | H02G 3/123 220/3.5 |
| 3,707,697 A | 12/1972 | Izumi | |
| 4,117,258 A | 9/1978 | Shanker | |
| 4,165,443 A * | 8/1979 | Figart | H02G 3/16 174/53 |
| 4,289,370 A * | 9/1981 | Storck | H02G 3/16 439/535 |
| 4,669,804 A * | 6/1987 | Munroe | H02G 3/18 439/565 |
| 5,445,539 A * | 8/1995 | Dale | H02G 3/083 174/53 |
| 6,147,304 A * | 11/2000 | Doherty | H02G 3/086 174/58 |
| 6,309,248 B1 | 10/2001 | King | |
| 6,423,900 B1 * | 7/2002 | Soules | H01R 24/78 |
| 6,644,986 B1 * | 11/2003 | Wilker, Sr. | H01R 25/006 439/106 |
| 6,939,179 B1 | 9/2005 | Kieffer, Jr. et al. | |
| 8,350,148 B1 * | 1/2013 | Shotey | H02G 3/123 439/535 |
| 9,750,835 B2 | 2/2017 | Newell et al. | |
| 9,793,697 B1 * | 10/2017 | Colao | H02G 3/16 |
| 9,859,696 B1 * | 1/2018 | Jack | H01R 25/006 |
| 10,170,878 B1 | 1/2019 | Reulman, Sr. | |
| 2002/0185296 A1 | 12/2002 | Schultz et al. | |
| 2005/0042916 A1 * | 2/2005 | Pyrros | H01R 31/06 439/539 |
| 2012/0068612 A1 * | 3/2012 | Ebeling | H01R 13/717 315/159 |
| 2012/0222896 A1 * | 9/2012 | Haberek | H02G 3/123 174/560 |
| 2012/0279746 A1 * | 11/2012 | Gagne | H02G 3/126 174/50.51 |
| 2012/0305282 A1 * | 12/2012 | Frazer | H02G 3/123 29/592.1 |
| 2013/0333940 A1 * | 12/2013 | Stencil | H02G 3/18 174/503 |
| 2015/0000972 A1 | 1/2015 | Mayer | |
| 2016/0141852 A1 * | 5/2016 | Gagne | H02G 3/14 174/54 |
| 2016/0219728 A1 * | 7/2016 | Balyan | H02B 1/00 |
| 2016/0226232 A1 * | 8/2016 | Gagne | H02G 3/123 |
| 2017/0070090 A1 * | 3/2017 | Miller | H01R 13/701 |
| 2017/0318691 A1 * | 11/2017 | Gates | H05K 5/0017 |
| 2017/0324195 A1 * | 11/2017 | Eriksen | H01R 24/78 |
| 2018/0358763 A1 * | 12/2018 | King | H01R 27/02 |

FOREIGN PATENT DOCUMENTS

| | | | |
|---|---|---|---|
| WO | WO-03100940 A2 * | 12/2003 | ......... H01H 11/0006 |
| WO | WO-2006074004 A2 * | 7/2006 | .......... H01R 13/745 |
| WO | WO-2017059546 A1 * | 4/2017 | ............ H01H 83/02 |
| WO | WO-2017172600 A1 * | 10/2017 | .............. G02B 6/38 |
| WO | 20200172349 A1 | 8/2020 | |
| WO | WO-2021056100 A1 * | 4/2021 | |

* cited by examiner

MODULAR WALL-MOUNTED ELECTRICAL CIRCUIT DEVICE SYSTEM

CROSS-REFERENCE TO RELATED APPLICATION

The present application is a U.S. nonprovisional patent application of, and claims priority under 35 U.S.C. § 119(e) to, U.S. provisional patent application Ser. No. 62/807,896 filed Feb. 20, 2019, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to outlets, switches, and other electrical circuit devices, and, more particularly, to a system of modular electrical circuit devices.

Background

For decades, conventional building wiring (such as the ubiquitous 120 volts AC in the U.S., 220 VAC in Europe, or the like) has involved little more than standard outlets (usually duplex receptacles) and light switches. Electrical wiring for residential installations employs generally static technology. While components vary across the United States, most jurisdictions allow the use of non-armored plastic cable, plastic junction boxes, and a limited number of common devices such as duplex outlets and single pole switches. Commercial construction often uses individual conductors pulled through conduit and metal junction boxes, and some jurisdictions require the same for residential construction. Regardless of the type of wiring infrastructure, the same types of devices are generally employed, and these circuit devices are rarely replaced for reasons other than device failures, upgrades made to meet modern electrical codes, and style changes.

However, that has begun to change in recent years, as smart devices, modern charging needs, and the like have encouraged homeowners and other users to replace circuit devices more frequently. For example, the rapid increase in the number of consumer devices, such as cell phones, tablets, laptop computers, smart speakers, and the like, has resulted in a growing need for charging devices for such consumer devices. In recent years, there has been a tendency for such charging devices to use a USB (type A) physical port as the standard default charging interface. As the number of devices in a household or commercial environment increases, so does the need for electrical outlets to plug in a charging brick. Some electrical device manufacturers have addressed this problem by incorporating one or more USB ports into a duplex outlet and generating a source of 5v DC current within the duplex outlet to feed one or more USB ports. While such a duplex outlet allows one or more USB charging cables to be connected to the duplex outlet while leaving the outlets free for other purposes, such a device still requires an electrician (or skilled homeowner for residential use) to replace the original duplex outlet with a USB-enabled outlet. Further, while USB A ports are very common today, a demand for other types of charging ports (USB mini A, micro A, micro B, etc.) and other types of physical interfaces may be developed in the future.

Unfortunately, replacing one circuit device with another, while not terribly difficult, is certainly more complicated than simply unplugging the outlet or switch from the wall and plugging a new outlet or switch in. Conventional electrical junction boxes include a means for electrical wires or cables to enter the box, as well as a clamping means. For an installation using electrical conduit, the conduit itself is mechanically clamped to the junction box and the individual conductors are unclamped. For an installation using non-armored plastic cable, the junction box is generally suitable enabled with a clamping mechanism that allows the plastic cable to be pushed into the junction box, but the clamping mechanism resists the cable from being pulled back out. Due to the conformal plastic outer sheath of an unarmored plastic cable, the individual conductors are held in place by the friction of the plastic sheathing. In some jurisdictions, a junction box that accepts only a single unarmored plastic cable may have a knock-out opening but no clamping mechanism.

The junction boxes, outlets, and switches of the prior art have existed for decades. While installation difficulty varies based on infrastructure employed (metal conduit and metal junction boxes, metal armored cable and metal junction boxes, plastic conduit and plastic junction boxes, unarmored plastic cable and metal junction boxes, plastic cable and plastic junction boxes), each type of installation requires some amount of skill and experience. Further, for retrofit work, the installer must de-energize the relevant circuits, and the field conditions as they exist for any given installation. In most jurisdictions, the move to the least expensive system (plastic cable and plastic junction boxes) has been nearly complete, with better materials and installation techniques the exception. Therefore, an installer often must deal with broken components and poorly installed junction boxes when retrofitting an installation. This includes crowded junction boxes (undersized boxes or boxes filled to capacity), which makes it difficult to replace an outlet or switch, and often difficult to properly align the position of the new switch or outlet in the box. Poor alignment can result in an unattractive installation, as well as broken cover plates (which constitutes a safety hazard). Further, poor alignment is compounded with multi-gang installations. Normal use of an improperly mounted or aligned device can also lead to device failure, intermittent electrical connections, and arcing/shorting.

In view of the foregoing, many homeowners prefer to use a licensed electrician to make repairs or retrofits due to the complexities of installation noted above. Further, for commercial installations, a licensed electrician is required in order to perform such work. The labor cost involved in an upgrade or repair can be substantial, which discourages repairs and upgrades.

Thus, a need exists for improvement in the field of electrical outlets and receptacles that allow for homeowners and others to quickly and safely upgrade their circuit devices.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of modular wall-mounted electrical circuit device assemblies, the present invention is not limited to use only in modular wall-mounted electrical circuit device assemblies, as will become apparent from the following summaries and detailed descriptions of aspects, features, and one or more embodiments of the present invention.

Broadly defined, an aspect of one or more embodiments of the present invention relates to a box liner installed in a standard electrical junction box that is suitably enabled to accept a specialized electrical device. Another aspect of one or more embodiments of the present invention relates to a specialized electrical junction box for new work is suitably enabled to accept a specialized electrical device.

Broadly defined, another aspect of one or more embodiments of the present invention relates to a modular wall-mounted electrical circuit device assembly, including: an electrical junction box adapted to be mounted on or in a wall with exposed ends of building wiring disposed therein, wherein the junction box includes a top wall, a bottom wall, a right wall, a left wall, a rear wall, and an open front; a modular circuit device installed in the junction box, through the open front thereof; and a cover plate. The modular circuit device includes a base unit having a junction box liner that defines a main cavity having an open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points; and an interchangeable device module having a housing, a forward-facing circuit device disposed at the front of the housing, a plurality of rearward-facing electrical contacts disposed at the rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together. The cover plate is mounted to a front of the modular circuit device such that the modular circuit device and the electrical junction box are covered thereby but with the forward-facing circuit device extending therethrough to permit a user to operate said circuit device.

In a feature of this aspect, the electrical contacts of the interchangeable device module and the electrical contacts of the base unit each arranged in a respective pattern such that the interchangeable device module may only be operatively installed in the base unit if the pattern of the electrical contacts of the interchangeable device module matches the pattern of electrical contacts of the base unit.

In further features, the interchangeable device module is a first interchangeable device module, the circuit device is a first circuit device, and the first interchangeable device module may be unplugged from the base unit and replaced by a second interchangeable device module having a second circuit device so long as the pattern of rearward-facing electrical contacts on the second interchangeable device module is the same as the pattern of rearward-facing electrical contacts on the first interchangeable device module; the first circuit device is a receptacle-type circuit device, and the pattern of electrical contacts allows the first circuit device to be replaced by any other electrically-compatible receptacle-type circuit device having the same pattern; the first circuit device is a 15 amp receptacle-type circuit device, and the pattern of electrical contacts allows the first circuit device to be replaced by any other electrically-compatible 15 amp receptacle-type circuit device having the same pattern; the first circuit device is a 20 amp receptacle-type circuit device, and the pattern of electrical contacts allows the first circuit device to be replaced by any other electrically-compatible 20 amp receptacle-type circuit device having the same pattern; each pattern includes five electrical connections, two of which are black or hot electrical connections, two of which are white or neutral electrical connections, and one of which is a ground connection; the first circuit device is a switch-type circuit device, and the pattern of electrical contacts allows the first circuit device to be replaced by any other electrically-compatible switch-type circuit device having the same pattern; the first circuit device is a 15 amp switch-type circuit device, and the pattern of electrical contacts allows the first circuit device to be replaced by any other electrically-compatible 15 amp switch-type circuit device having the same pattern; the first circuit device is a 20 amp switch-type circuit device, and the pattern of electrical contacts allows the first circuit device to be replaced by any other electrically-compatible 20 amp switch-type circuit device having the same pattern; the switch-type circuit is a two-way switch, and each pattern includes three electrical connections, one of which is a black or hot electrical connection, one of which is a white or neutral electrical connection, and one of which is a ground connection; the switch-type circuit is a three-way switch, and each pattern includes four electrical connections, one of which is a black or hot electrical connection, one of which is a white or neutral electrical connection, one of which is a traveler connection, and one of which is a ground connection; one pattern is distinguished from another pattern by an orientation of one or more of the electrical contacts; and/or the building wiring is arranged as a live electrical circuit, and the first interchangeable device module may be safely unplugged and removed, and the second interchangeable device module safely plugged in its place, without deactivating the live electrical circuit.

In still further features, the plurality of electrical contacts in the rear of the main cavity of the base unit are female contacts, and the plurality of rearward-facing electrical contacts of the interchangeable device module are male contacts; the male contacts are spade-type electrical contacts; the male contacts protrude through a rear wall of the housing; and/or the female contacts are arranged behind the closed rear of the main cavity of the junction box liner and are accessible to the male contacts via respective openings in the closed rear of the main cavity.

In still further features, the main cavity of the junction box liner is defined by a top wall, a bottom wall, a right wall, a left wall, a rear wall, and the open front thereof, and the first enclosed electrical interconnect assembly is enclosed behind the rear wall; the open front of the main cavity is framed by a front face; the front face is wider and taller than the open front of the junction box; the front face includes an upper aperture and a lower aperture used to attach the junction box liner to the junction box via screws; the front face includes left and right side wings and corresponding break lines such that one or both of the left and right side wings may be broken off to facilitate the arrangement of the modular circuit device next to another circuit device in the junction box; the front face includes an upper aperture and a lower aperture used to attach the cover plate to the junction box liner via screws; one or more tabs extend rearward from a back of the front face and are each adapted to interact with a wall of the junction box to at least temporarily retain the base unit in the junction box; the one or more tabs are resilient tabs that are each deflected by a wall of the junction box; the one or more tabs interact each have a hooked portion that snaps into a slot in a wall of the junction box to at least temporarily retain the base unit in the junction box; each hooked portion snaps into a slot located in the top wall or the bottom wall of the junction box; and/or a quick-release slot penetrates through the front face at a location adjacent each of the one or more tabs such that a tool may be inserted therethrough to release the respective tab from the slot in the wall of the junction box.

In still further features, the exterior electrical connection points are in the form of electrically-conductive screws and corresponding plates, and the exposed ends of the building wiring are hooked around the screws and clamped against the plates; and/or the electrically-conductive screws and corresponding plates are disposed on sides of the junction box liner.

In still further features, the exterior electrical connection points are in the form of spring-biased "backwire" or "back-stab" electrical connections accessible via small openings, and the exposed ends of the building wiring are inserted into the small openings and held in place by the spring-bias of said electrical connections; and/or the small openings are disposed in a base plate at a rear of the junction box liner.

In a still further feature, the junction box includes a top screw receptacle and a bottom screw receptacle, and the junction box liner is attached to the junction box via screws threaded into the top and bottom screw receptacles.

In a still further feature, the junction box is a "new construction"-style wall box that is adapted to be attached to a wall stud before wall board is attached to the wall stud.

In a still further feature, the junction box is a "remodel"-style wall box that is adapted to be attached to a section of wall board after the wall board is attached to a wall stud.

In still further features, the junction box liner further includes a latching mechanism that releasably couples to the interchangeable device module, thereby releasably retaining the interchangeable device module within the main cavity of the junction box liner with the electrical contacts of the interchangeable device module plugged to the electrical contacts of the base unit; the latching mechanism automatically couples to the interchangeable device module when the interchangeable device module is inserted into the open front of the main cavity of the junction box liner; the latching mechanism is disposed in the rear of the main cavity; the latching mechanism includes at least one attachment arm that closes on a structure on the interchangeable device module in response to contact; the latching mechanism includes a pair of attachment arms that close around a boss protruding from a rear wall of the housing; the boss includes beveled surfaces to facilitate movement relative to the attachment arms; the boss is partially hexagonal in profile; the boss is partially spherical; the plurality of rearward-facing electrical contacts of the interchangeable device module are male contacts extending a first distance rearward of the housing, the boss extends a second distance rearward of the housing, and the first stance is greater than the second distance; and/or the latching mechanism is a spring-loaded "push-push" type of latching and releasing mechanism wherein pushing against the mechanism a first time causes the mechanism to latch, and pushing against the mechanism a second time causes the mechanism to unlatch.

In still further features, the interchangeable device module further includes a locking mechanism that releasably couples to the junction box liner, thereby releasably retaining the interchangeable device module within the main cavity of the junction box liner with the electrical contacts of the interchangeable device module plugged to the electrical contacts of the base unit; the locking mechanism is adapted to be manually coupled to a wall of the junction box liner, while the interchangeable device module is in the junction box liner and the electrical contacts of the interchangeable device module and the electrical contacts of the base unit are plugged together, such that the interchangeable device module cannot be removed from the junction box liner without unlocking the locking mechanism; the locking mechanism includes a cam or other body that may be manually maneuvered through a slot in the wall of the junction box liner; the cam or other body is housed in a side of the housing and the slot is arranged in a side wall of the junction box liner; the cam or other body may be manually maneuvered through the slot in the wall of the junction box liner by rotating the cam or other body outward; the cam or other body may be manually maneuvered by a user via an interface in a front of the housing; the interface is a turnable head that is connected to the cam or other body via a shaft; the interface is covered by the cover plate such that the interface may be accessed only when the cover plate is removed; the cam or other body is wedge-shaped such that the farther the cam or other body is moved into the slot, the thicker the cam or other body is, and the cam or other body is eventually wedged by friction into the slot; and/or the slot is produced by knocking out a small panel in the side wall of the junction box liner.

In a still further feature, the plurality of electrical contacts in the rear of the main cavity of the base unit are arranged in a pattern, female contacts, and the plurality of rearward-facing electrical contacts of the interchangeable device module are male contacts.

In still further features, the first electrical interconnect assembly includes a circuit interrupter adapted to disable or de-energize the electrical contacts of the base unit when the electrical contacts of the interchangeable device module and the electrical contacts of the base unit are not plugged together; the circuit interrupter includes a normally open switch that is closed when the interchangeable device module is removably installed in the main cavity of the base unit; the circuit interrupter is controlled by operation of a latching mechanism in the junction box liner that releasably couples to the interchangeable device module when the interchangeable device module is removably installed in the main cavity of the base unit; the circuit interrupter is controlled by electrical connectivity being established between the electrical contacts of the base unit and the electrical contacts of the interchangeable device module when plugged together; the circuit interrupter is controlled by mechanical interaction of the electrical contacts of the base unit and the electrical contacts of the interchangeable device module; the circuit interrupter is controlled by insertion of a mechanical tab; and/or the circuit interrupter is controlled by a sensor.

Broadly defined, another aspect of one or more embodiments of the present invention relates to a modular circuit device for installation in an electrical junction box mounted on or in a wall with exposed ends of building wiring disposed therein, the junction box including a top wall, a bottom wall, a right wall, a left wall, a rear wall, and an open front, the modular circuit device including: a base unit having a junction box liner that defines a main cavity having an open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exterior electrical connection points are arranged for exposed ends of the building wiring to be electrically connected thereto; and an interchangeable device module having a housing, a forward-facing circuit device disposed at the front of the housing, a plurality of rearward-facing electrical contacts disposed at the rear of the housing, and a second electrical interconnect assembly enclosed within the housing, wherein the interchangeable device module is adapted to be removably installed in the main cavity of the base unit, via the open front thereof, such that the electrical contacts of the interchangeable device module and the electrical contacts of the base unit are plugged together; wherein the base unit may be installed in the junction box, via the open front thereof, after the exposed ends of the building wiring are electrically connected thereto, wherein the interchangeable device module may be removably installed in the base unit after the base unit is installed in the junction box, and wherein the modular circuit device is arranged such that a cover plate may be mounted to a front thereof, after the interchangeable device module is installed in the base unit and the base unit is installed in the junction box, such that the modular circuit device and the electrical junction box are covered thereby but with the forward-facing circuit device extending therethrough to permit a user to operate said circuit device.

Broadly defined, another aspect of one or more embodiments of the present invention relates to a modular wall-mounted electrical circuit device assembly, including: an electrical junction box assembly, adapted to be mounted on or in a wall with exposed ends of building wiring disposed therein, and a modular circuit device. The junction box assembly includes: a front housing having a top wall, a bottom wall, a right wall, a left wall, and a front face, having a main opening therein, that collectively define a first cavity; and a rear cover having a top wall, a bottom wall, a right wall, a left wall, a rear wall, and an open front. The modular circuit device is installed in the rear cover of the junction box assembly, through the open front thereof, and includes: a base unit having a junction box liner that defines a main cavity having an open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points; and an interchangeable device module having a housing, a forward-facing circuit device disposed at the front of the housing, a plurality of rearward-facing electrical contacts disposed at the rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together. The front housing of the junction box assembly is mounted to the rear cover thereof such that the base unit is enclosed by the front housing and rear cover such that the main opening of the front housing is aligned with the open front of the base unit. The interchangeable device module may be installed and removed from the base unit, through the main opening of the front housing, while the front housing remains mounted to the rear cover.

Broadly defined, another aspect of one or more embodiments of the present invention relates to a method of installing a modular wall-mounted electrical circuit device assembly, including: mounting an electrical junction box on or in a wall with exposed ends of building wiring disposed therein, wherein the junction box includes a top wall, a bottom wall, a right wall, a left wall, a rear wall, and an open front; providing a base unit of a modular circuit device, the base unit including a junction box liner that defines a main cavity having an open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points; electrically connecting the exposed ends of the building wiring to the exterior electrical connection points of the base unit; installing the base unit in the junction box, with the exposed ends of the building wiring connected to the electrical connection points, through the open front thereof; providing an interchangeable device module of the modular circuit device, the interchangeable device module having a housing, a forward-facing circuit device disposed at the front of the housing, a plurality of rearward-facing electrical contacts disposed at the rear of the housing, and a second electrical interconnect assembly enclosed within the housing; removably installing the interchangeable device module in the main cavity of the base unit, via the open front thereof, such that the electrical contacts of the interchangeable device module and the electrical contacts of the base unit are plugged together; and mounting a cover plate to a front of the modular circuit device such that the modular circuit device and the electrical junction box are covered thereby but with the forward-facing circuit device extending therethrough to permit a user to operate said circuit device.

In a feature of this aspect, providing the interchangeable device module and providing the base unit including providing the electrical contacts of the interchangeable device module and the electrical contacts of the base unit such that they are each arranged in a respective pattern, and the method further includes permitting installation of the interchangeable device module in the base unit only if the pattern of the electrical contacts of the interchangeable device module matches the pattern of electrical contacts of the base unit.

In further features, the interchangeable device module is a first interchangeable device module, the circuit device is a first circuit device, and the method includes unplugging the first interchangeable device module from the base unit and replacing the first interchangeable device module with a second interchangeable device module having a second circuit device so long as the pattern of rearward-facing electrical contacts on the second interchangeable device module is the same as the pattern of rearward-facing electrical contacts on the first interchangeable device module; the first circuit device is a receptacle-type circuit device, and the pattern of electrical contacts allows the first circuit device to be replaced by any other electrically-compatible receptacle-type circuit device having the same pattern; the first circuit device is a 15 amp receptacle-type circuit device, and the pattern of electrical contacts allows the first circuit device to be replaced by any other electrically-compatible 15 amp receptacle-type circuit device having the same pattern; the first circuit device is a 20 amp receptacle-type circuit device, and the pattern of electrical contacts allows the first circuit device to be replaced by any other electrically-compatible 20 amp receptacle-type circuit device having the same pattern; each pattern includes five electrical connections, two of which are black or hot electrical connections, two of which are white or neutral electrical connections, and one of which is a ground connection; the first circuit device is a switch-type circuit device, and the pattern of electrical contacts allows the first circuit device to be replaced by any other electrically-compatible switch-type circuit device having the same pattern; the first circuit device is a 15 amp switch-type circuit device, and the pattern of electrical contacts allows the first circuit device to be replaced by any other electrically-compatible 15 amp switch-type circuit device having the same pattern; the first circuit device is a 20 amp switch-type circuit device, and the pattern of electrical contacts allows the first circuit device to be replaced by any other electrically-compatible 20 amp switch-type circuit device having the same pattern; the switch-type circuit is a two-way switch, and each pattern includes three electrical connections, one of which is a black or hot electrical connection, one of which is a white or neutral electrical connection, and one of which is a ground connection; the switch-type circuit is a three-way switch, and each pattern includes four electrical connections, one of which is a black or hot electrical connection, one of which is a white or neutral electrical connection, one of which is a traveler connection, and one of which is a ground connection; one pattern is distinguished from another pattern by an orientation of one or more of the electrical contacts; and/or the building wiring is arranged as a live electrical circuit, and the method further includes unplugging and removing the first interchangeable device module, and plugging the second interchangeable device module safely plugged in its place, without deactivating the live electrical circuit.

In still further features, the plurality of electrical contacts in the rear of the main cavity of the base unit are female contacts, and the plurality of rearward-facing electrical contacts of the interchangeable device module are male contacts; the male contacts are spade-type electrical contacts; the male contacts protrude through a rear wall of the housing; and/or the female contacts are arranged behind the closed rear of the main cavity of the junction box liner and are accessible to the male contacts via respective openings in the closed rear of the main cavity.

In still further features, the main cavity of the junction box liner is defined by a top wall, a bottom wall, a right wall, a left wall, a rear wall, and the open front thereof, and the first enclosed electrical interconnect assembly is enclosed behind the rear wall; the open front of the main cavity is framed by a front face; the front face is wider and taller than the open front of the junction box; the front face includes an upper aperture and a lower aperture used to attach the junction box liner to the junction box via screws; the front face includes left and right side wings and corresponding break lines, and the method further includes breaking off one or both of the left and right side wings to facilitate the arrangement of the modular circuit device next to another circuit device in the junction box; the front face includes an upper aperture and a lower aperture used to attach the cover plate to the junction box liner via screws; one or more tabs extend rearward from a back of the front face, and the method further includes positioning the base unit such that the one or more tabs each interact with a wall of the junction box to at least temporarily retain the base unit in the junction box; the one or more tabs are resilient tabs, and the method further includes maneuvering the base unit such that the one or more tabs are each deflected by a wall of the junction box; the one or more tabs interact each have a hooked portion, and the method further includes maneuvering the base unit such that the one or more tabs each snap into a slot in a wall of the junction box to at least temporarily retain the base unit in the junction box; the method further includes maneuvering the base unit such that each hooked portion snaps into a slot located in the top wall or the bottom wall of the junction box; and/or a quick-release slot penetrates through the front face at a location adjacent each of the one or more tabs, and the method further includes inserting a tool through at least one quick-release slot to release the respective tab from the slot in the wall of the junction box.

In still further features, the exterior electrical connection points are in the form of electrically-conductive screws and corresponding plates, and the method further includes hooking the exposed ends of the building wiring around the screws and clamping them against the plates; and/or the electrically-conductive screws and corresponding plates are disposed on sides of the junction box liner.

In still further features, the exterior electrical connection points are in the form of spring-biased "backwire" or "back-stab" electrical connections accessible via small openings, and the method further comprises inserting the exposed ends of the building wiring into the small openings and holding them in place by the spring-bias of said electrical connections; and/or the small openings are disposed in a base plate at a rear of the junction box liner.

In a still further feature, the junction box includes a top screw receptacle and a bottom screw receptacle, and the method further comprises attaching the junction box liner to the junction box via screws threaded into the top and bottom screw receptacles.

In a still further feature, the junction box is a "new construction"-style wall box, and the method further includes attaching the junction box to a wall stud before wall board is attached to the wall stud.

In a still further feature, the junction box is a "remodel"-style wall box, and the method further includes attaching the junction box to a section of wall board after the wall board is attached to a wall stud.

In still further features, the junction box liner further includes a latching mechanism that releasably couples to the interchangeable device module, and the method further includes positioning the interchangeable device module such that the latching mechanism releasably retains the interchangeable device module within the main cavity of the junction box liner with the electrical contacts of the interchangeable device module plugged to the electrical contacts of the base unit; the latching mechanism automatically couples to the interchangeable device module when the interchangeable device module is inserted into the open front of the main cavity of the junction box liner; the latching mechanism is disposed in the rear of the main cavity; the latching mechanism includes at least one attachment arm that closes on a structure on the interchangeable device module in response to contact; the latching mechanism includes a pair of attachment arms that close around a boss protruding from a rear wall of the housing; the boss includes beveled surfaces to facilitate movement relative to the attachment arms; the boss is partially hexagonal in profile; the boss is partially spherical; the plurality of rearward-facing electrical contacts of the interchangeable device module are male contacts extending a first distance rearward of the housing, the boss extends a second distance rearward of the housing, and the first stance is greater than the second distance; and/or the latching mechanism is a spring-loaded "push-push" type of latching and releasing mechanism wherein pushing against the mechanism a first time causes the mechanism to latch, and pushing against the mechanism a second time causes the mechanism to unlatch.

In still further features, the interchangeable device module further includes a locking mechanism, and the method further includes releasably coupling the locking mechanism to the junction box liner, thereby releasably retaining the interchangeable device module within the main cavity of the junction box liner with the electrical contacts of the interchangeable device module plugged to the electrical contacts of the base unit; the locking mechanism is adapted to be manually coupled to a wall of the junction box liner, while the interchangeable device module is in the junction box liner and the electrical contacts of the interchangeable device module and the electrical contacts of the base unit are plugged together, such that the interchangeable device module cannot be removed from the junction box liner without unlocking the locking mechanism; the locking mechanism includes a cam or other body that may be manually maneuvered through a slot in the wall of the junction box liner; the cam or other body is housed in a side of the housing and the slot is arranged in a side wall of the junction box liner; the cam or other body may be manually maneuvered through the slot in the wall of the junction box liner by rotating the cam or other body outward; the cam or other body may be manually maneuvered by a user via an interface in a front of the housing; the interface is a turnable head that is connected to the cam or other body via a shaft; the interface is covered by the cover plate such that the interface may be accessed only when the cover plate is removed; the cam or other body is wedge-shaped such that the farther the cam or other body is moved into the slot, the thicker the cam or other body is, and the cam or other body is eventually wedged by friction into the slot; the method further includes knocking out a small panel in the side wall of the junction box liner to produce the slot.

In a still further feature, the plurality of electrical contacts in the rear of the main cavity of the base unit are arranged in a pattern, female contacts, and the plurality of rearward-facing electrical contacts of the interchangeable device module are male contacts.

In still further features, the first electrical interconnect assembly includes a circuit interrupter, and the method further includes disabling or de-energizing the electrical contacts of the base unit, via the circuit interrupter, when the electrical contacts of the interchangeable device module and the electrical contacts of the base unit are not plugged together; the circuit interrupter includes a normally open switch that is closed when the interchangeable device module is removably installed in the main cavity of the base unit; the method further includes controlling the circuit interrupter by operation of a latching mechanism in the junction box liner that releasably couples to the interchangeable device module when the interchangeable device module is removably installed in the main cavity of the base unit; the method further includes controlling the circuit interrupter by electrical connectivity being established between the electrical contacts of the base unit and the electrical contacts of the interchangeable device module when plugged together; the method further includes controlling the circuit interrupter by mechanical interaction of the electrical contacts of the base unit and the electrical contacts of the interchangeable device module; the method further includes controlling the circuit interrupter by insertion of a mechanical tab; and/or the method further includes controlling the circuit interrupter by a sensor.

Broadly defined, another aspect of one or more embodiments of the present invention relates to a method of installing a modular circuit device with a interchangeable circuit device in an electrical junction box having exposed ends of building wiring disposed therein, the junction box including a top wall, a bottom wall, a right wall, a left wall, a rear wall, and an open front, the method comprising the steps of: providing a modular circuit device, the modular circuit device including a base unit having a junction box liner that defines a main cavity having an open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, and an interchangeable device module having a housing, a forward-facing circuit device disposed at the front of the housing, a plurality of rearward-facing electrical contacts disposed at the rear of the housing, and a second electrical interconnect assembly enclosed within the housing; electrically connecting the exposed ends of the building wiring to the exterior electrical connection points of the base unit; installing the base unit in the junction box, with the exposed ends of the building wiring connected to the electrical connection points, through the open front thereof; removably installing the interchangeable device module in the main cavity of the base unit, via the open front thereof, such that the electrical contacts of the interchangeable device module and the electrical contacts of the base unit are plugged together; and mounting a cover plate to a front of the modular circuit device such that the modular circuit device and the electrical junction box are covered thereby but with the forward-facing circuit device extending therethrough to permit a user to operate said circuit device.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
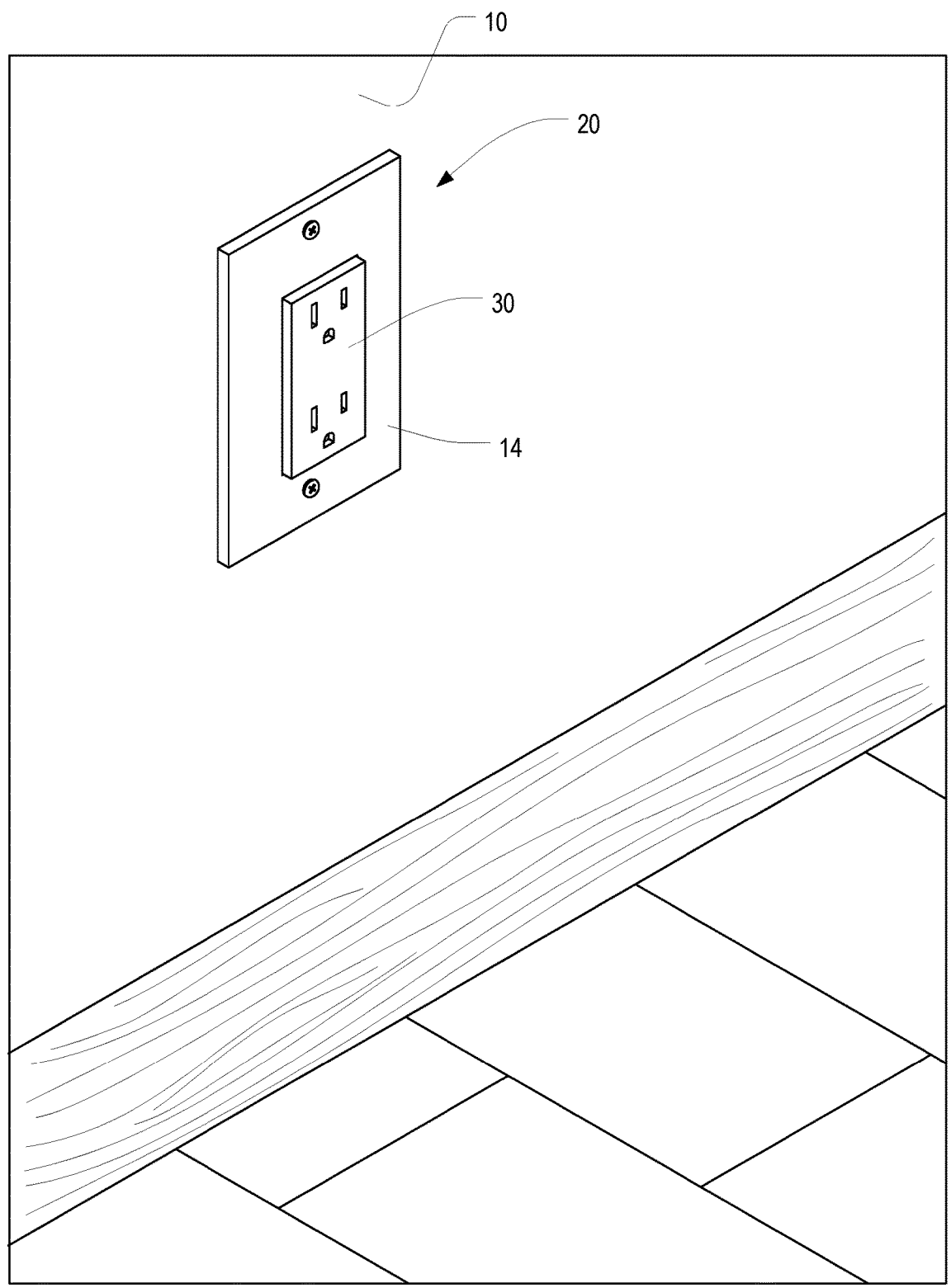
FIG. 1 is an orthogonal view of a modular wall-mounted electrical circuit device assembly shown installed in a wall in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
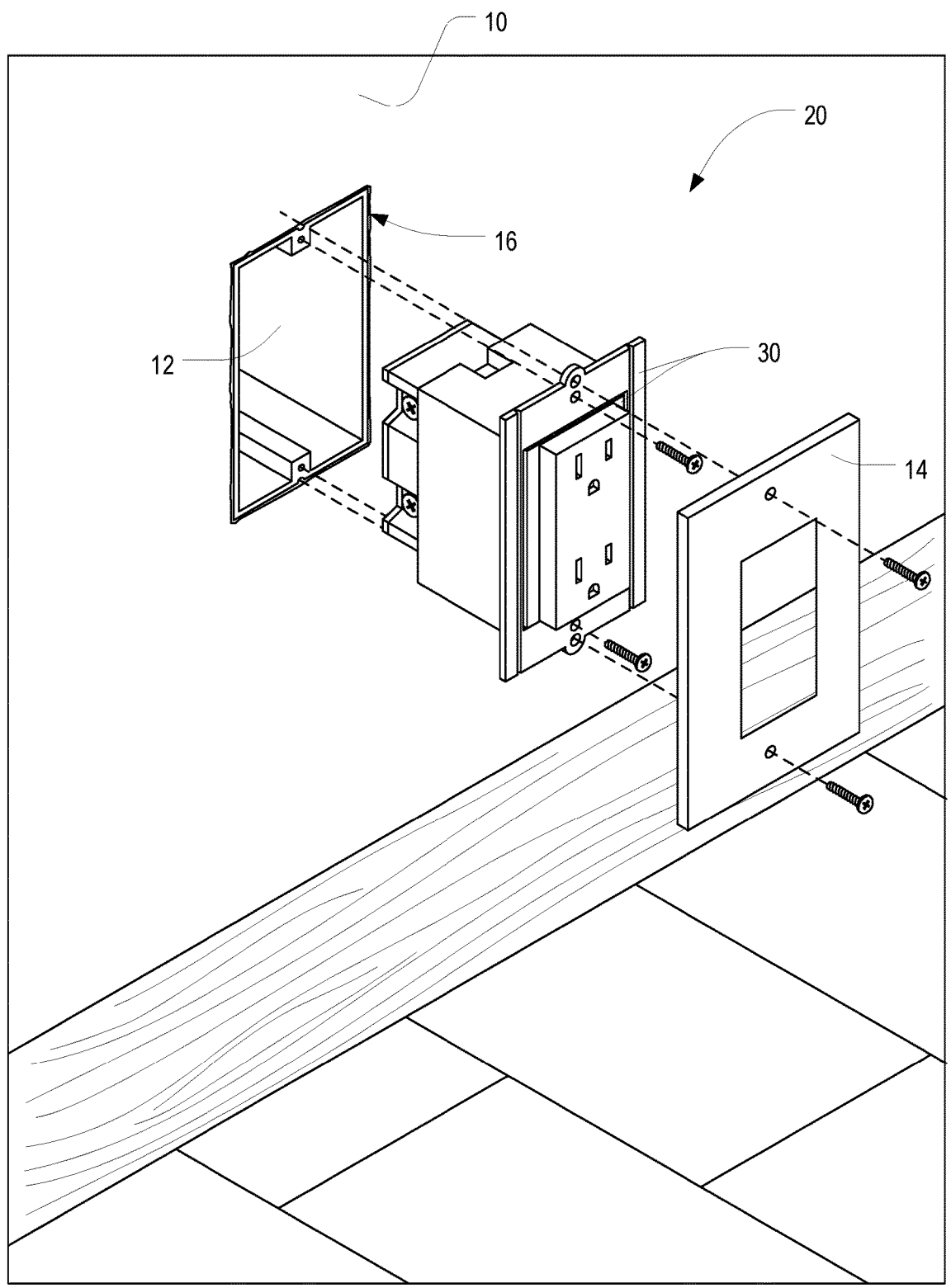
FIG. 2 is a partially exploded view of the modular wall-mounted electrical circuit device assembly of FIG. 1.

FIGS. 1 and 2 are an orthogonal view and a partially exploded view, respectively, of a modular wall-mounted electrical circuit device assembly 20 shown installed in a wall 10 in accordance with one or more preferred embodiments of the present invention. As shown therein, the modular wall-mounted electrical circuit device assembly 20 includes an electrical wall box or junction box 12, a modular circuit device unit 30, and a cover plate 14. In the illustrated arrangement, the junction box 12 is mounted in an opening 16 in the wall 10 itself with its front surfaces typically flush with, or just inside or outside, the surface of the wall 10 (commonly but not always drywall). Such a junction box 12 is typically attached to a wall stud via pre-mounted nails or other mounting features, but in at least some embodiments the exact installation method is not critical for the invention, and other mounting arrangements, some of which are described and/or illustrated herein, are likewise possible. The modular circuit device unit 30 is installed in the junction box 12, while the cover plate 14 fits over the face of the modular circuit device unit 30 and hides the junction box 12 and wall opening 16.

Figure 3:
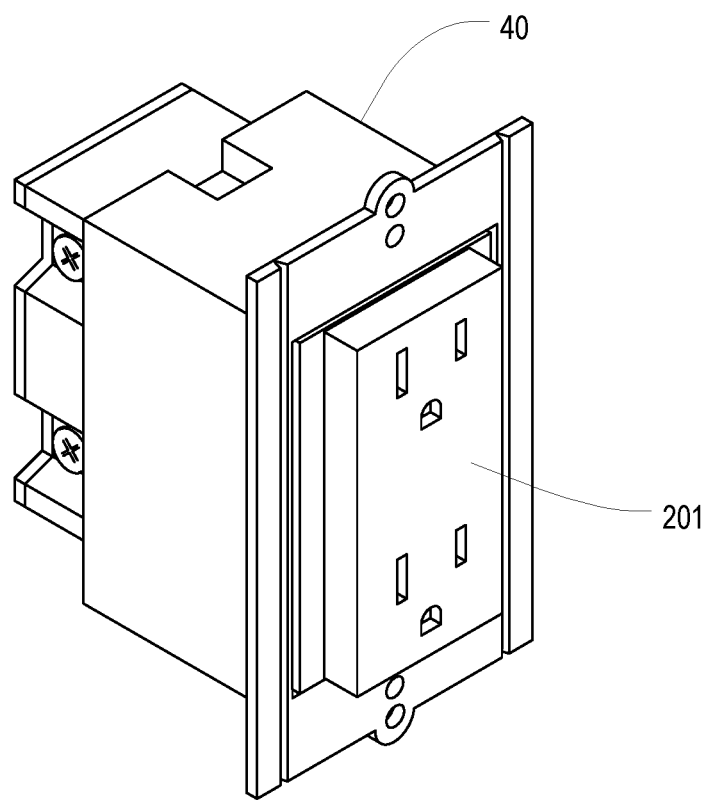
FIG. 3 is an orthogonal view of the modular circuit device unit of FIG. 2.
Figure 4:
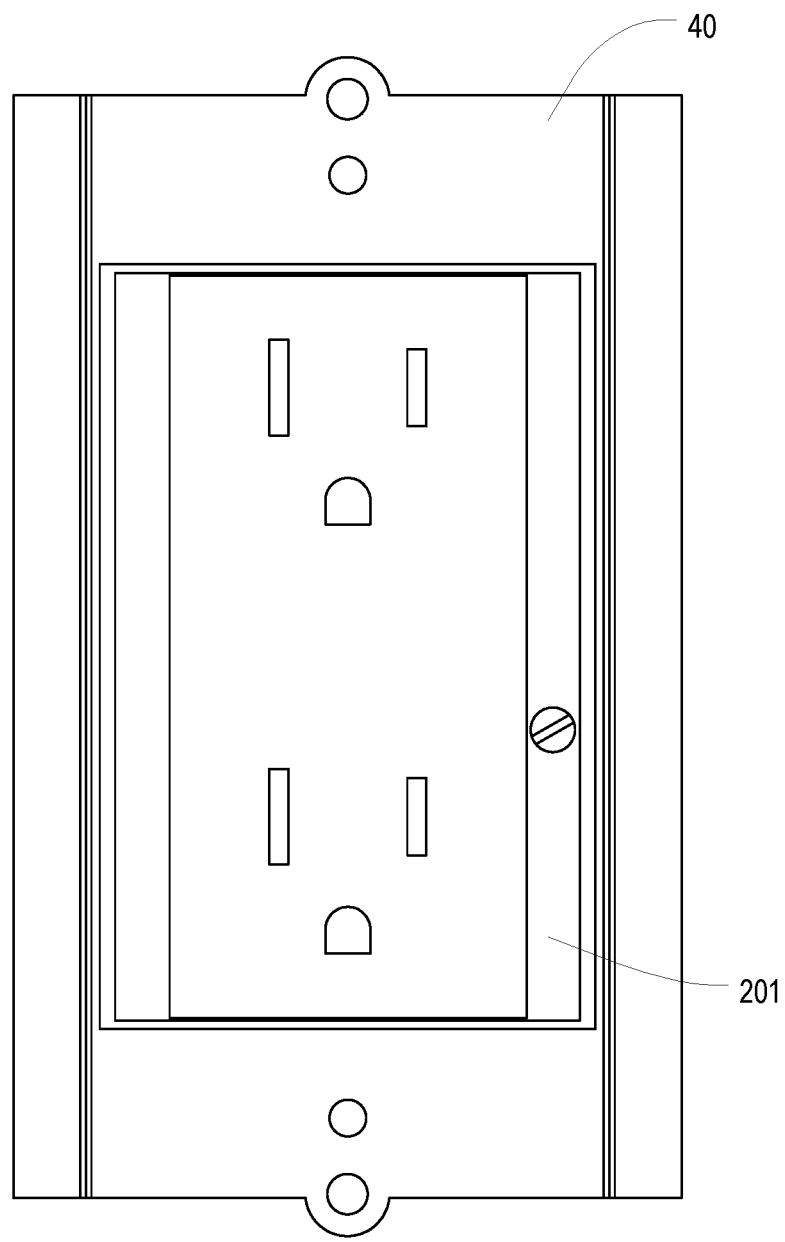
FIG. 4 is a front view of the modular circuit device unit of FIG. 2.
Figure 5:
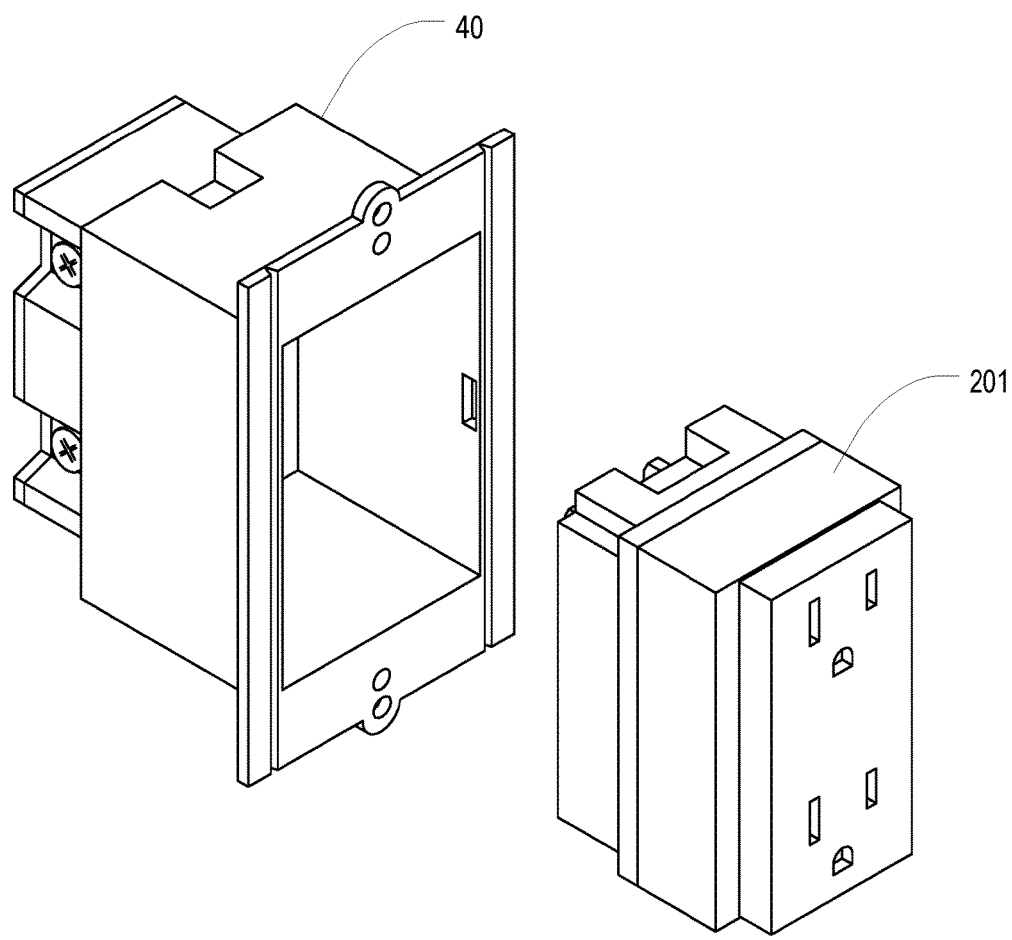
FIG. 5 is a partially exploded orthogonal view of the modular circuit device unit of FIG. 2.

FIGS. 3, 4, and 5 are an orthogonal view, a front view, and a partially exploded orthogonal view of the modular circuit device unit 30 of FIG. 2. As shown therein, the modular circuit device unit 30 includes a base unit 40 and a device module 201, wherein the device module 201 mounts in, and is easily removable from, the base unit 40 in a way that makes it far easier for a user to replace the device module 201 with a similar unit or a different unit as desired. The base unit 40 may likewise be removed, but as described hereinbelow its installation and removal is more akin to that of conventional electrical circuit devices.

Figure 6:
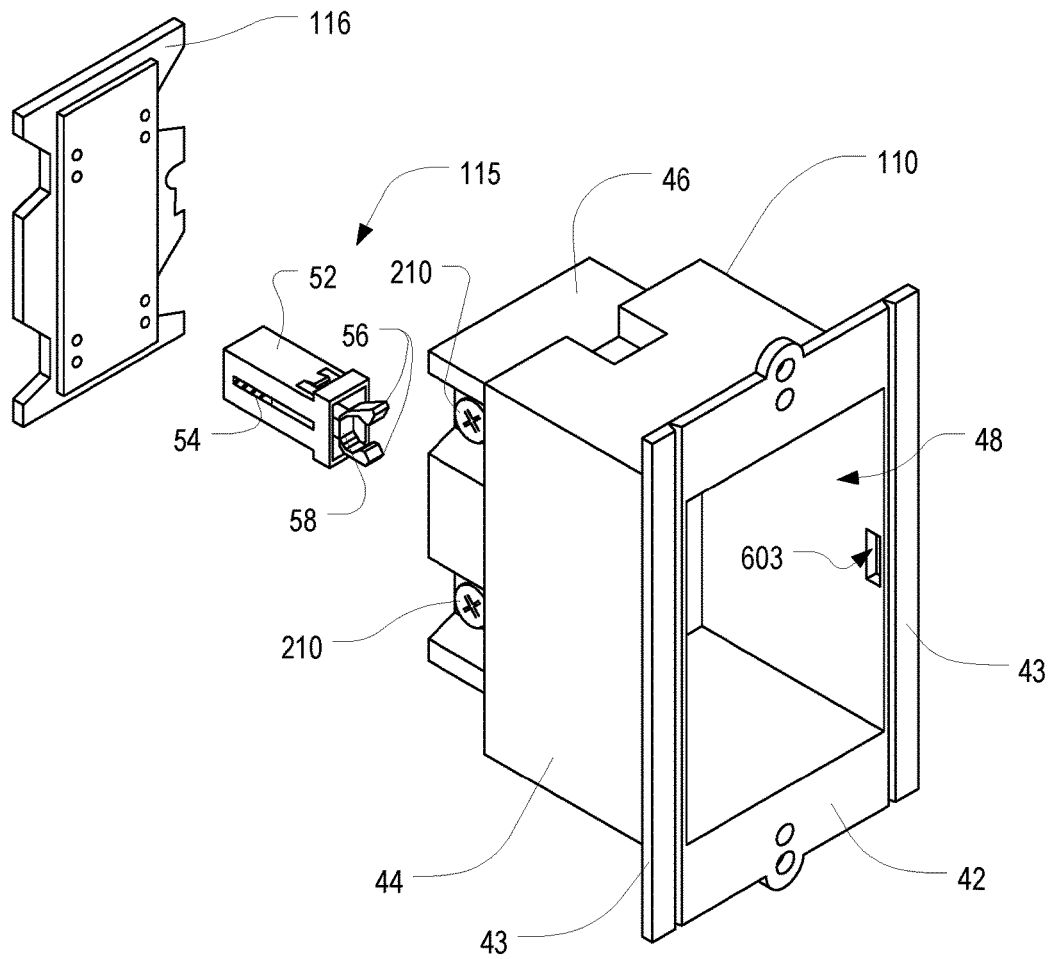
FIG. 6 is a partially exploded orthogonal view of the base unit of FIG. 5.
Figure 7:
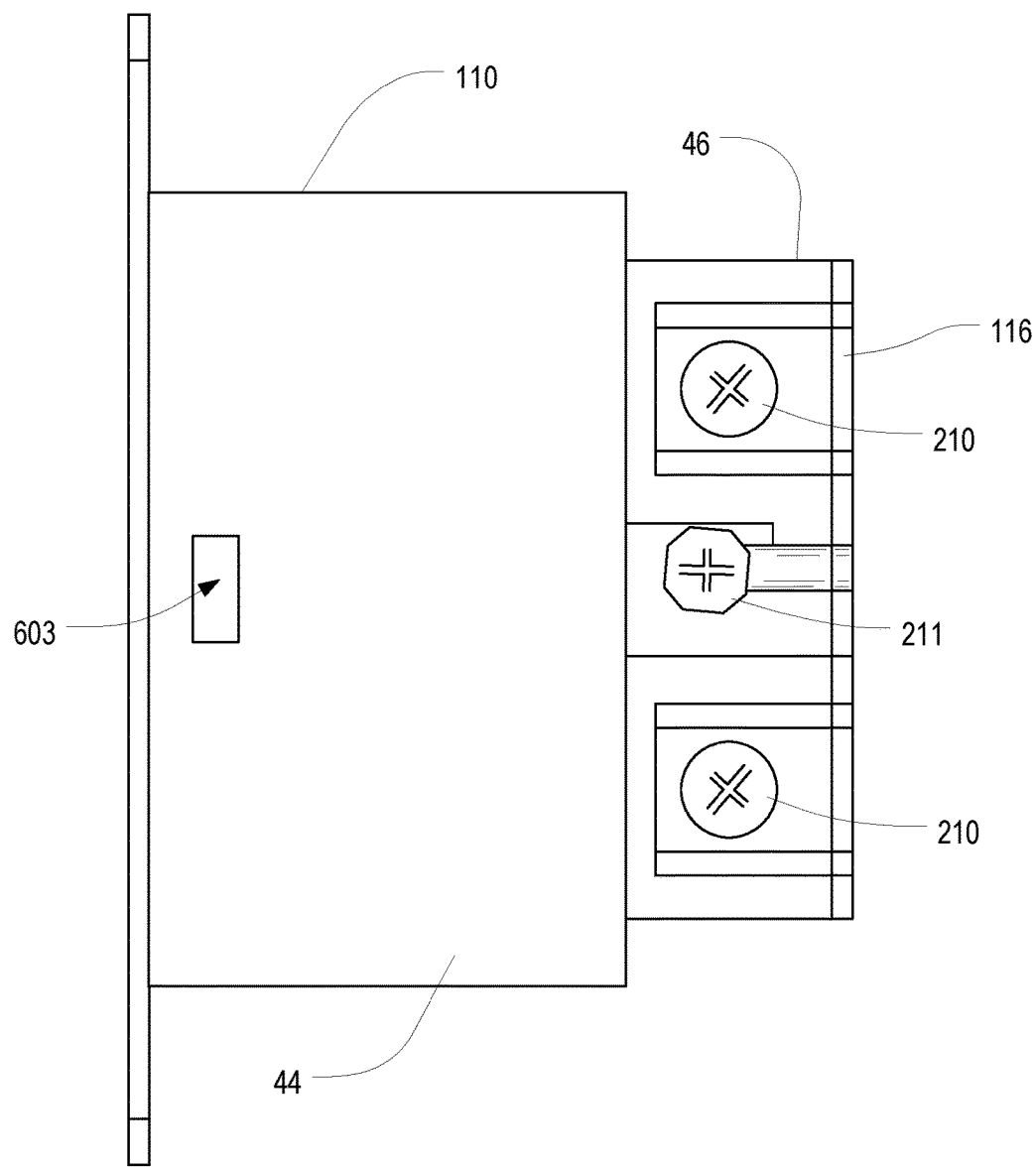
FIG. 7 is a right side view of the base unit of FIG. 5.

FIGS. 6 and 7 are a partially exploded orthogonal view and a right side view, respectively, of the base unit 40 of FIG. 5. As shown therein, the base unit 40 includes a junction box liner 110, a mechanical latching mechanism 115, a base or backing plate 116, and a plurality of exterior electrical connection points. The junction box liner 110, which may be made of plastics and other materials similar to those used for junction boxes, includes a front face 42, a primary housing 44, defining a large main cavity 48 for receiving the device module 201, and a smaller rear portion 46 that houses a first electrical interconnect assembly (not shown) and a portion of the mechanical latching mechanism 115. The rear portion of the junction box liner 110 is backed by the base plate 116. The mechanical latch mechanism 115 may be mounted to the backing plate 116, extends through (and may be supported by) the rear portion 46 of the liner 110, and protrudes through an opening into the interior space of the main cavity 48 of the box liner 110. The electrical connection points are adapted to connect to the building wiring (not shown). In the illustrated embodiment, the connection points are in the form of electrically-conductive screws and corresponding plates 210,211, which may be generally conventional in design and construction, such that reliable electrical connections may be established between exposed wire ends of the building wiring and the electrical interconnect assembly. The screw/plate electrical connections 210,211 may be similar in form to conventional screw/plate electrical connections 210,211 to facilitate acceptance and use by electricians and others. In the illustrated embodiment two white or neutral connections 210 are provided on the left side and two black or hot connections 210, with a ground connection 211 in between, are provided on the right side. Although not illustrated, the pair of connections 210 on each side may be provided in a normally-connected state, but with a break-off tab that separates one connection from the other, thereby permitting the two receptacles in the module 201 to be controlled separately, all in like manner to conventional duplex receptacles.

Figure 8:
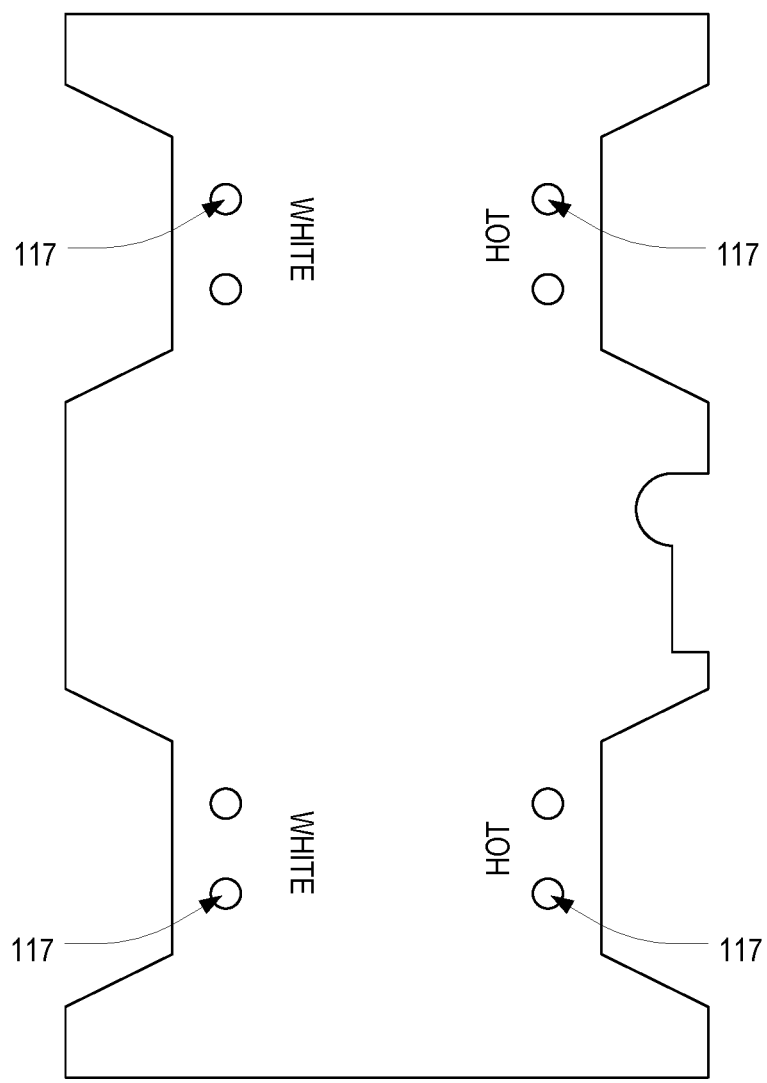
FIG. 8 is a rear view of the backing plate of FIG. 10 showing a plurality of wire openings therein and corresponding "white" and "hot" indicia.

In some embodiments, the screw/plate electrical connections 210 may be supplemented or replaced by conventional "backwire" or "back-stab" electrical connections. In this regard, FIG. 8 is a rear view of the backing plate 116 of FIG. 6 showing a plurality of wire openings 117 therein and corresponding "white" and "hot" indicia. Such openings 117 permit exposed wire ends to be pushed through the backing plate and into corresponding spring-biased female electrical connectors that capture and retain the wire ends, with removal intended to be possible only when the springs are released. Although perhaps not as desirable as screw/plate electrical connections 210, such electrical connection points are similar to those in conventional outlets and other circuit devices and make installation faster. Other conventional or nonconventional electrical connection points, such as screw and clamp back wire connections, may likewise be utilized in various embodiments.

Figure 9:
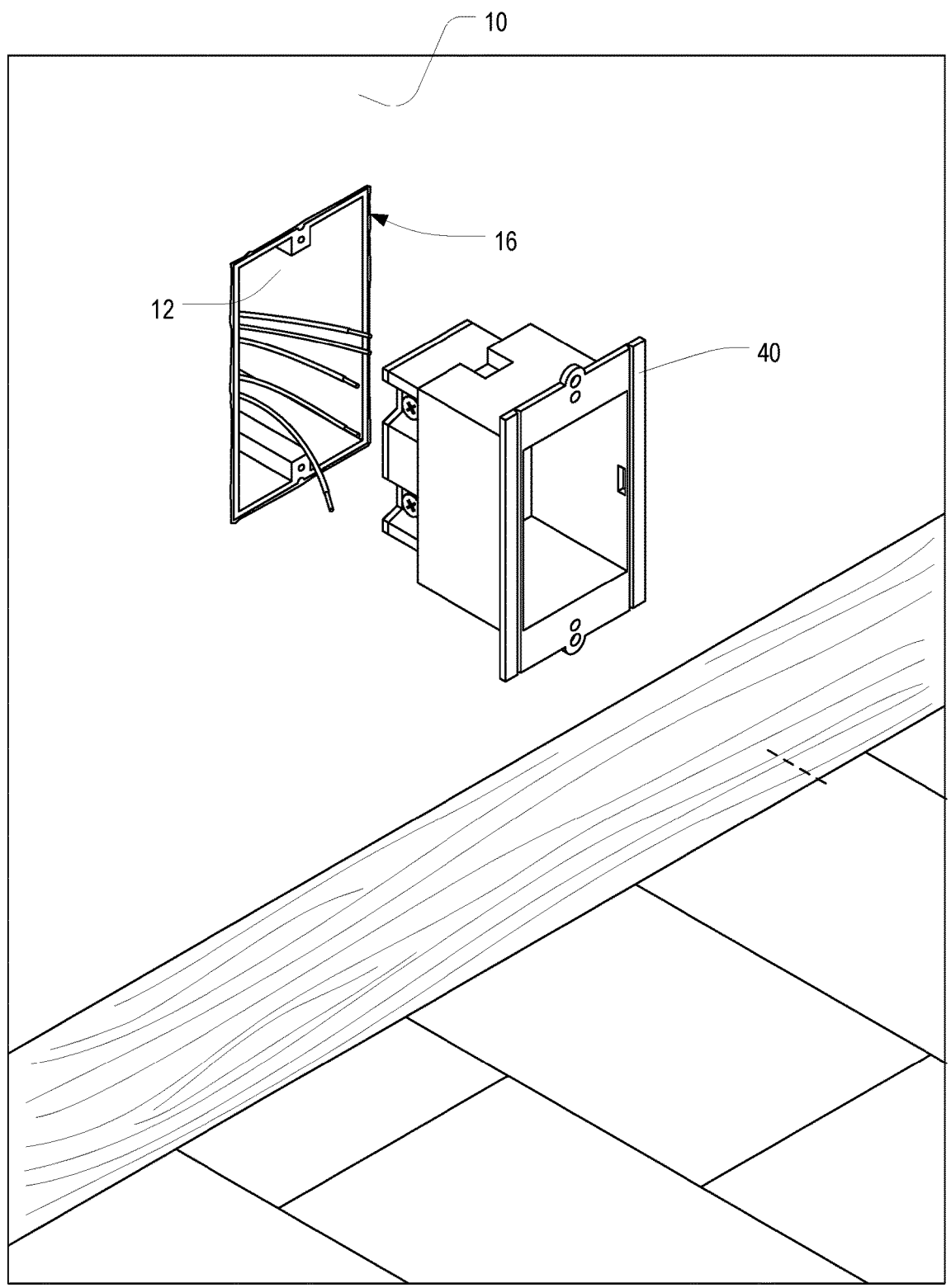
FIGS. 9-12 are orthogonal views of a base unit being wired and installed in a junction box.
Figure 10:
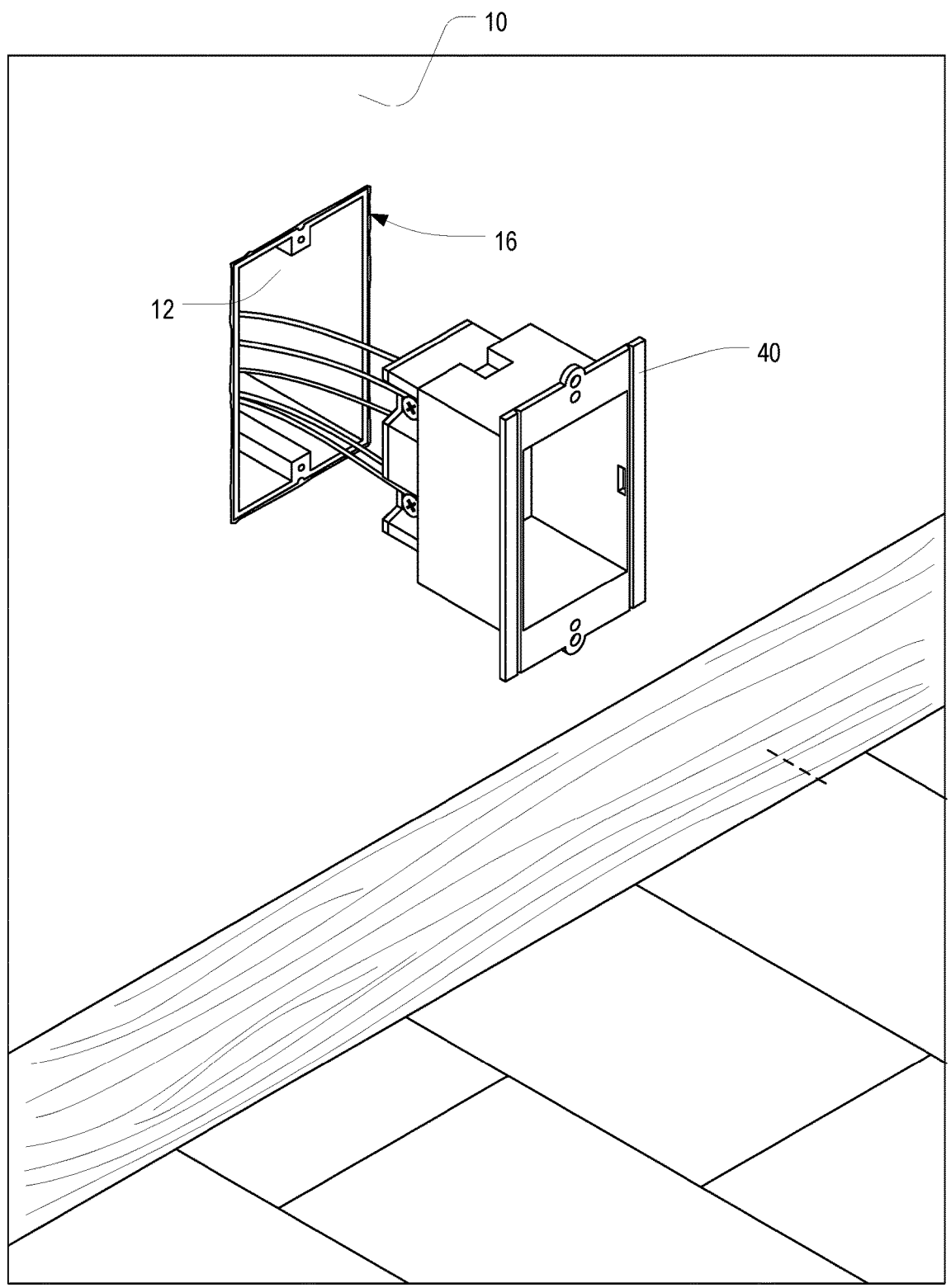
Figure 11:
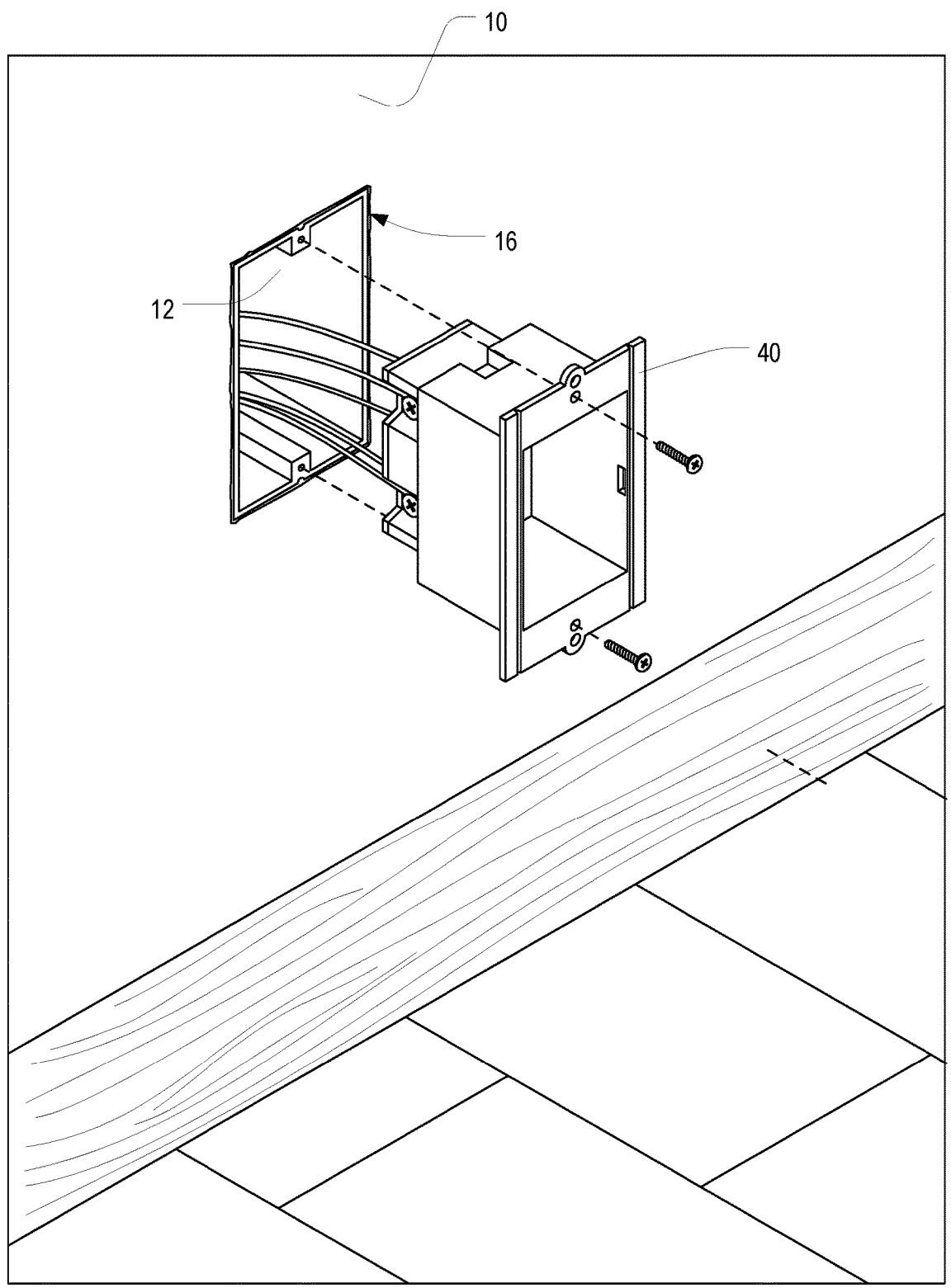
Figure 12:
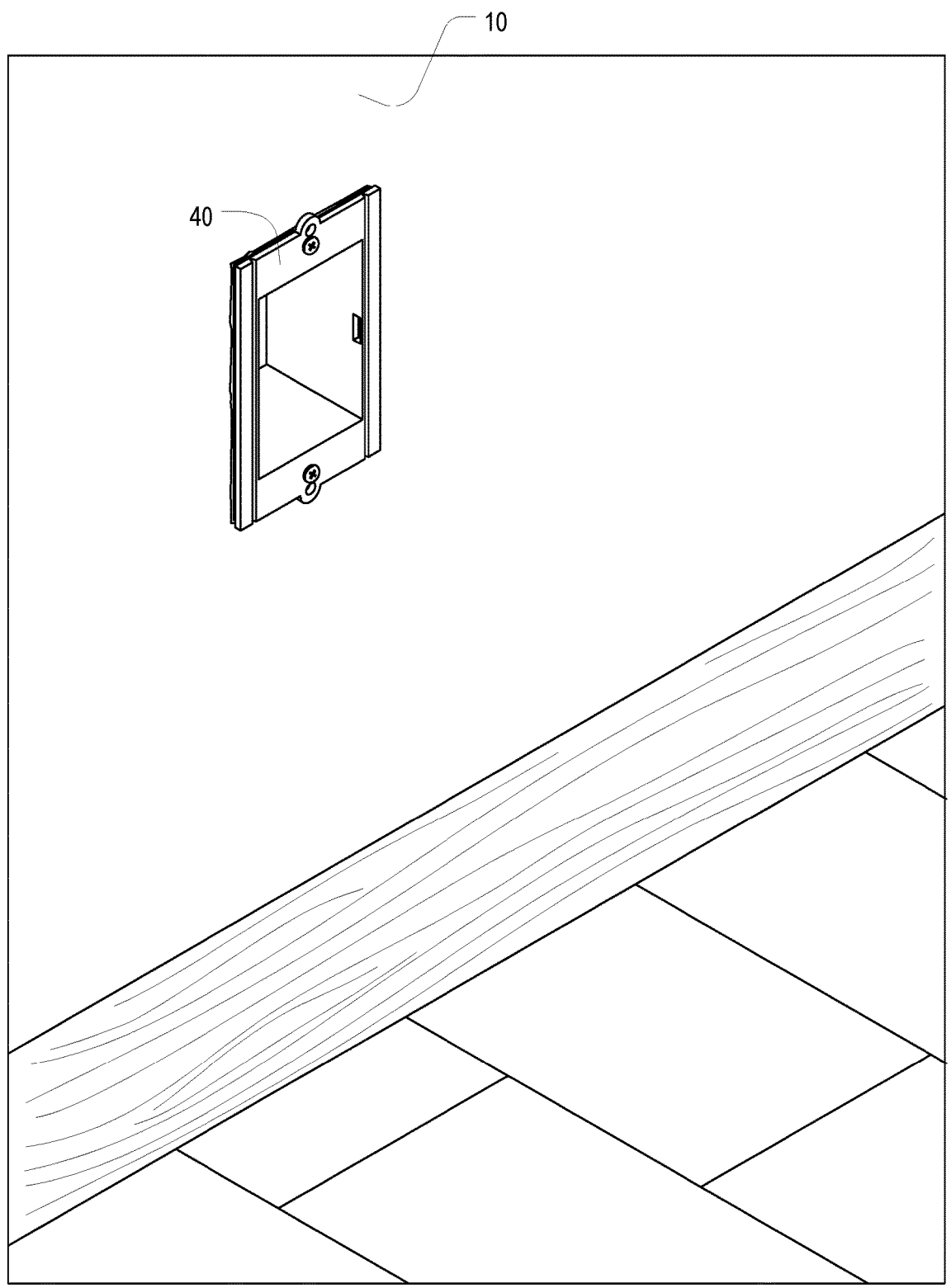
Figure 13:
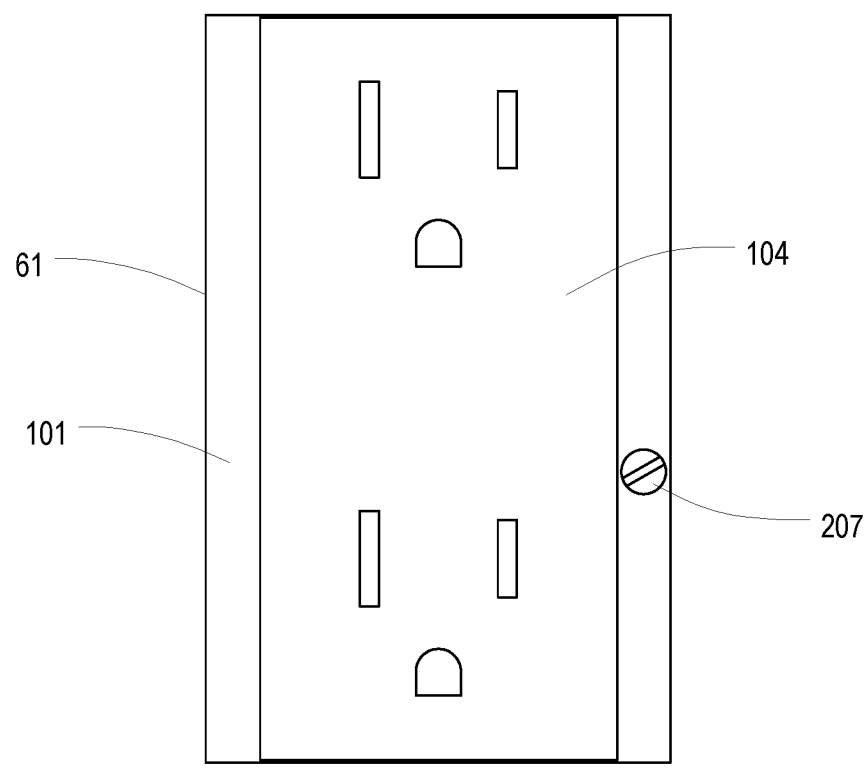
FIG. 13 is a front view of the device module of FIG. 5.
Figure 14:
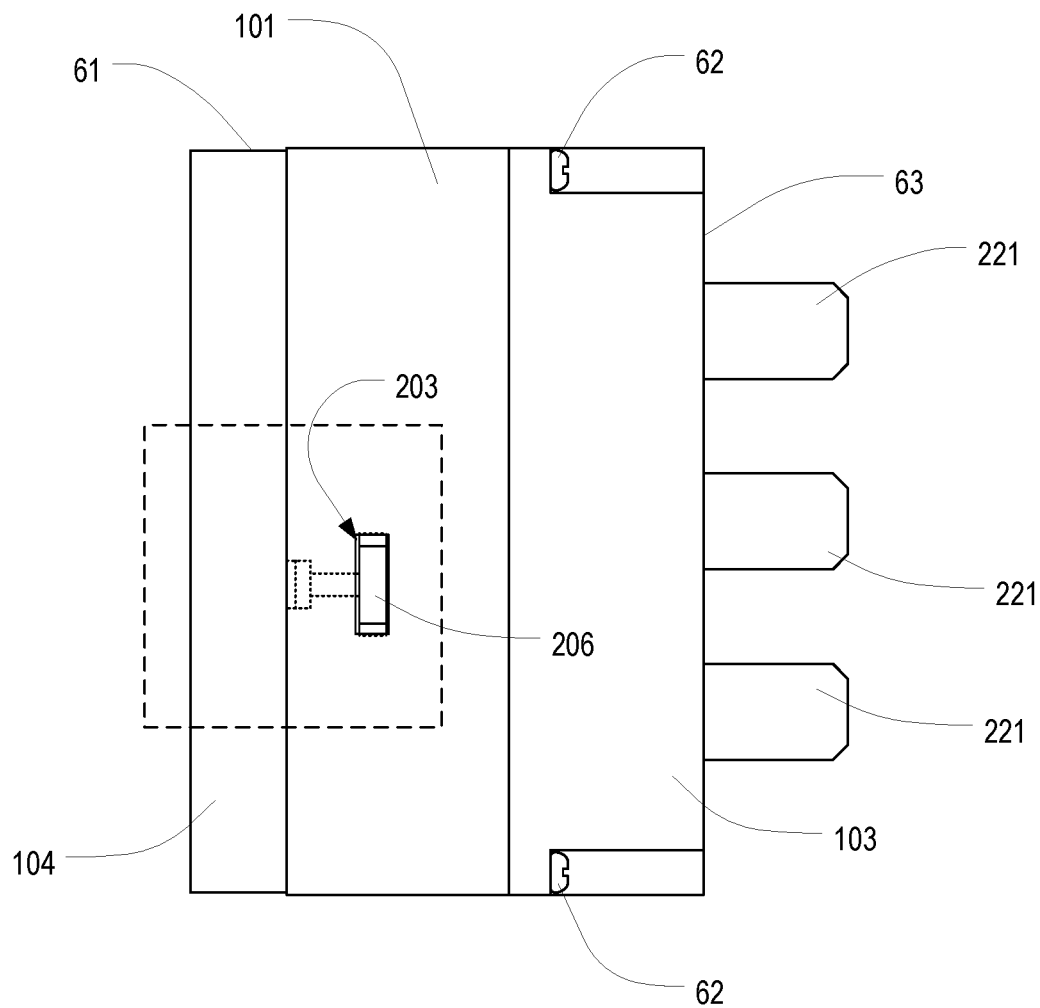
FIG. 14 is a right side view of the device module of FIG. 5.
Figure 15:
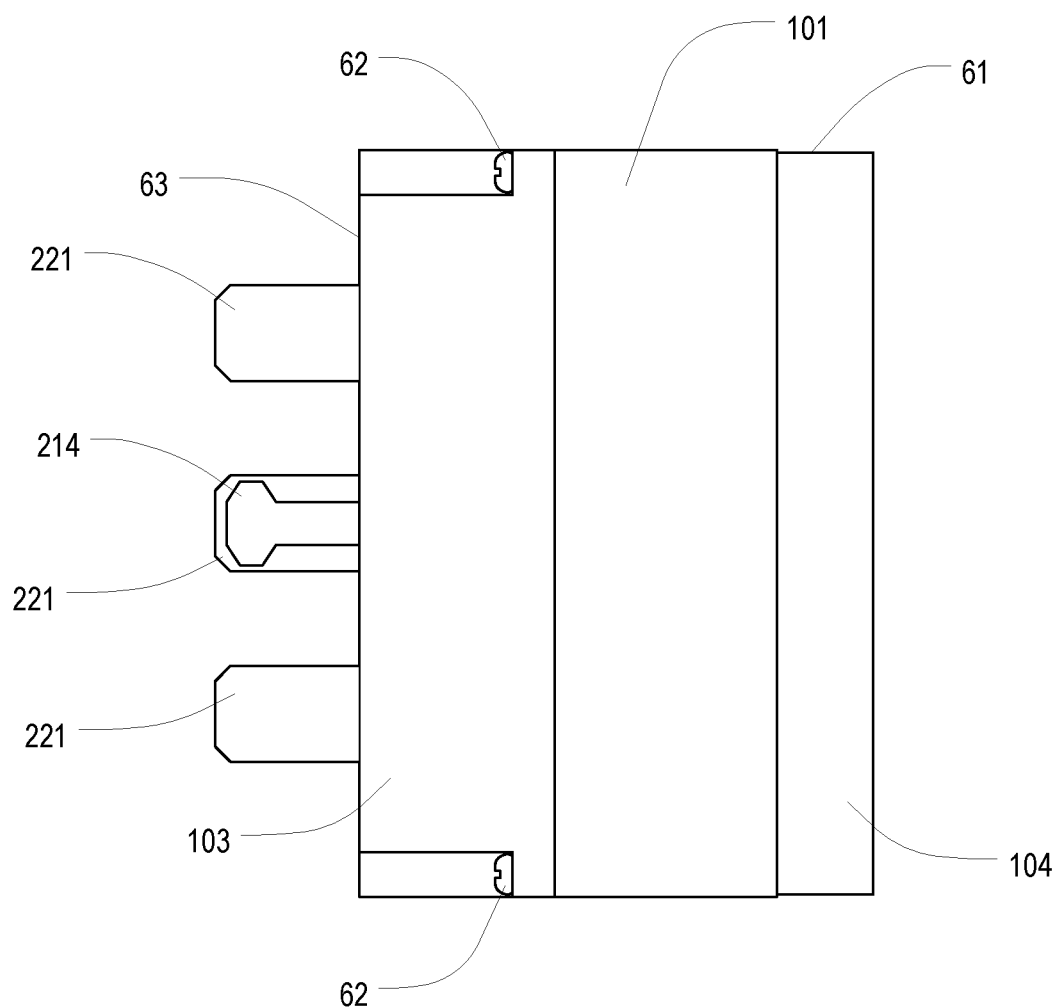
FIG. 15 is a left side view of the device module of FIG. 5.
Figure 16:
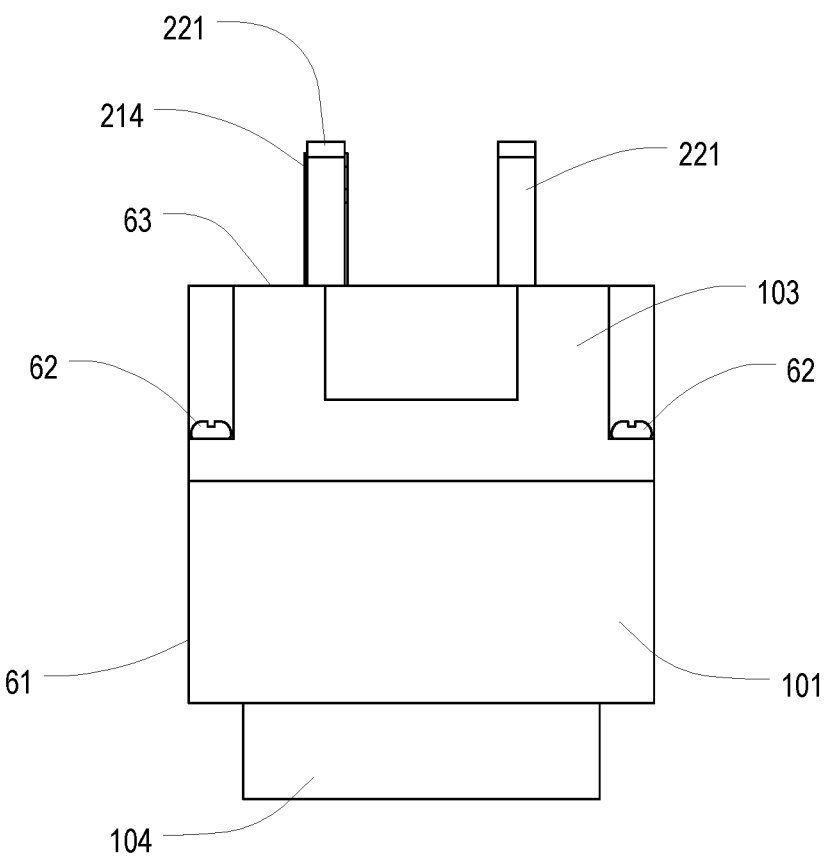
FIG. 16 is a top view of the device module of FIG. 5.

The base unit 40 may be installed in the junction box 12 as shown in FIGS. 9-12. First, several inches of the building wiring are withdrawn from the junction box 12 as shown in FIG. 9 and attached to the screw/plate electrical connections 210,211 as shown in FIG. 10. (Alternatively, in embodiments in which "backwire" or "back-stab" electrical connections are provided, the building wiring may be connected using those connections instead.) Notably, this process is very similar to the process of connecting building wiring to a conventional receptacle, and will thus be familiar to electricians and the like. With the wires attached, the base unit 40 may be forced into the junction box 12 by bending the wires as necessary until the base unit 40 may be attached to the box 12. In this regard, the front face 42 of the base unit 40 includes two pairs of apertures, each pair including an aperture at the top of the front face 42 and an aperture at the bottom thereof. These apertures are aligned with a pair of corresponding apertures in the junction box 12, which may be threaded or self-threading depending on the construction of the box 12, as shown in FIG. 11. Notably, the location and spacing of the apertures in the junction box 12 are standardized, and thus the corresponding pair of apertures in the base unit 40 utilize the same relative location and spacing. Thus, as shown in FIG. 12, the base unit 40 may be firmly mounted in the junction box 12 via a pair of conventional screws inserted through the appropriate apertures in the front face of the base unit 40 and threaded into the apertures in the junction box 12.

FIGS. 13, 14, 15, 16, 17, and 18 are a front view, a right side view, a left side view, a top view, a rear view, and an exploded orthogonal view, respectively, of the device module 201 of FIG. 5. As shown therein, the device module 201 includes a front unit 61 and a back unit 63 that are connected together via a plurality of screws 62. The front unit 61 includes a first housing portion or plate 101 that supports an electrical receptacle, a switch, a controller, or another user-facing circuit device 104. In the illustrated embodiment, the front housing portion 101 supports a standard duplex receptacle, but as will be further described herein, any of a wide variety of circuit devices may be substituted in place of such receptacle. (It is noted that the term outlet and receptacle may sometimes be used interchangeably herein.) The rear unit 63 includes a second housing portion or plate 103 that couples to the front housing portion 101 to define an internal compartment 64 that houses a second electrical interconnect assembly (not shown). The second electrical interconnect assembly provides appropriate electrical connections from the duplex receptacle or other device to two or more of a plurality of male electrical contacts 221 extending from the back of the rear unit. A latching boss 214 is also provided on the back of the rear unit 63. In at least some embodiments, the electrical contacts 221 are spade-type electrical contacts, but other types may additionally or alternatively be utilized, such as rectangular prongs like those used in the United Kingdom and Ireland, round posts, including "Schuko" prongs, like those used in many continental Europe countries, or the like.

Figure 17:
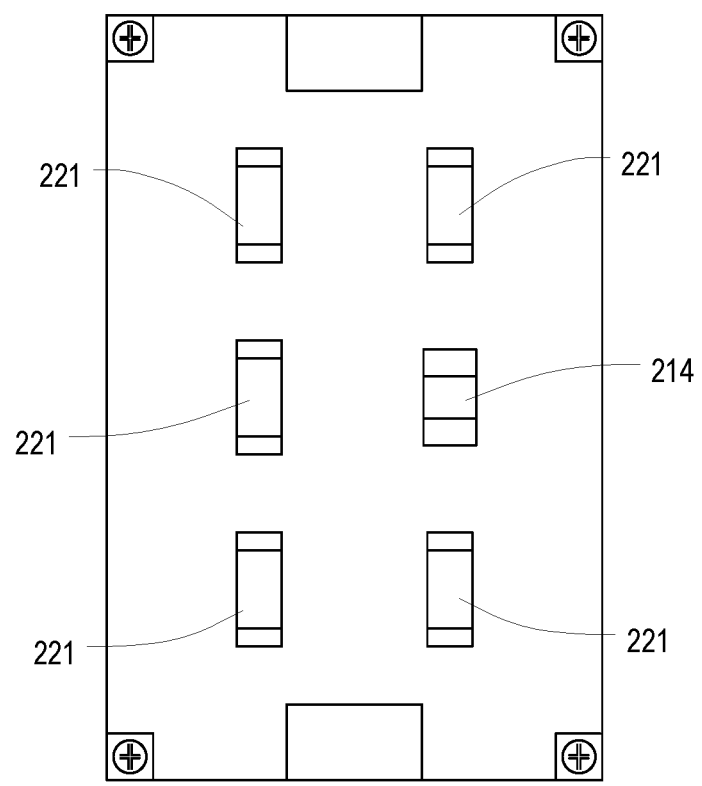
FIG. 17 is a rear view of the device module of FIG. 5.
Figure 18:
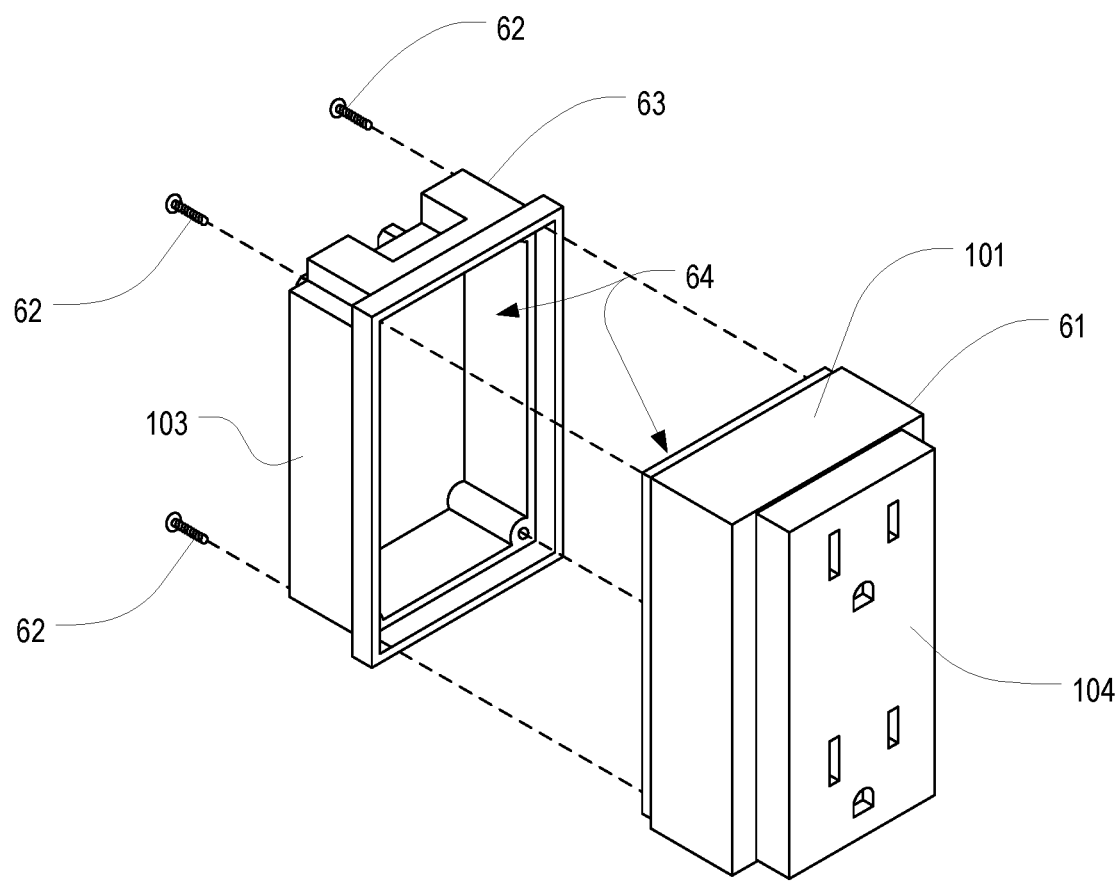
FIG. 18 is an exploded orthogonal view of the device module of FIG. 5.
Figure 19:
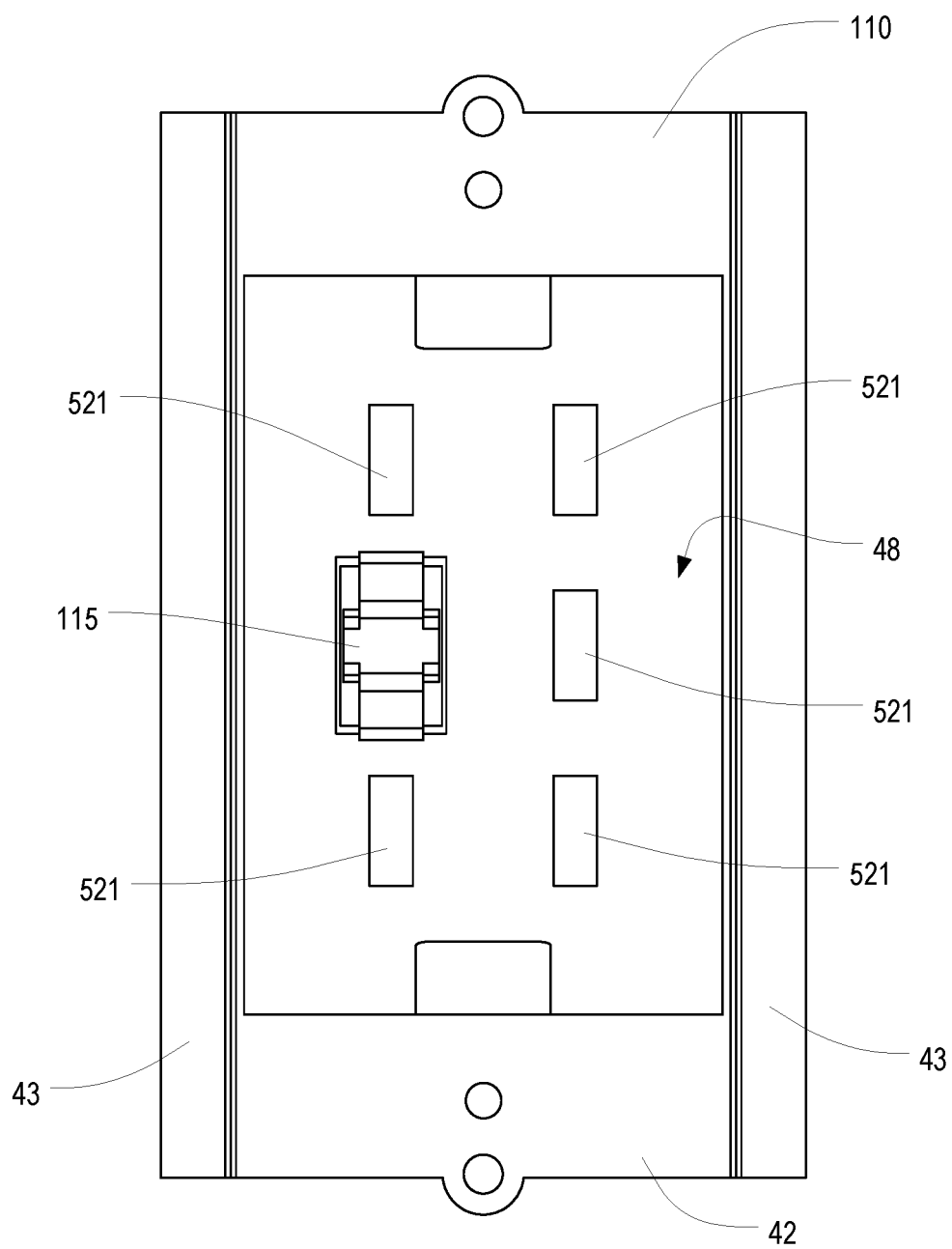
FIG. 19 is a front view of the base unit of FIG. 5.

The male electrical contacts 221 and latching boss 214 on the back of the rear unit 63 are all adapted to mate with corresponding structures in the base unit 40. More particularly, the first electrical interconnect assembly in the rear portion of the junction box liner 110 includes female contacts 521 that are arranged to receive the male contacts 221 through openings in the back of the main cavity 48 of the junction box liner 110. In this regard, FIG. 19 is a front view of the base unit 40 of FIG. 5. As shown in FIG. 17, a total of five male electrical contacts 221 are arranged around a single latching boss 214 on the back of the device module 201, while as shown in FIG. 19, five correspondingly-shaped and positioned female electrical contacts 521 are arranged around the latching mechanism 115. It will be appreciated, however, that in some embodiments, a larger or smaller number of electrical contacts are provided, and/or that one or more additional latching mechanisms may be provided. Furthermore, it will be appreciated that some alternative device modules may not have a male electrical contact for each of the female electrical contacts, depending on the needs of the particular electrical device provided therein, but a complete complement of female electrical contacts is preferably provided in case the device module is removed and replaced with a different device that utilizes all of the female electrical contacts.

The layout, orientation, dimensions, and/or other features of the female electrical contacts, such as those shown in FIG. 19, are not intended to receive conventional electrical "plugs," such as those compatible with International Electrotechnical Commission (IEC) standards, and in at least some embodiments are intentionally different from all IEC standard connectors so as to avoid confusion or accidental connectivity. However, in order to promote interchangeability between different circuit devices, it may be preferred for a set of standards to be developed for the male and female electrical contacts. Such standard may be a universal standard utilized by multiple manufacturers, or it may be a manufacturer-specific standard. Furthermore, it will be appreciated that in some embodiments, the arrangement of male and female contacts may be "keyed" such that circuit devices with significantly different electrical requirements may only be used with junction box liners that can support such devices. For example, 15 amp devices may be keyed differently from 20 amp devices, switches and other switch-like controllers may be keyed differently from receptacles, 2-way switches may be keyed differently from 3-way switches, and the like. For example, a simple 2-way switch requires only three male/female connections and thus may require only three female electrical contacts 521, while a 3-way switch requires an additional male/female connection. In some embodiments, a "dummy," non-electrical tab may be provided in place of a male electrical contact for keying purposes.

Figure 20:
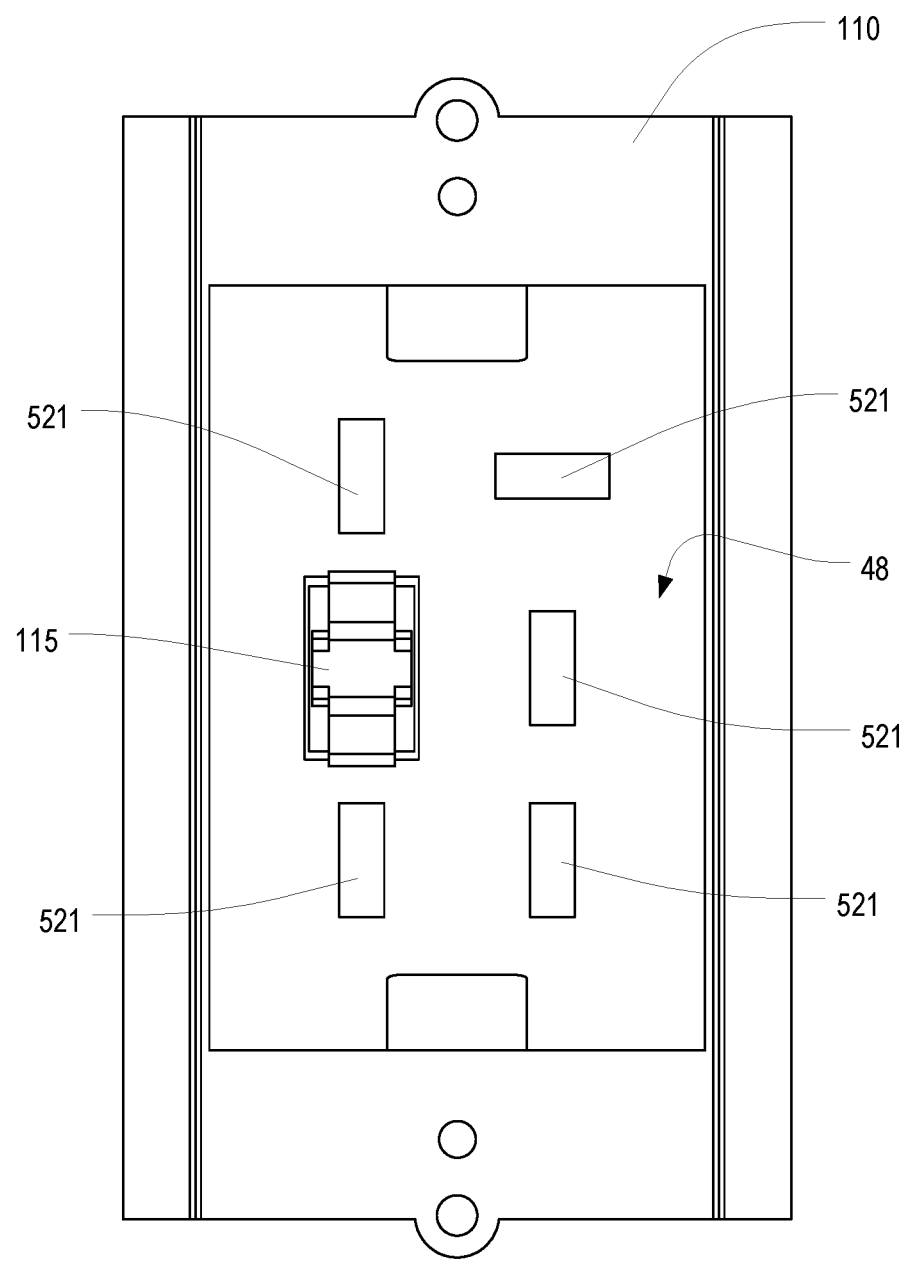
FIGS. 20-22 are front views of three alternative base units for use in an electrical junction box in accordance with one or more preferred embodiments of the present invention.
Figure 21:
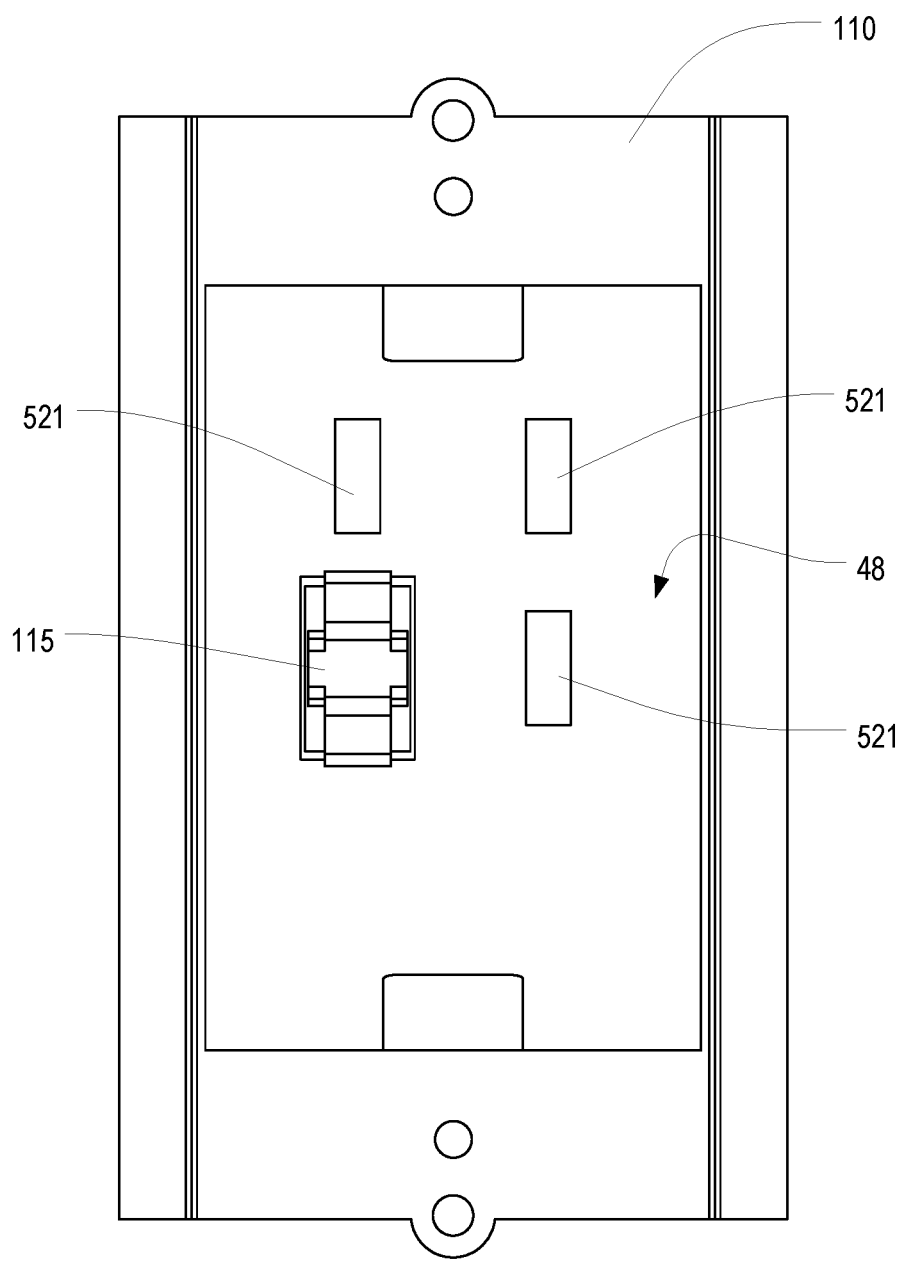
Figure 22:
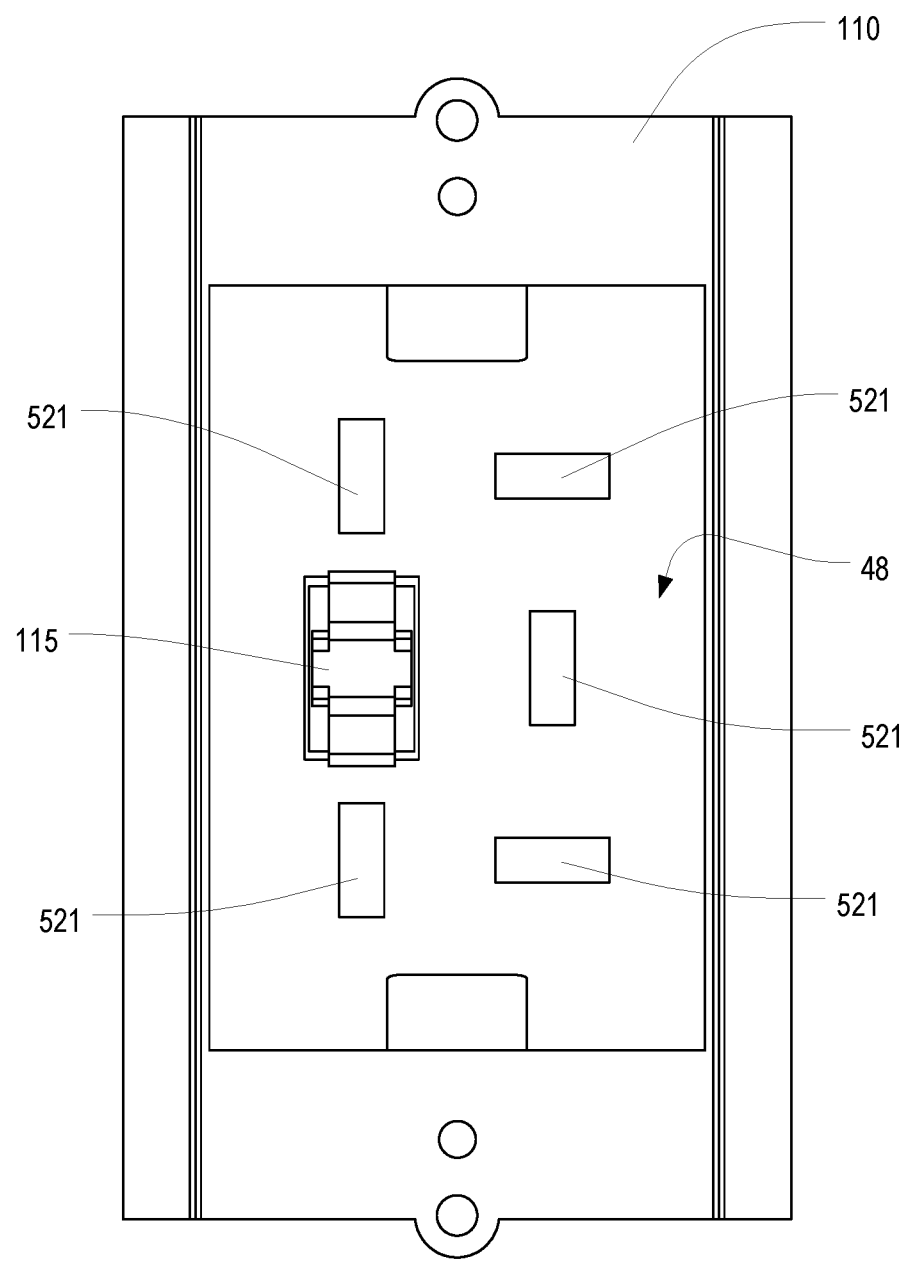

In this regard, FIGS. 20, 21, and 22 are front views of three alternative base units 40 for use in an electrical junction box 12 in accordance with one or more preferred embodiments of the present invention. The different configurations of female electrical contacts 521 in the liners 110 ensure that only circuit devices that are appropriate for a particular base unit 40 may be inserted into the base unit's liner. Notably, in at least some embodiments, each of base units 40 also includes an opening for the latching mechanism 115.

Figure 23:
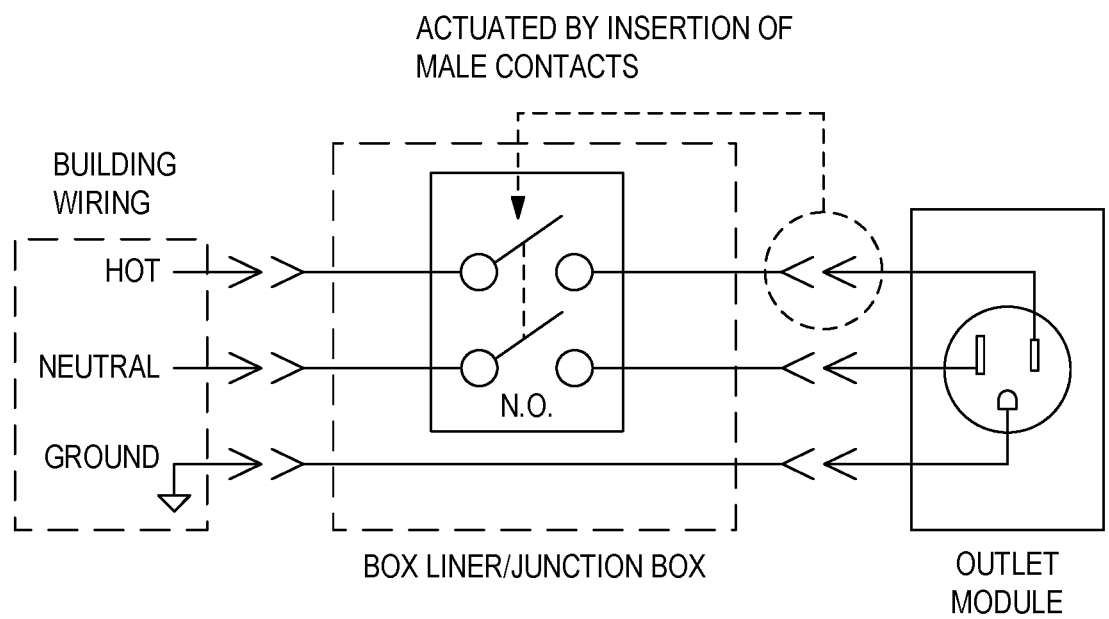
FIG. 23 is a circuit diagram illustrating one means for disabling or de-energizing female electrical contacts when not in use.

In at least some embodiments, the electrical interconnect assembly of the base unit 40 includes a circuit interrupter, and means for controlling the circuit interrupter are provided to disable or de-energize the female electrical contacts 521 when a device module 201 is not plugged in. In some embodiments, all female electrical contacts 521 are de-energized when no device module 201 is installed. In some embodiments, when the device module 201 only has male electrical contacts 221 for a subset of the female electrical contacts 521, and some female electrical contacts 521 are thus unused when a device module 201 is plugged in, then the unused female electrical contacts 521 are disabled or de-energized while the female electrical contacts 521 that are being used are enabled or energized. FIG. 23 is a circuit diagram illustrating one means for disabling or de-energizing female electrical contacts 521 when not in used. The insertion of a device module 201 into a junction box liner 110 deactivates the circuit interrupter by controlling a normally open switch, thereby allowing electric current to flow to the female electrical contacts 521. This may be carried out, for example, via one of the male electrical contacts 221, which has the advantage of rendering the device module 201 inoperable if the contact 221 is broken off. However, in some embodiments, deactivation may be carried out via the latching mechanism 115 or via a separate mechanical tab, photosensor, Hall effect sensor, or the like (not shown). Such a feature helps prevent a person, animal, conductive material, or the like from inadvertently coming in contact with a live electrical contact. Alternatively or additionally, a mechanical shutter (not shown), triggered by mechanical, optical, or other means, may be provided to physically cover the female electrical contacts when not in use.

Figure 24:
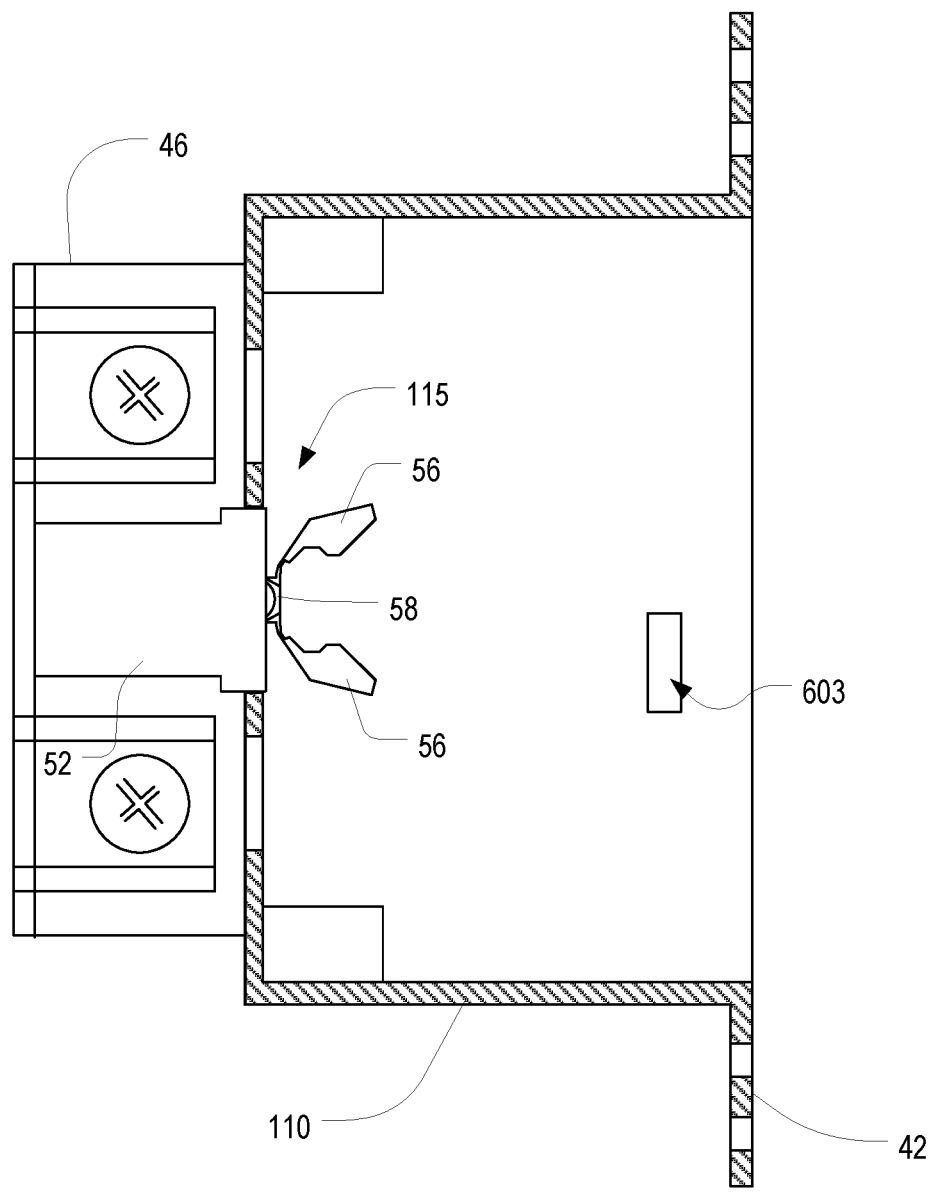
FIG. 24 is a partially schematic side view of the base unit showing the latching mechanism in an unlatched state.
Figure 25:
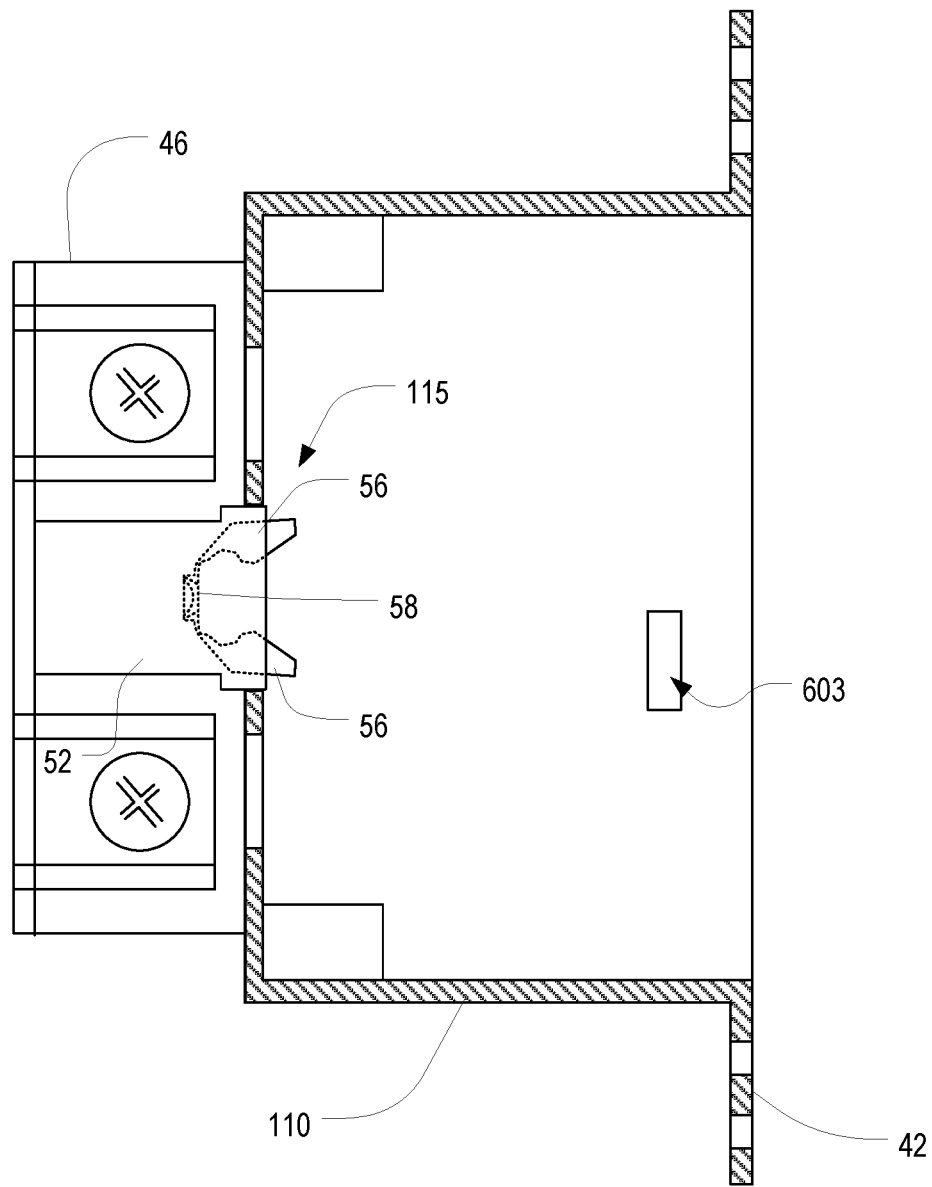
FIG. 25 is a partially schematic side view of the base unit showing the latching mechanism in a latched state.

The female contacts 521 are preferably arranged such that once the male contacts 221 are inserted into the female contacts, they are frictionally retained therein. However, the latching mechanism 115 interoperates with the latching boss 214 on the back of the device module 201 to help prevent the device module 201 from being removed accidentally. In this regard, FIGS. 24 and 25 are partially schematic side views of the base unit 40 showing the latching mechanism 115 in an unlatched and a latched state, respectively. The latching mechanism can take a variety of forms, but the particular latching mechanism that is illustrated herein is a simple, spring-loaded "push-push" or "push to click" type of latching and releasing mechanism wherein pushing it once causes it to unlatch, with the jaws of the mechanism opening as shown in FIG. 24, and pushing it a second time causes the jaws to close as shown in FIG. 25. With reference to FIG. 6, the illustrated mechanism 115 includes a case 52 housing a spring 54, a pair of attachment arms 56, and supporting mechanism 58. The spring 54 biases the supporting mechanism 58 and attachment arms 56 outward. In the unlatched state, shown in FIG. 24, the attachment arms 56 are open/spread apart and extend well into the cavity 48, while in the latched state, shown in FIG. 25, the attachment arms 56 are closed together and withdrawn back into the case 52. This type of latching mechanism requires very low insertion forces while providing a secure latch and does so without requiring any special tools.

Figure 26:
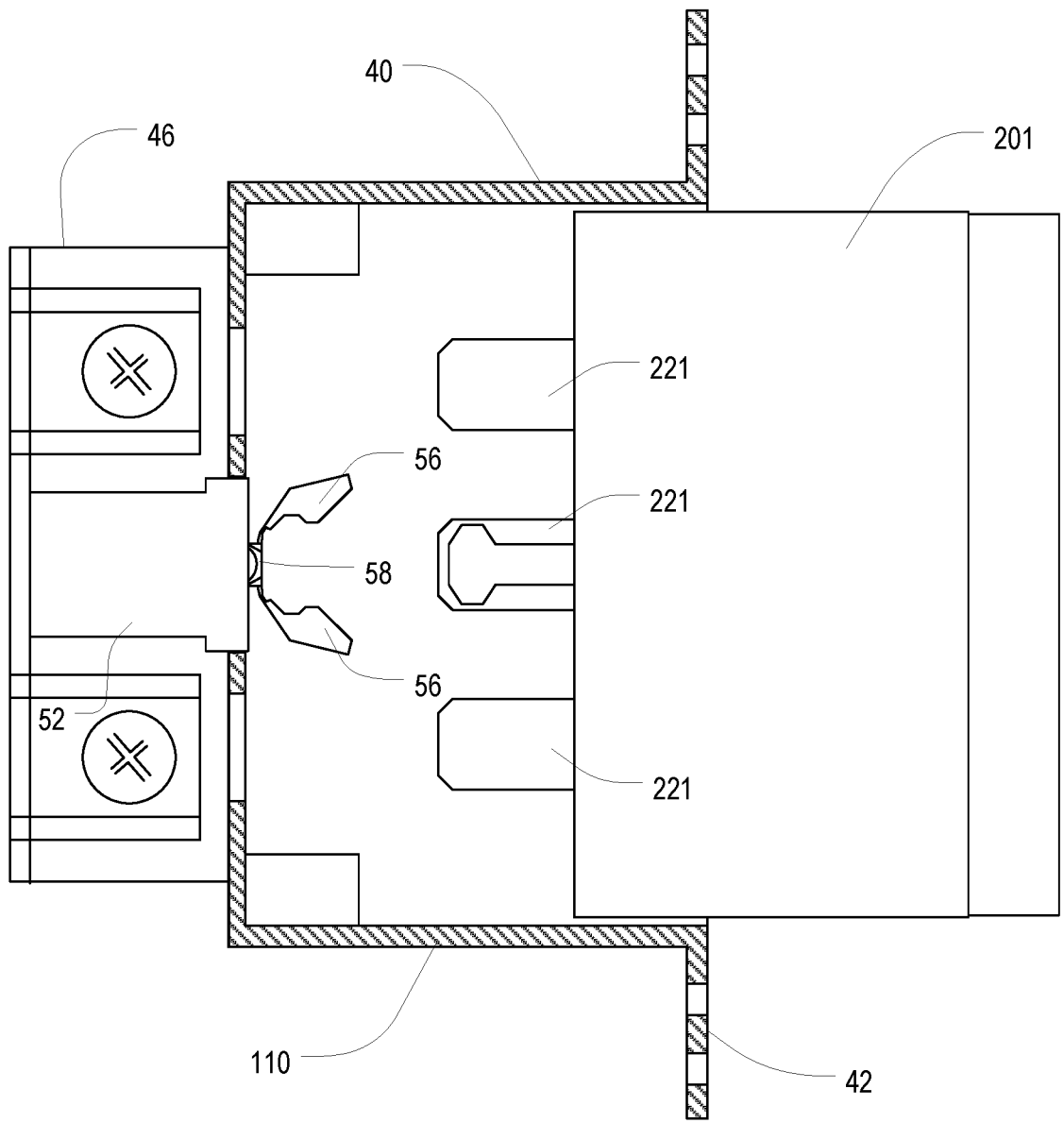
FIGS. 26-30 are partially schematic side views of a device module being installed into the base unit of FIGS. 24 and 25.
Figure 27:
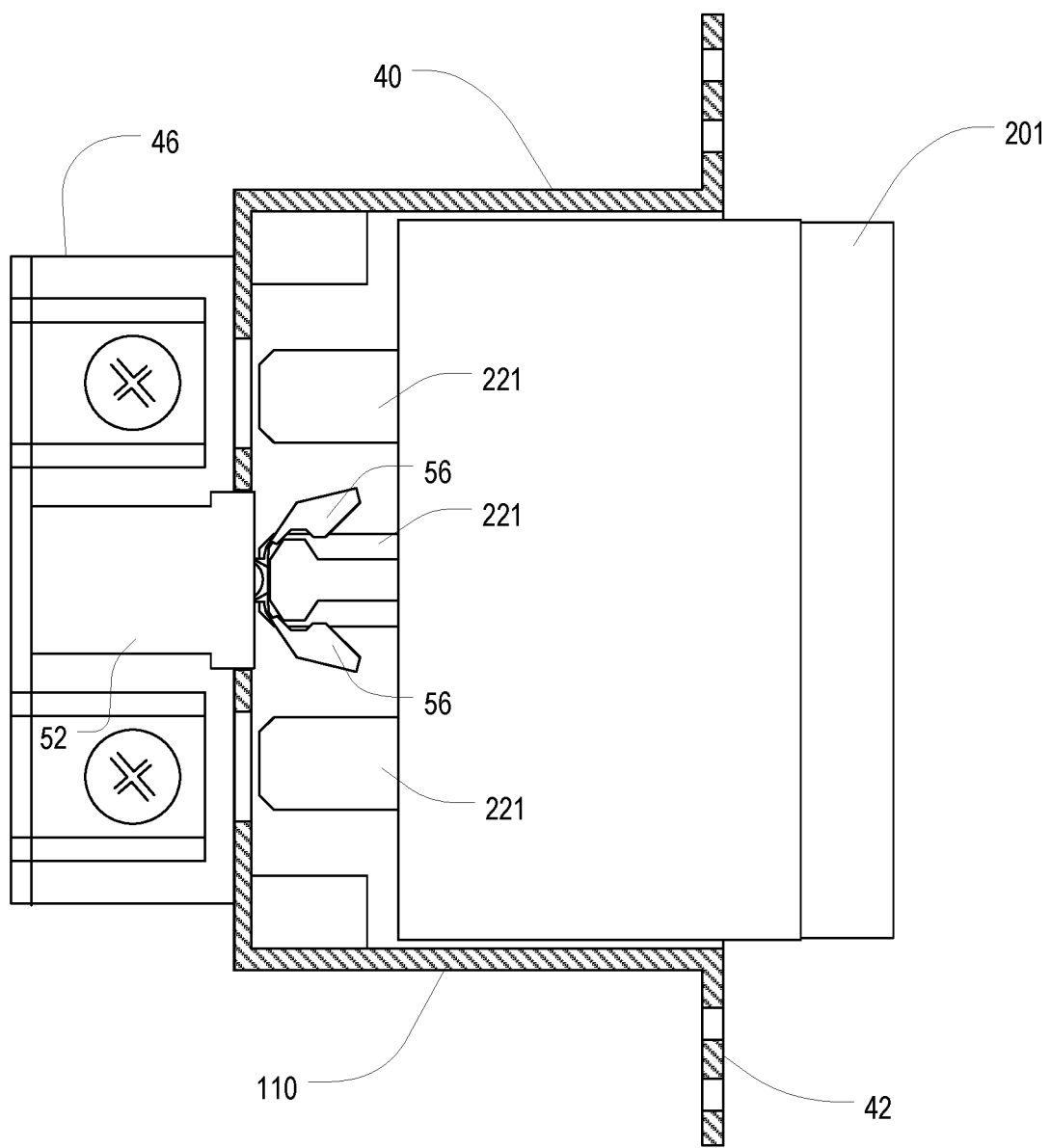
Figure 28:
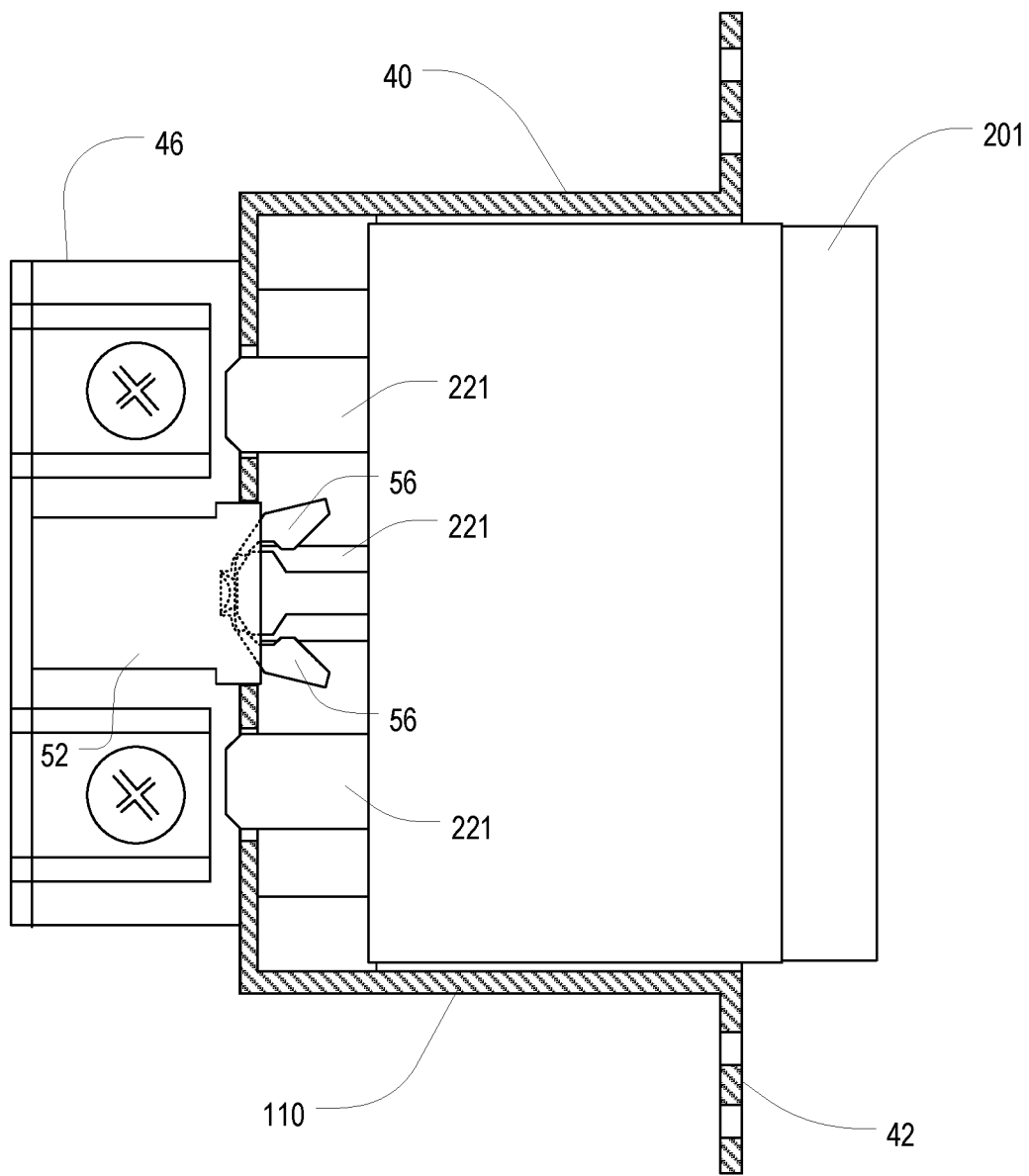

The device module 201 is installed into the base unit 40 as shown schematically in FIGS. 26-30. First, the device module 201 is oriented such that the male electrical contacts 221 and latching boss 214 match the orientation of the female electrical contacts 521 and latching mechanism 115 in the base unit 40. Next, the device module 201 is aligned with the main cavity 48 of the base unit 40 and inserted therein, as shown in FIG. 26. When inserted deeply enough, the latching boss 214 slides between the attachment arms 56 and presses against the supporting mechanism 58, as shown in FIG. 27. Continued movement pushes the supporting mechanism 58 back into the case 52, as shown in FIG. 28, and the male electrical contacts 221 begin sliding into the female electrical contacts (omitted for clarity), which establishes a frictional coupling, and an electrical connection, therebetween. When the latching boss 214 pushes deep enough, the walls of the case cause the attachment arms 56 to begin to close around the latching boss 214.

Figure 29:
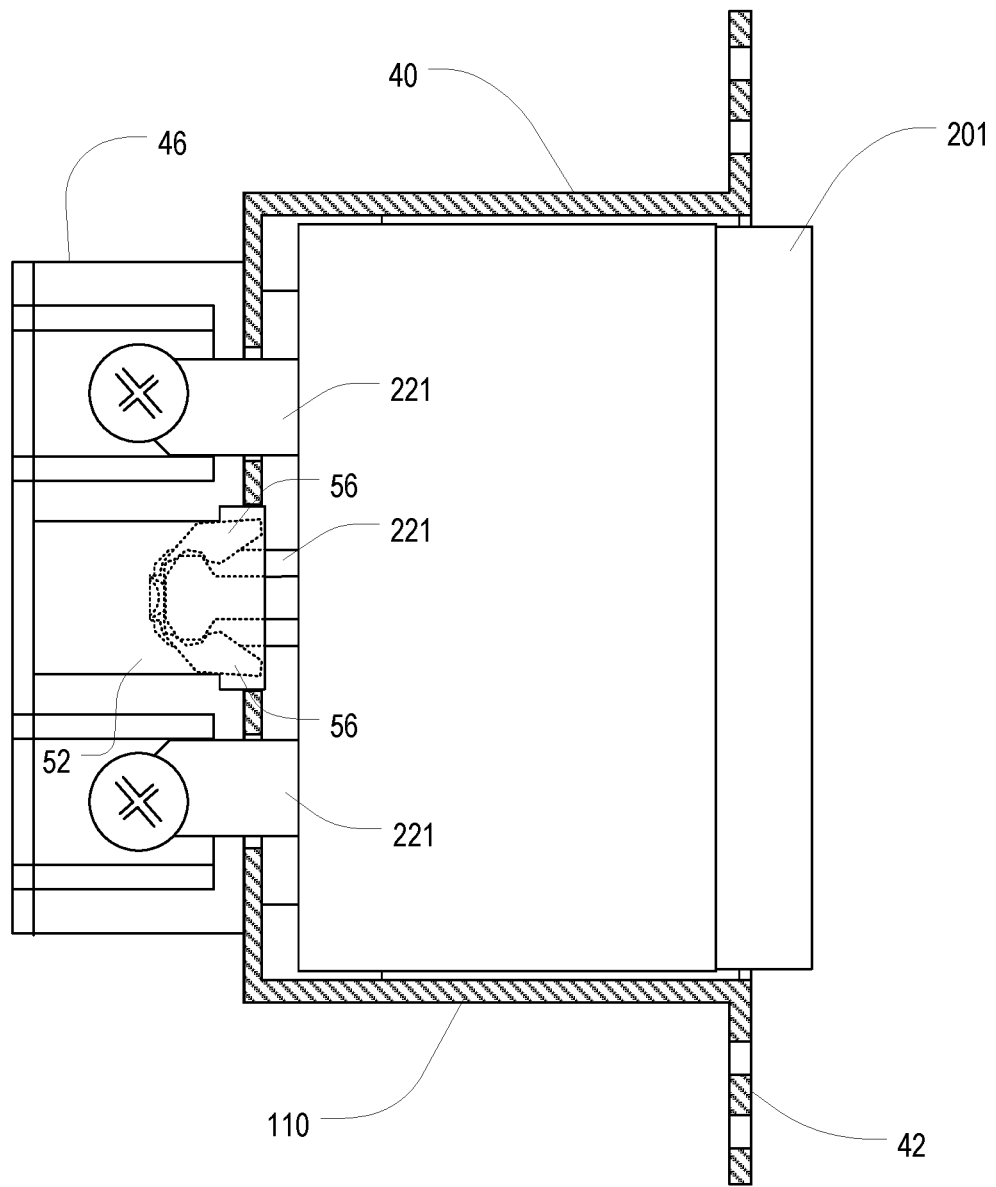
Figure 30:
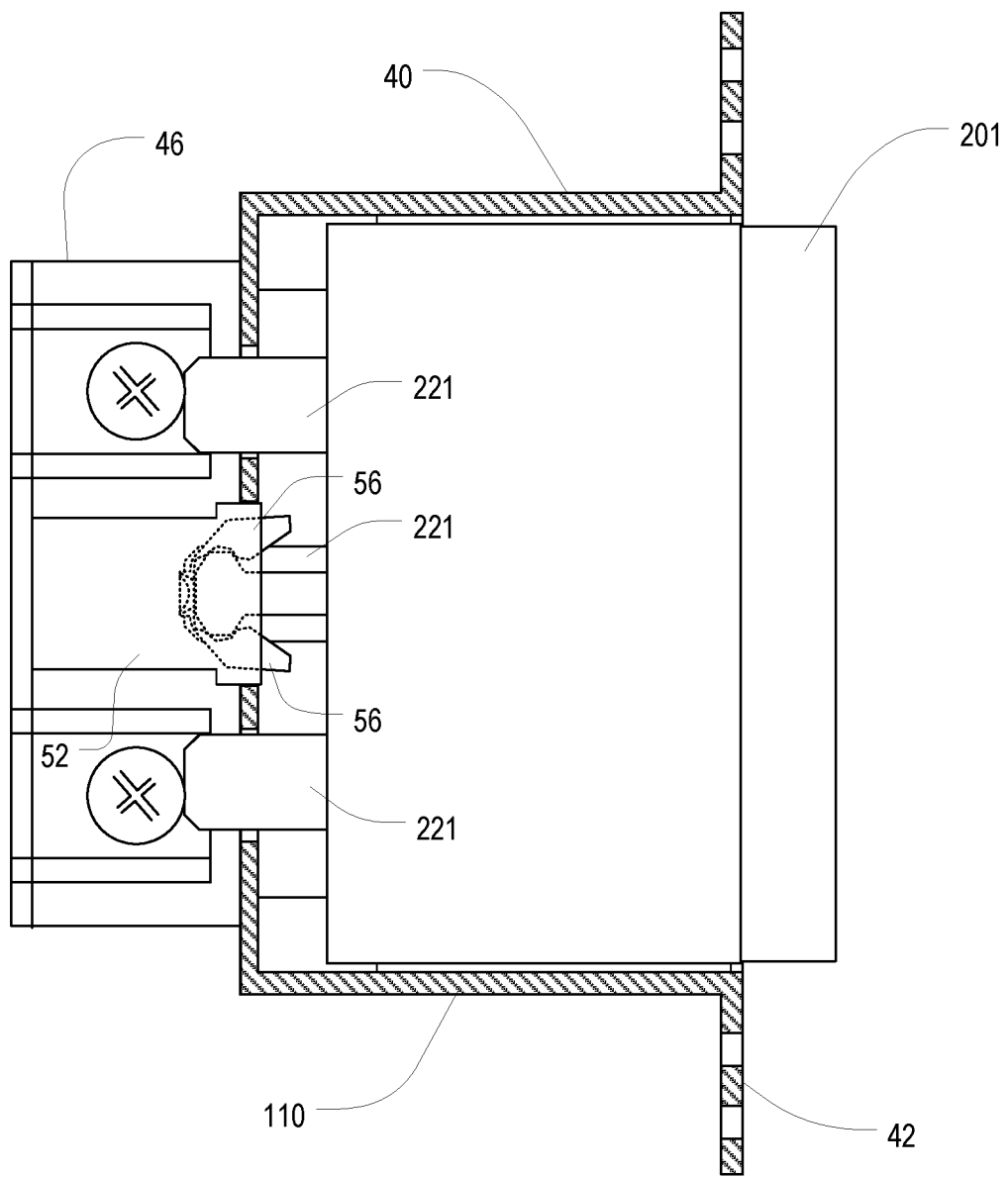

When the supporting mechanism 58 is depressed sufficiently, the latching mechanism 115 engages such that the supporting mechanism 58 is held in place, which in turn causes the attachment arms 56 to remain closed around the latching boss 214, as shown in FIG. 29. At that point, the mechanism 58 preferably pops back out slightly as shown in FIG. 30 so as to enable the push-to-release function. In this latched state, the male electrical contacts 221 are seated within the female electrical contacts (omitted for clarity) such that safe, reliable electrical connections are established therebetween, while at the same time the device module 201 cannot be withdrawn from base unit 40. The device module 201 can only be removed by first depressing the unit 201 slightly, as shown in FIG. 29, which causes the latching mechanism 115 to disengage and allows the attachment arms 56 and supporting mechanism 58 to be withdrawn from the base unit 40. At that point, a user may withdraw the device module 201 from the base unit 40 by applying a pulling force that is sufficient to overcome the frictional connection between the male and female electrical contacts. The pulling force is also applied to the interior of the attachment arms 56 by the latching boss 214, and this force, in conjunction with the bias of the spring 54 (omitted for clarity) forces the attachment arms 56 and supporting mechanism 58 outward until the attachment arms 56 are freed from the interior of the case 52 and can be spread apart sufficiently to allow the latching boss 214 to be fully withdrawn therefrom. At that point, the device module 201 may be fully withdrawn from the base unit 40.

Figure 31:
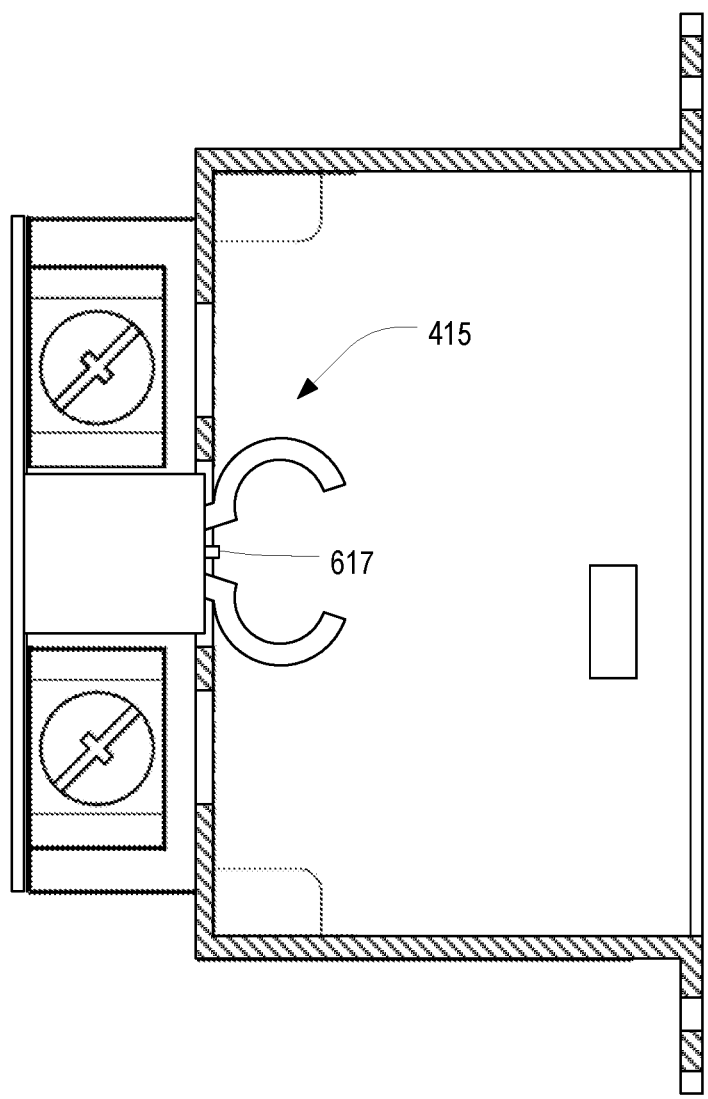
FIG. 31 is a partially schematic side view of a base unit having an alternative latching mechanism in an unlatched state.
Figure 32:
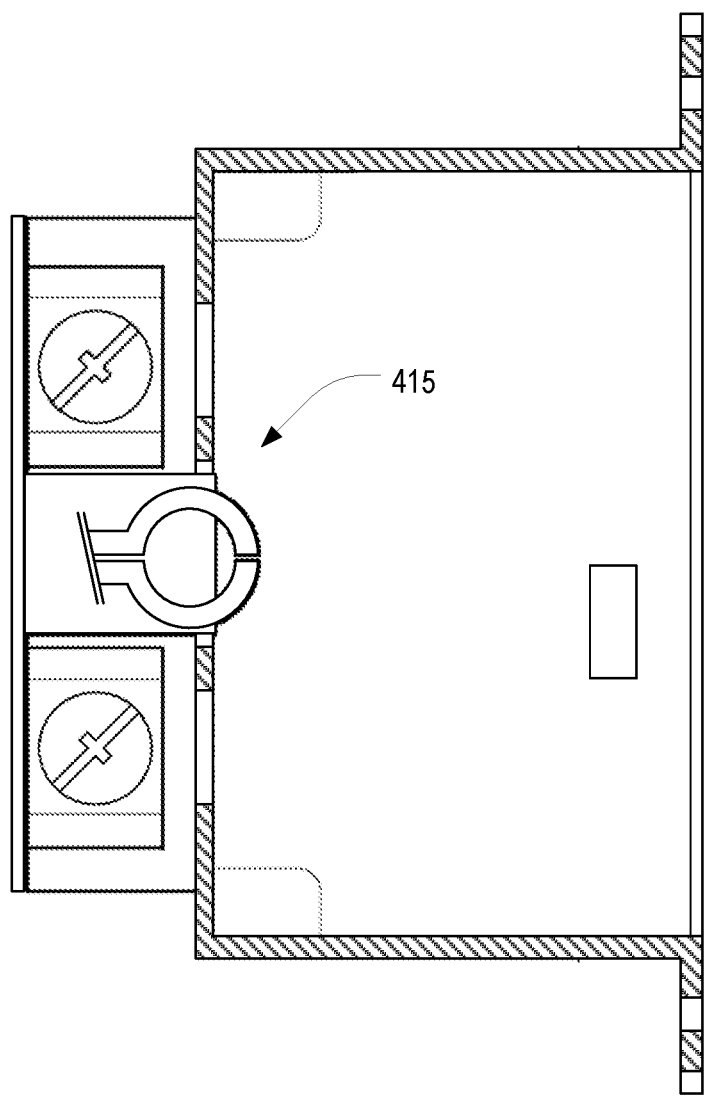
FIG. 32 is a partially schematic side view of a base unit having an alternative latching mechanism in a latched state.
Figure 33:
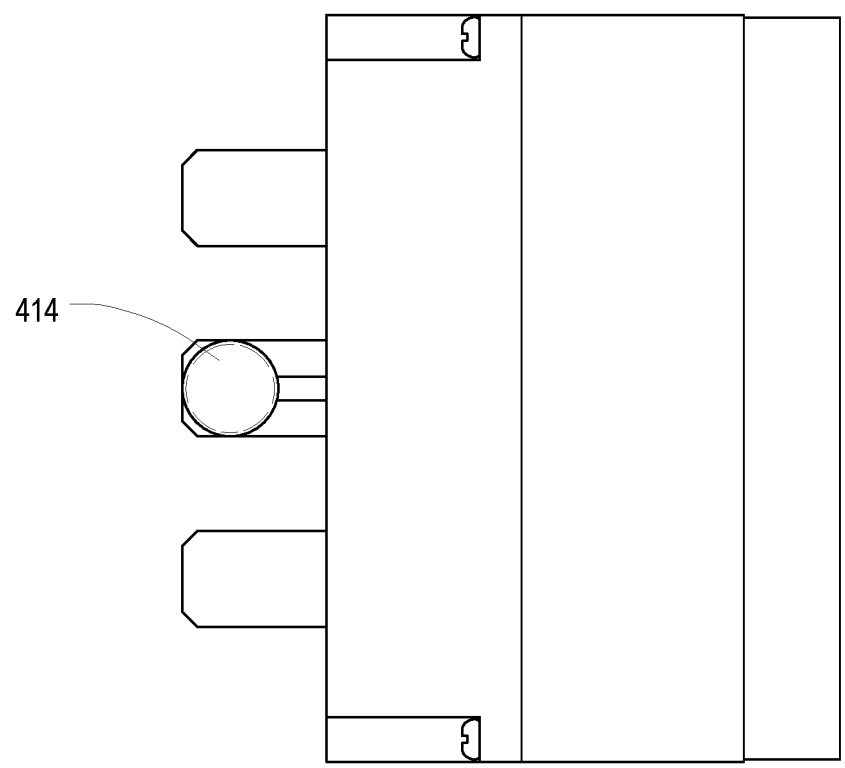
FIG. 33 is a left side view of a device module having an alternative latching boss.
Figure 34:
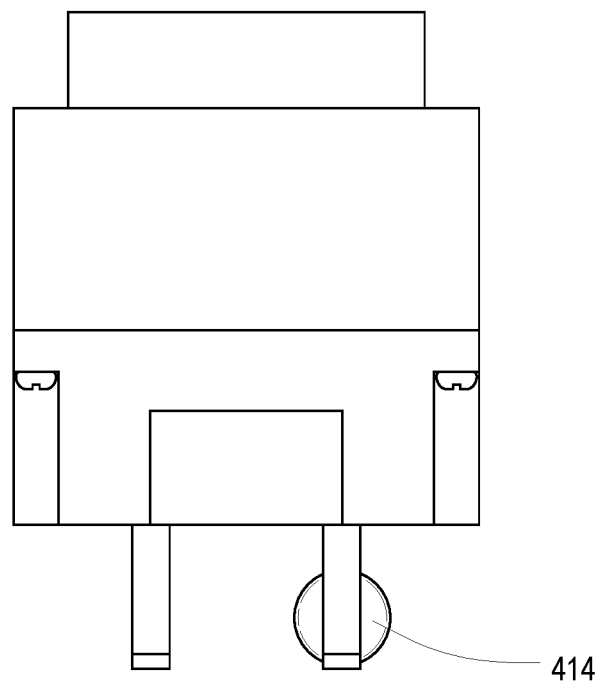
FIG. 34 is a top view of the device module of FIG. 33.

The particular structure and operation of a suitable latching mechanism and corresponding latching boss, or other coupling structures, may vary without departing from the scope of the present invention. For example, FIGS. 31 and 32 are partially schematic side views of a base unit 440 having an alternative latching mechanism 415 in an unlatched and a latched state, respectively, and FIGS. 33 and 34 are a left side view and a top view, respectively, of a device module 401 having an alternative latching boss 414. More particularly, the latching boss 414 of FIGS. 33 and 34 is generally spherical, and the latching mechanism 415 of FIGS. 31 and 32 is adapted to receive and retain the spherical latching boss 414. A trigger 617 may be provided for the latching mechanism 415. Operation of such latching mechanism 415 and latching boss 414 may be functionally similar to that of the previously-described latching mechanism 115 and boss 114. Of course, other latching mechanisms may alternatively be utilized instead without departing from the scope of the present invention.

Figure 35:
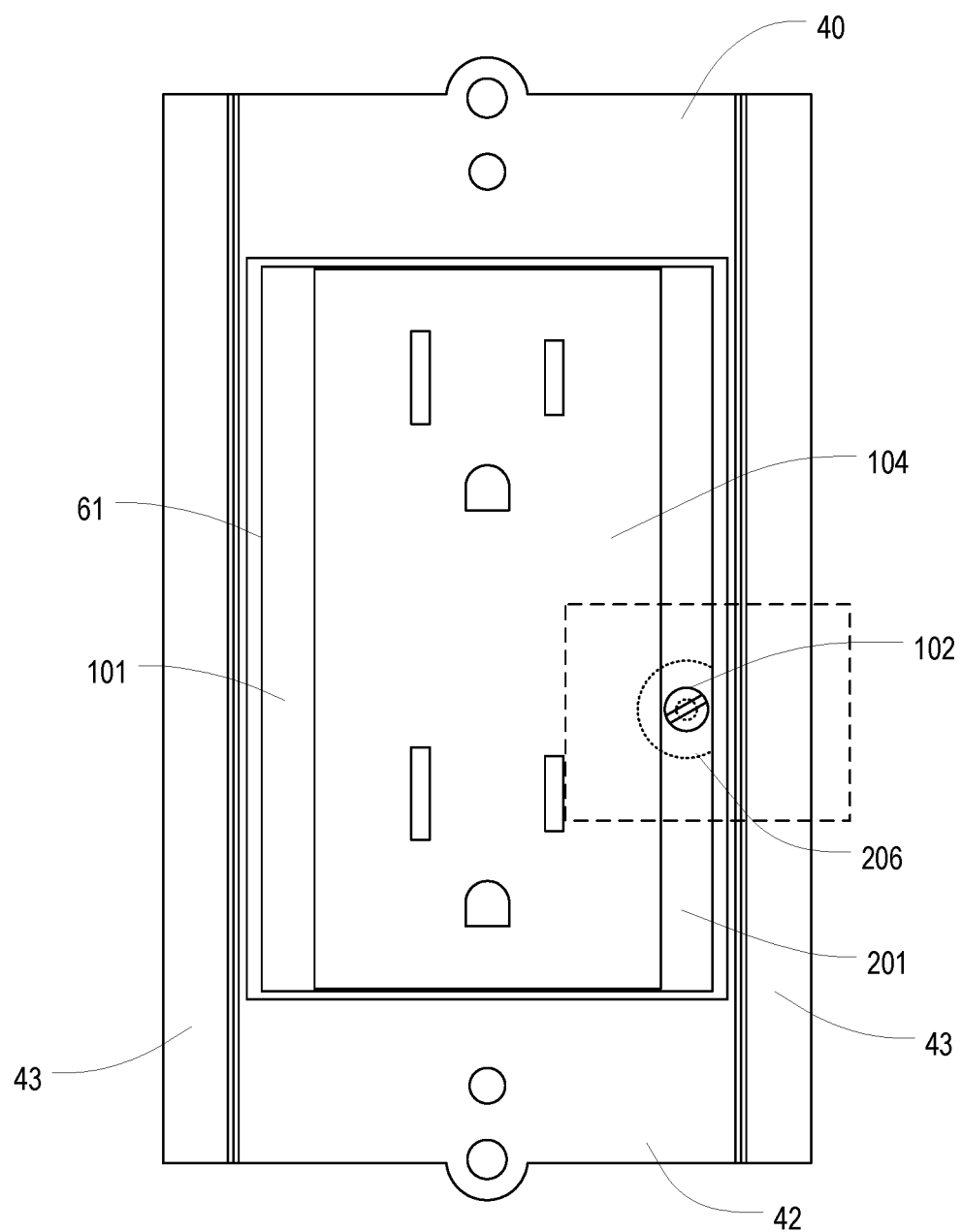
FIG. 35 is a partially schematic front view of the modular circuit device unit of FIG. 3.
Figure 36:
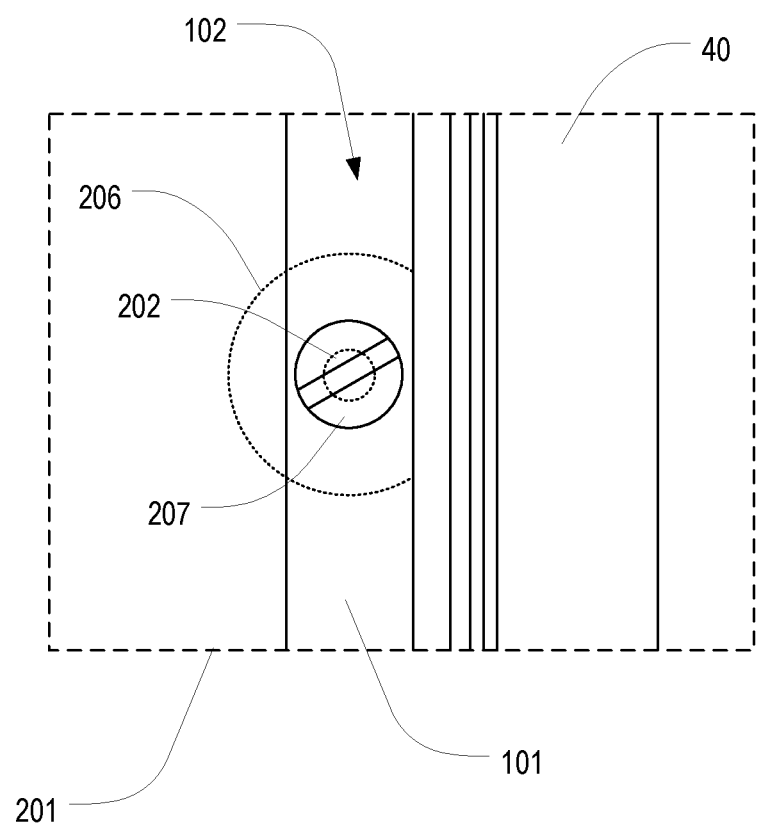
FIG. 36 is an enlarged, fragmentary, partially schematic, front view of a portion of the modular circuit device unit of FIG. 35.
Figure 37:
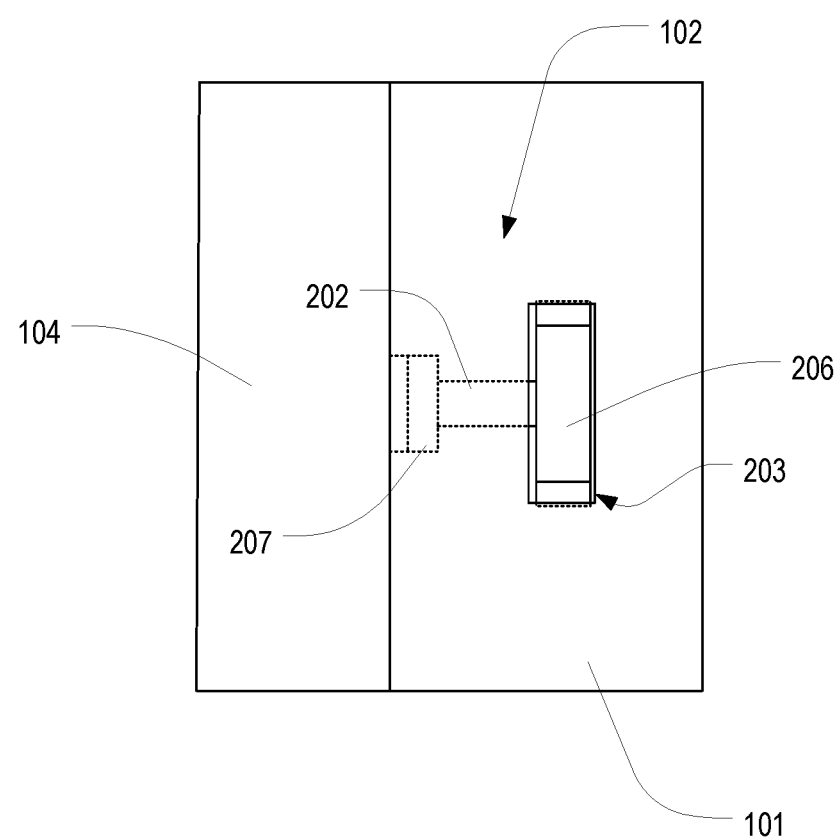
FIG. 37 is an enlarged, fragmentary, partially schematic, side view of a portion of the device module of FIG. 33.
Figure 38:
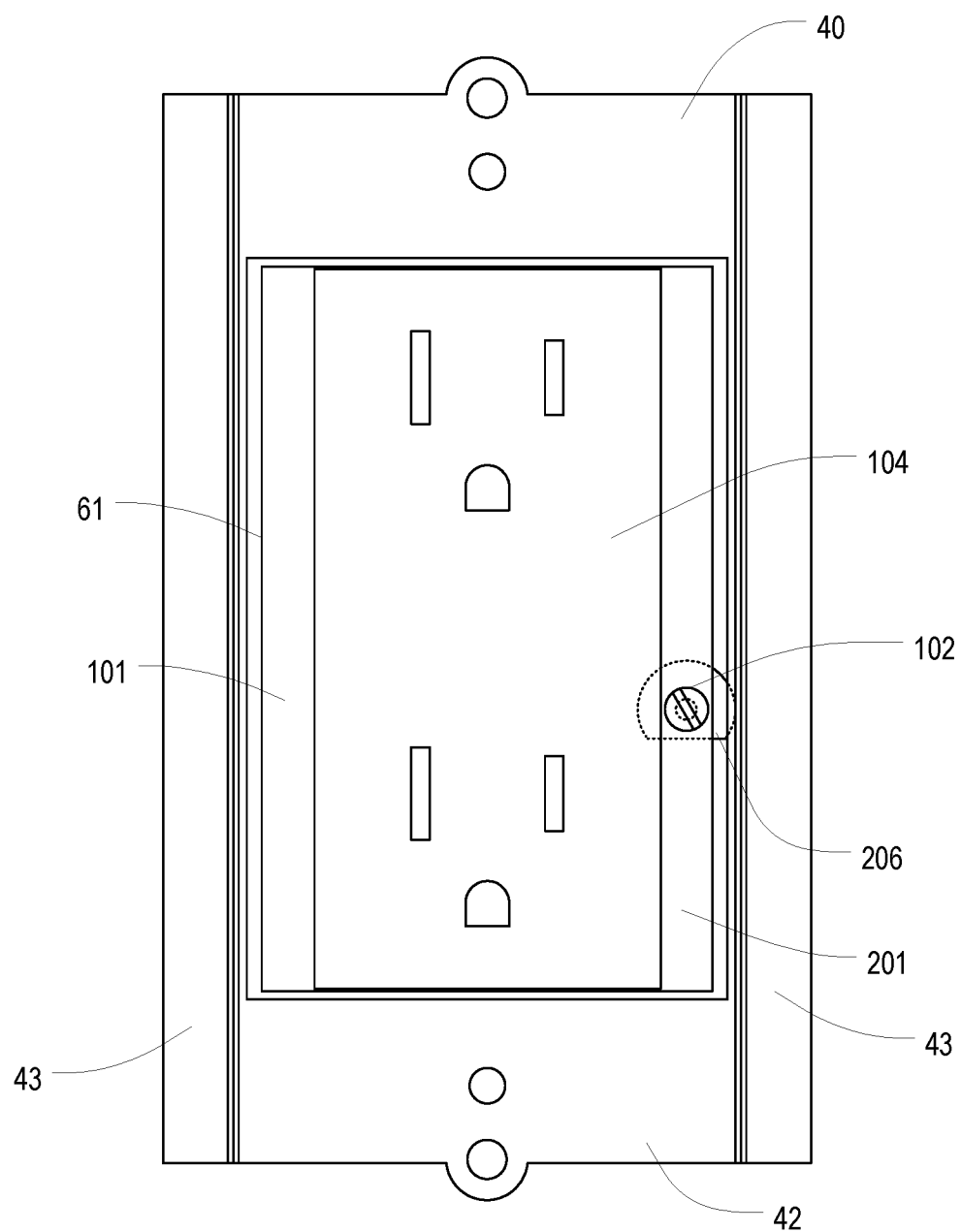
FIG. 38 is a partially schematic front view of the modular circuit device unit of FIG. 35, shown with the cam in a rotated state.

In various embodiments, an additional or alternative mechanism may be provided in order to ensure that the device module 201 is not accidentally removed from the base unit 40. In this regard, FIGS. 35 and 36 are a partially schematic front view and an enlarged, fragmentary, partially schematic, front view of a portion of the modular circuit device unit 30 of FIG. 3. As shown therein, the illustrated modular circuit device unit 30 includes a manual camming mechanism 102 for locking the device module 201 in place in the base unit 40. Elements of the camming mechanism 102 are perhaps better illustrated in FIG. 37, which is an enlarged, fragmentary, partially schematic, side view of a portion of the device module 201 of FIG. 33. The camming mechanism 102 includes a cam 206 tucked into a side of the device module 201. A rotatable shaft 202 extends from a central area of the cam 206 toward the front face of the housing 101, with a shaft head 207 being accessible through an opening in the front face. The shaft 202 may be a screw, or it may be a purpose-designed structure. In the illustrated embodiment, the shaft head is similar to a slotted screw head and is located in a countersunk recess, but in other embodiments the head has the same cross-section as the shaft and/or may protrude beyond the front face. The cam 206 is positioned such that rotation by about a quarter-turn causes it to extend through a rectangular slot or other opening 203 in the side of the housing 101. Furthermore, when the device module 201 is installed in the base unit 40, the cam 206 and the rectangular opening 203 in the side of the housing 101 are both aligned with a second rectangular slot or other opening 603 in the side of the junction box liner 110. Thus, when the device module 201 is installed in the base unit 40 and the shaft 202 is rotated, using a screwdriver or the like, the cam 206 is likewise rotated such that it extends out through the first opening 203, in the side of the device module 201, and into the second opening 603 in the side of the junction box liner 110. In this regard, FIG. 38 is a partially schematic front view of the modular circuit device unit 30 of FIG. 35, shown with the cam 206 in a rotated state. Once the cam 206 has been positioned as illustrated, the device module 201 cannot be removed until the cam 206 is withdrawn back into the side thereof. The unit 201 can thus be locked in place with a partial turn of the shaft head, which can be operated with a common screwdriver. Notably, for installations were security might be an issue, such as a hospital, hotel, or other commercial installation, a less common interface can be used such as a TORX®, security TORX®, polydrive, or the like.

Preferably, the cam 206 is wedge-shaped such that the farther the cam 206 is moved into the opening 603, the thicker the cam 206 is, and the cam 206 is eventually wedged by friction into the opening 603. It will also be appreciated that a locking mechanism other than the illustrated camming mechanism 102 may be utilized, and that other mating elements may be utilized. For example, a locking mechanism could include a sliding body that may be moved laterally from the side of the device module 201 into the opening 603 in the side of the junction box liner 110. As with the cam 206, such a sliding body is preferably wedge-shaped such that the farther the body is moved into the opening 603, the thicker the body is, and the body is eventually wedged by friction into the opening 603. Also, in the illustrated embodiment, both the latching mechanism 115 and the locking camming mechanism 102 are utilized to prevent the device module 201 from being removed. However, in some embodiments, only the latching mechanism 115 is utilized, while in other embodiments, only the camming mechanism 102 is utilized, while in still other embodiments, other latching or locking mechanisms are additionally or alternatively utilized to retain the device module 201 in the base unit 40.

Figure 39:
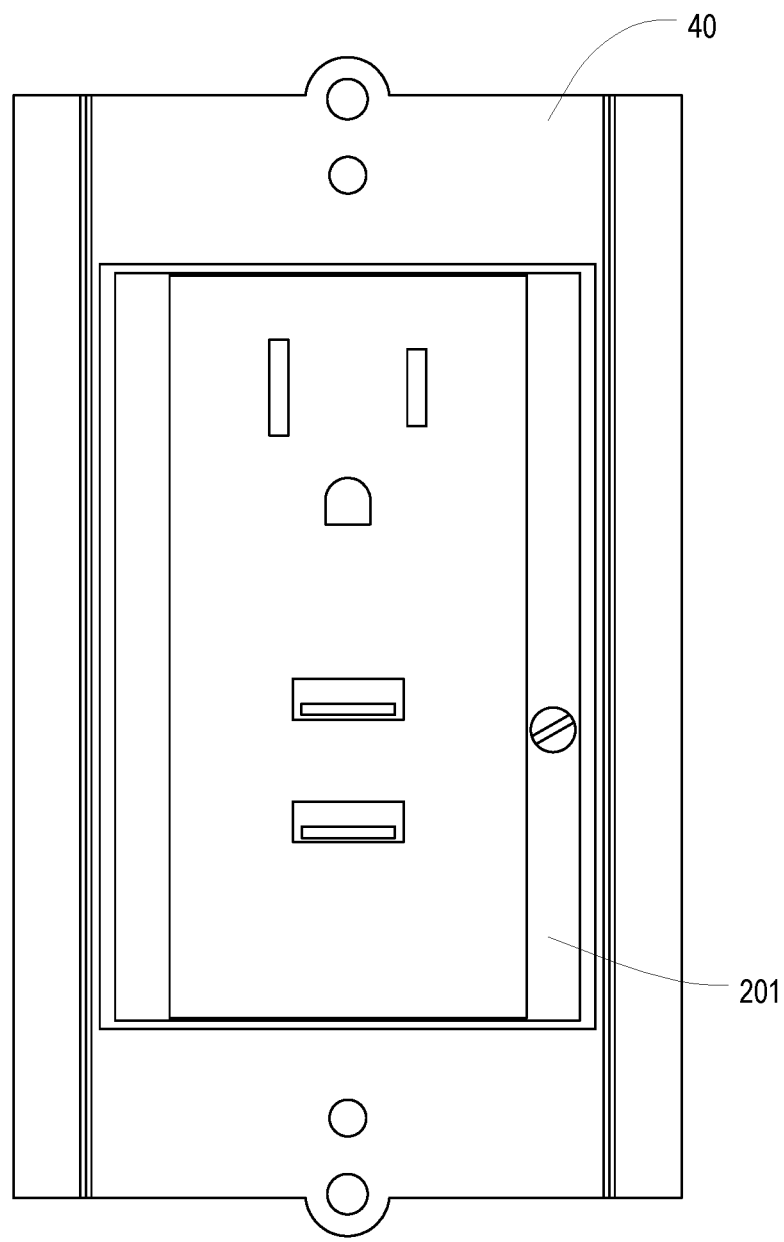
FIG. 39 is a front view of a modular circuit device unit including a replacement circuit device.
Figure 40:
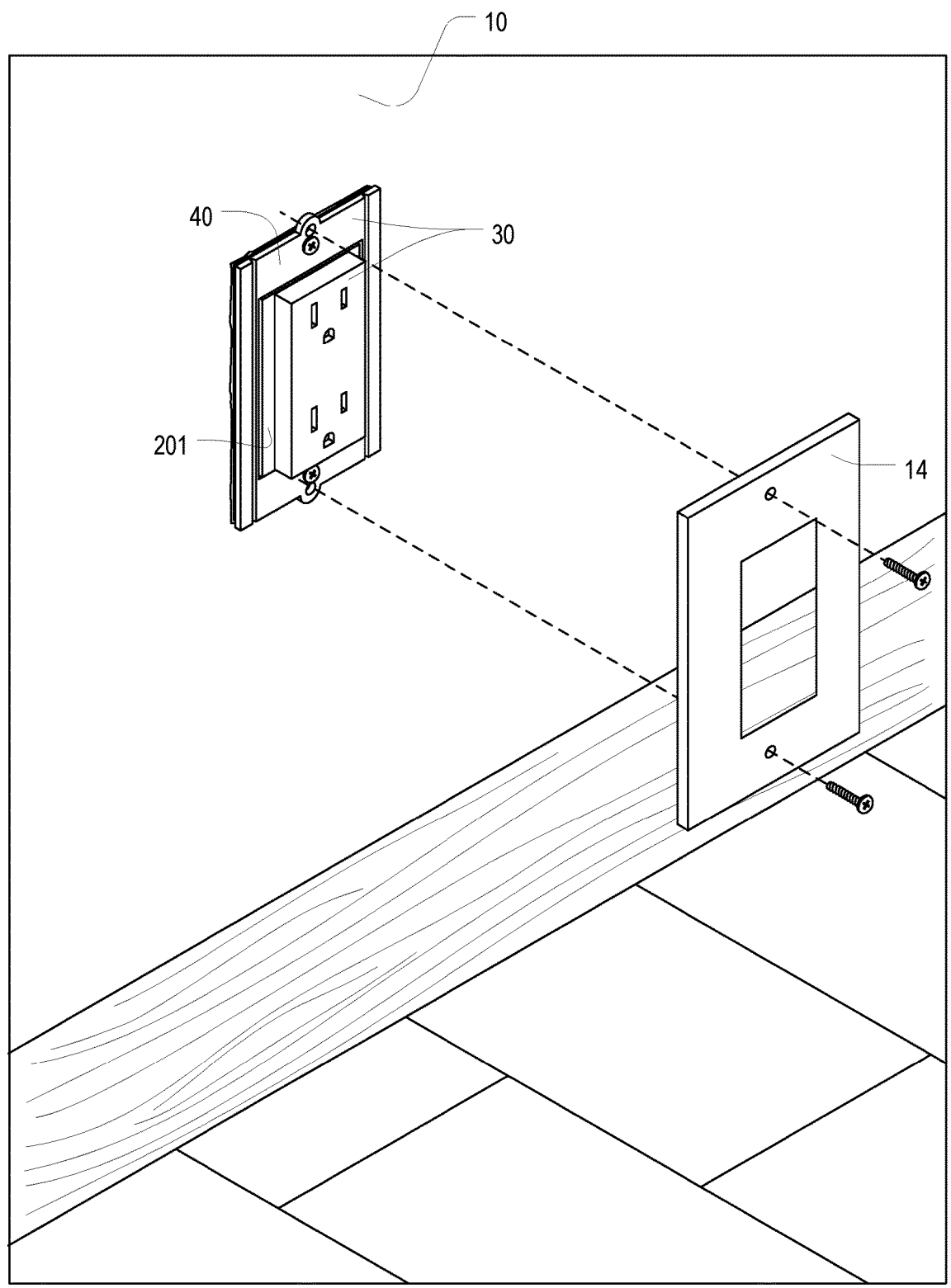
FIG. 40 is an orthogonal view of the modular wall-mounted electrical circuit device assembly of FIG. 1, shown with the cover plate removed.
Figure 41:
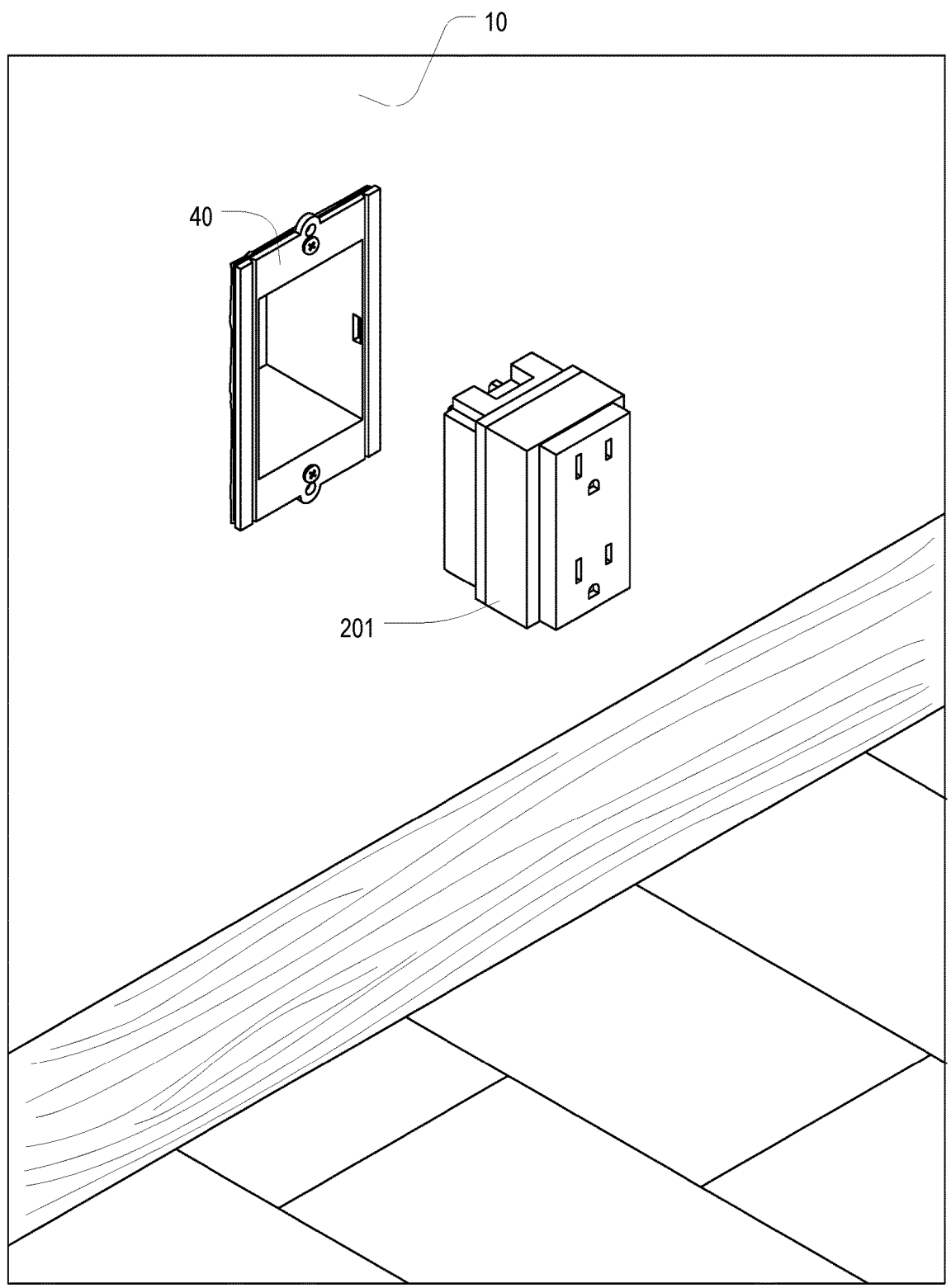
FIG. 41 is an orthogonal view of portions of the modular wall-mounted electrical circuit device assembly of FIG. 40, shown with the device module removed from the base unit.
Figure 42:
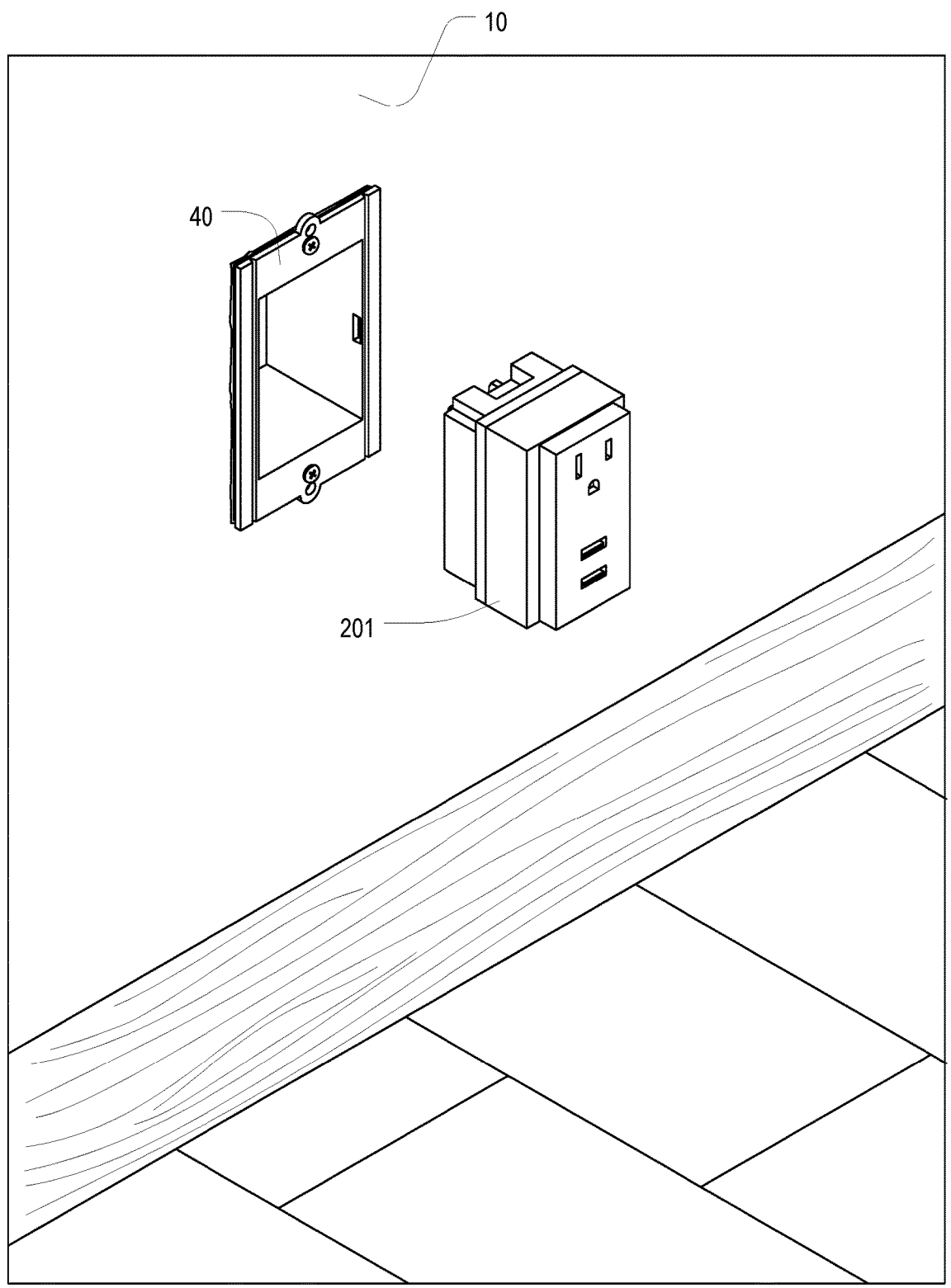
FIG. 42 is an orthogonal view of portions of the modular wall-mounted electrical circuit device assembly of FIG. 41, shown with a replacement device module ready for installation in the base unit.
Figure 43:
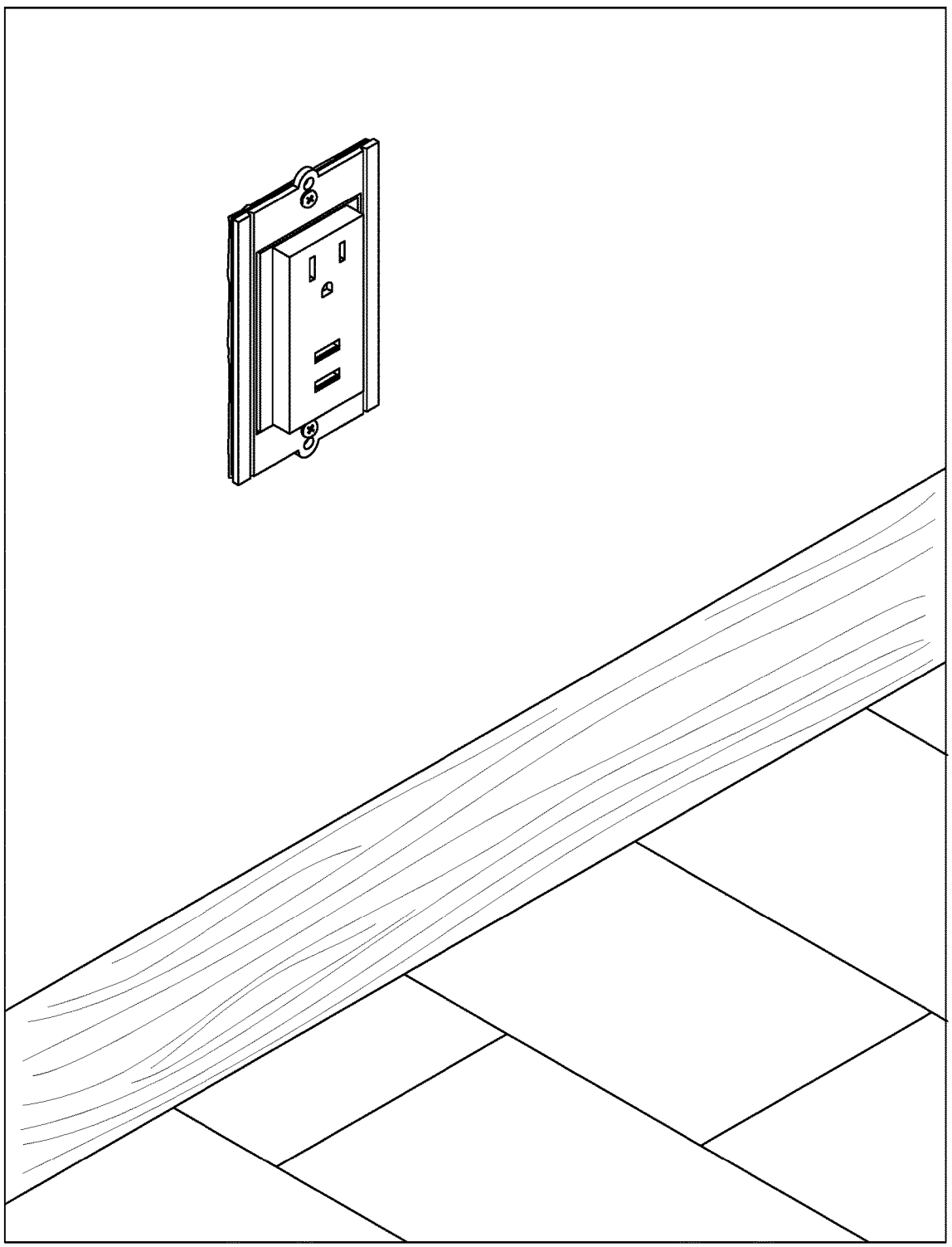
FIG. 43 is an orthogonal view of portions of the modular wall-mounted electrical circuit device assembly of FIG. 42, shown with the replacement device module installed in the base unit.
Figure 44:
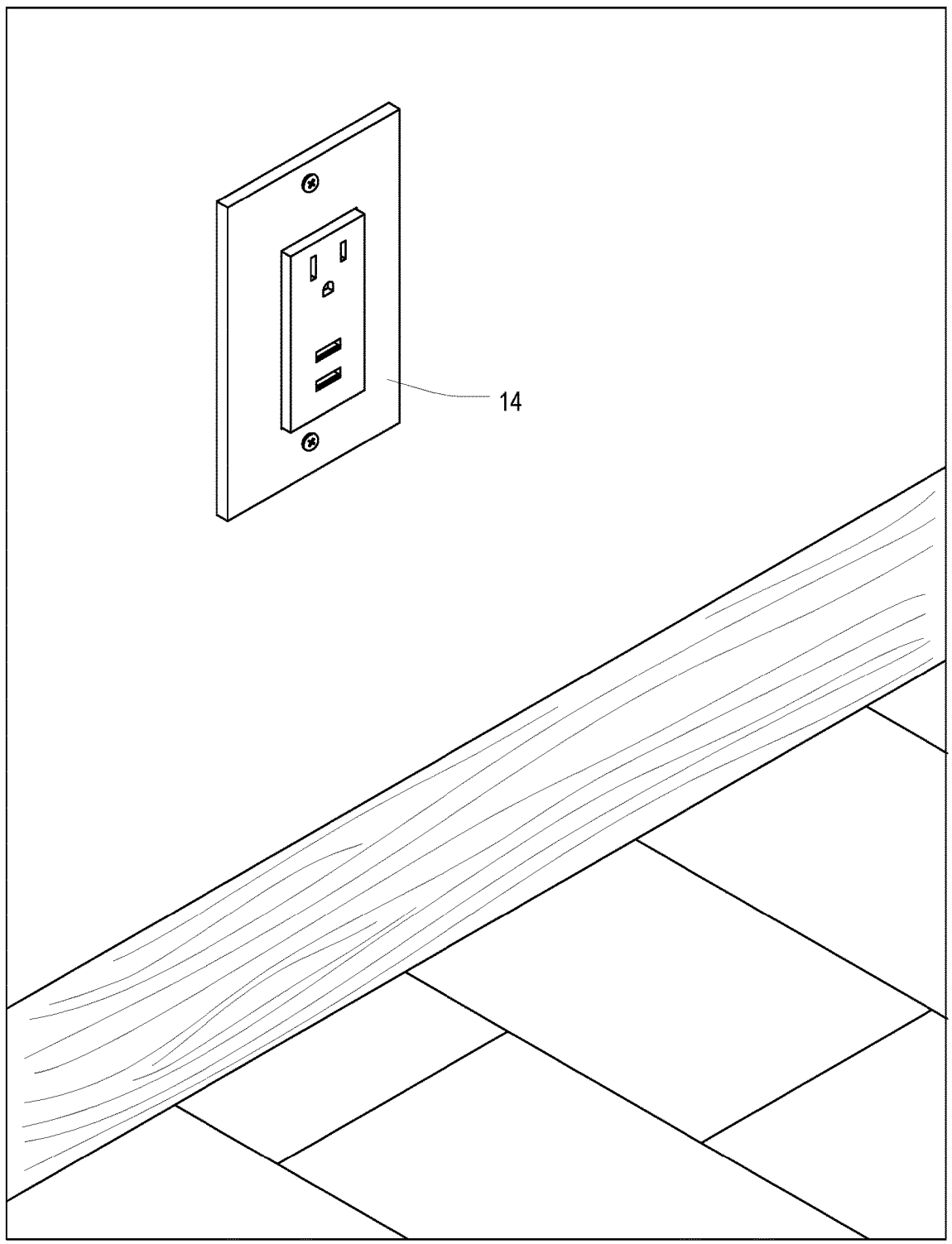
FIG. 44 is an orthogonal view of the modular wall-mounted electrical circuit device assembly of FIG. 43, shown with the cover plate installed.

The modular wall-mounted electrical circuit device assembly 20 of the present invention simplifies the process of replacing one type of circuit device, such as a standard duplex receptacle, with another one, such as a device with one conventional receptacle and a pair of USB (type A) charging ports providing 5 volt DC current for charging mobile phones or other electrical devices. An example of such a device module 201 is shown in FIG. 39. The initial state of the assembly 20 is shown in FIG. 1, wherein the modular circuit device unit 30 is installed in the wall 10 and the cover plate 14 is installed in place over the circuit device unit 30. To replace the duplex receptacle with the receptacle/USB port combo device, a user begins by removing the cover plate 14 as shown in FIG. 40, thereby revealing the modular circuit device unit 30. Next, the user rotates the cam 206 of the camming mechanism 102 back into the side of the housing 101, thereby unlocking the device module 201. The user may then depress the device module 201 slightly into the base unit 40 to cause the push-push latching mechanism 115 to release, at which point the device module 201 may be unplugged from the base unit 40, as shown in FIG. 41. As shown in FIGS. 42 and 43, a device module 201 with a new circuit device, which in this case is a receptacle/USB port combo device, may then be installed in the base unit 40. After latching and locking it in place, the cover plate 14 may be reinstalled, as shown in FIG. 44.

Notably, this process can be carried out without de-energizing the electrical circuit in which the base unit 40 is wired. There is no need to work with exposed wire ends of the building wiring; instead, the existing device module 201 is simply unplugged, and the replacement device module 201 is plugged back in. This makes it a much safer process, and makes it much easier for a homeowner, do-it-yourselfer, or other non-expert user to carry out the operation instead of a licensed electrician or other expert. It is also much faster to simply unplug one module 201 and plug another one in than it is to disconnect electrical wires from the back of a circuit device and then connect the wires to the back of the replacement circuit device. This advantage becomes even more significant when difficulties involving locating the breaker or fuse box (particularly in large apartment buildings or the like), creating interruptions in service, or maintaining emergency readiness (such as military applications) are particularly important.

Figure 45:
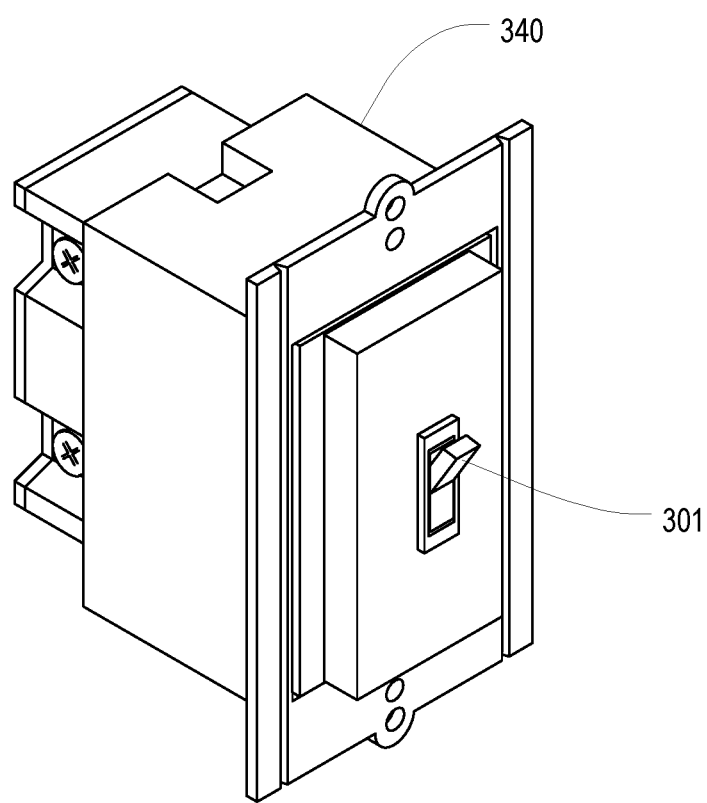
FIG. 45 is an orthogonal view a switch-type modular circuit device unit in accordance with one or more preferred embodiments of the present invention.
Figure 46:
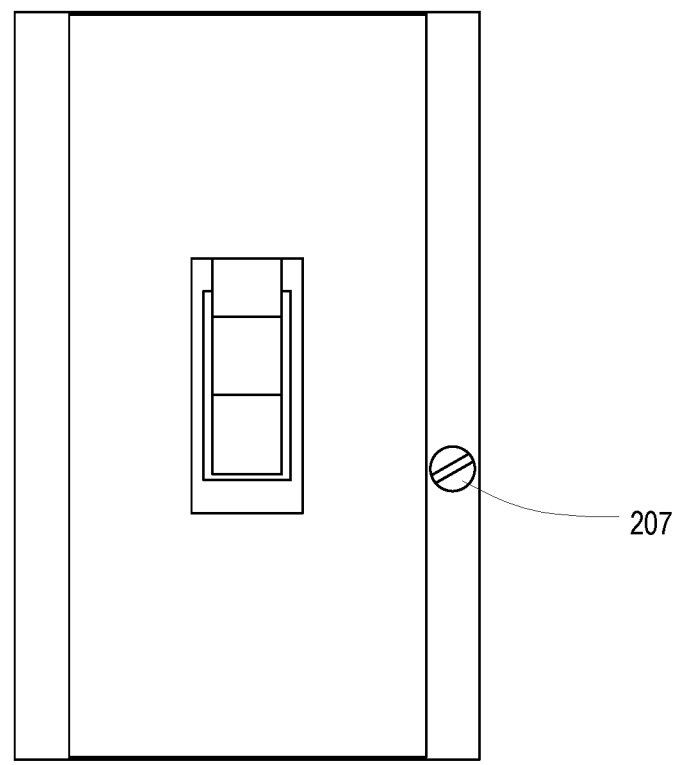
FIG. 46 is a front view of the device module of FIG. 45.
Figure 47:
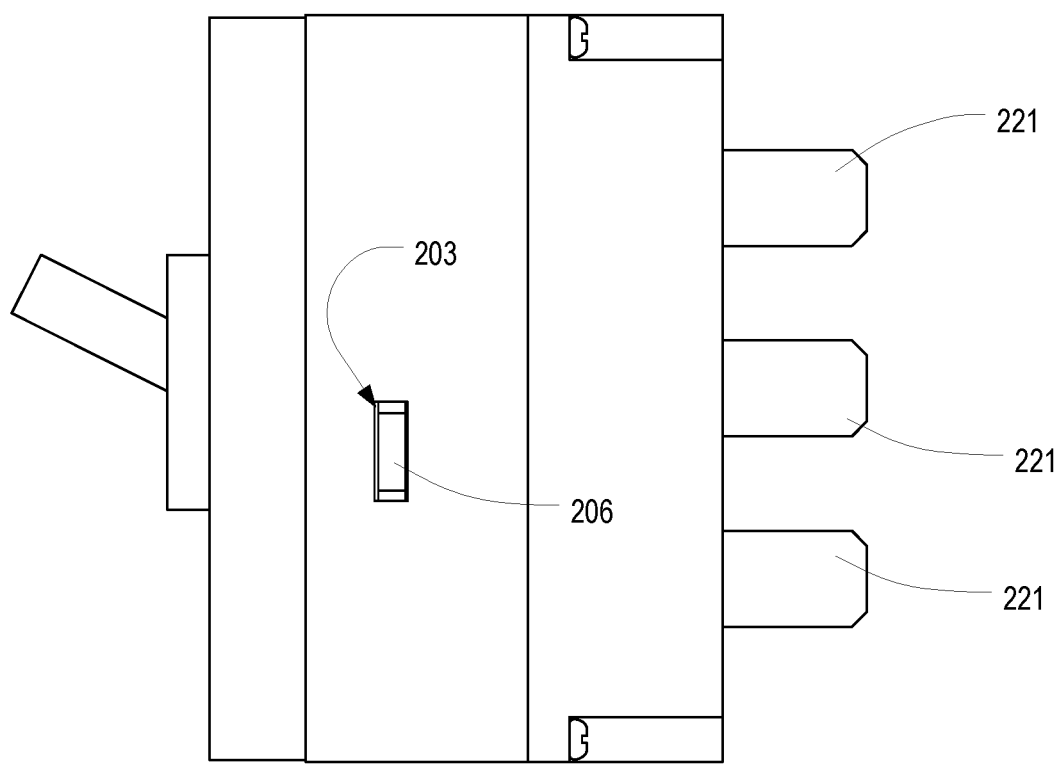
FIG. 47 is a right side view of the device module of FIG. 45.
Figure 48:
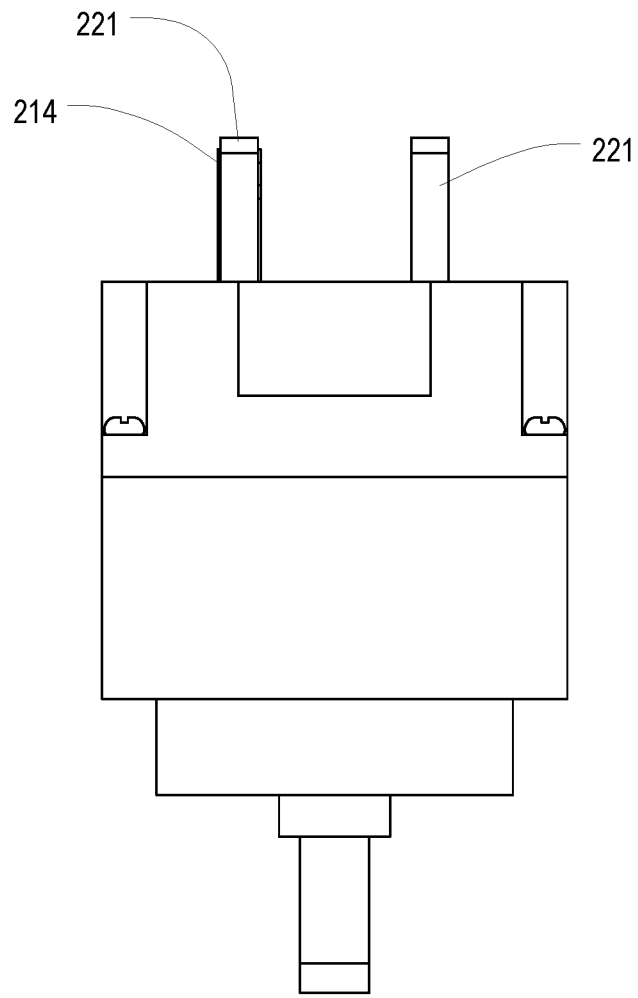
FIG. 48 is a top view of the device module of FIG. 45.

As mentioned previously, the present invention is also applicable to switch-type circuit devices. In this regard, FIG. 45 is an orthogonal view a switch-type modular circuit device unit 330 in accordance with one or more preferred embodiments of the present invention, and FIGS. 46, 47, and 48 are a front view, a side view, and a top view, respectively, of the device module 301 of FIG. 45. The switch-type modular circuit device unit 330 is similar in many ways to the outlet-type modular circuit device unit 30 of FIGS. 3 and 5. For example, as shown therein the switch-type modular circuit device unit 330 includes a base unit 340 and a device module 301. The device module 301 mounts in, and is easily removable from, the base unit 340 in a way that makes it far easier for a user to replace the device module 301 with a similar unit or a different unit as desired. It will be appreciated, however, that the electrical interconnect assembly in the device module 301 may be functionally different from the electrical interconnect assembly in the device module 201 for the outlet-type modular circuit device unit 30 of FIGS. 3 and 5. Furthermore, as noted previously, the base unit 340 may incorporate a differently-keyed box liner from the liner 110 shown in FIG. 5, such as one of the alternative base units and junction box liners shown in FIGS. 20, 21, and 22, and the male electrical contacts 221 on the back of the device module 301 may be sized, positioned, and oriented accordingly.

Figure 49:
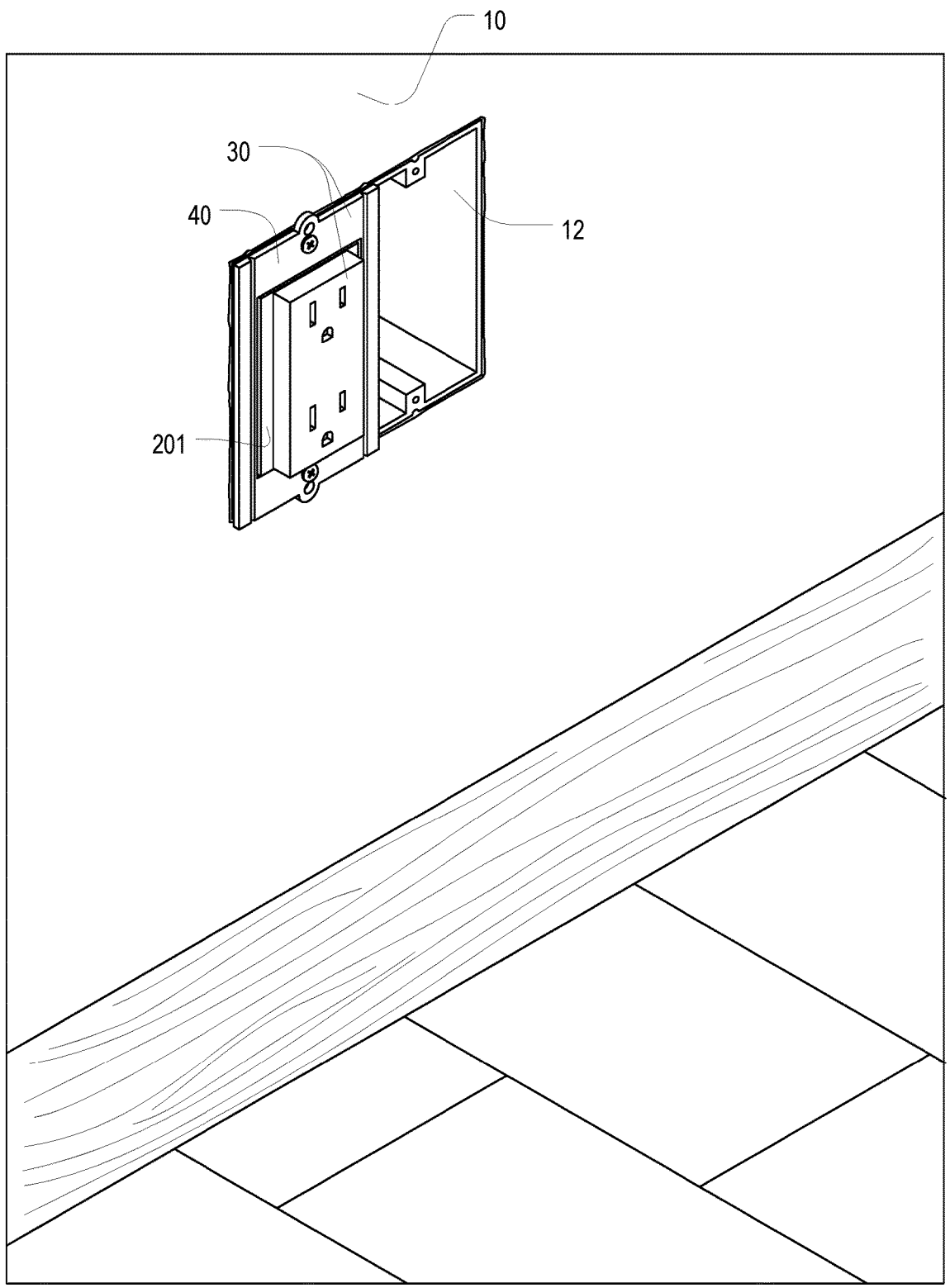
FIG. 49 is an orthogonal view of a modular circuit device unit shown installed in the left side of a conventional 2-gang junction box.
Figure 50:
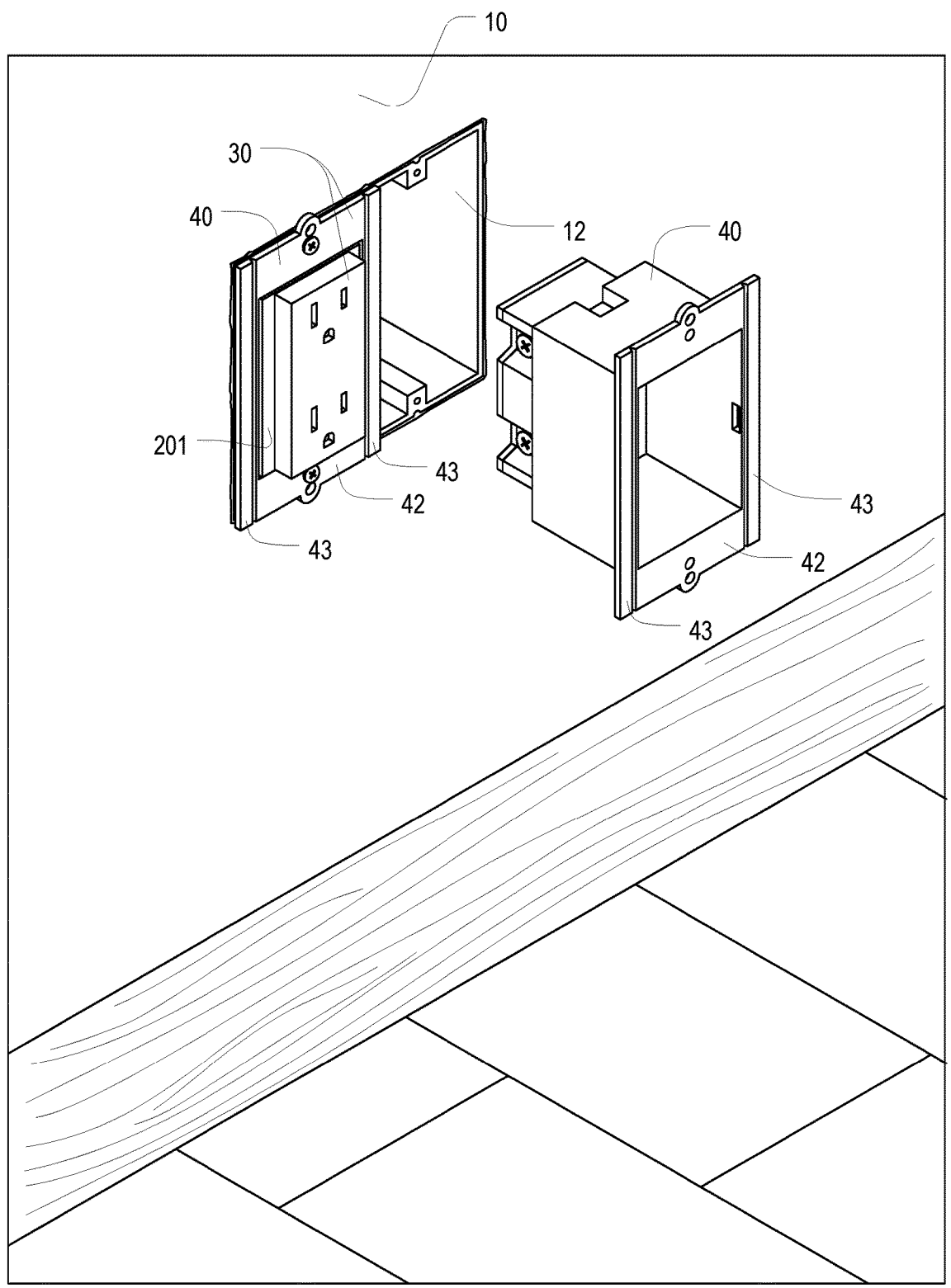
FIG. 50 is an orthogonal view of a base unit for a second modular circuit device unit shown ready for installation in the right side of the 2-gang junction box of FIG. 49.
Figure 51:
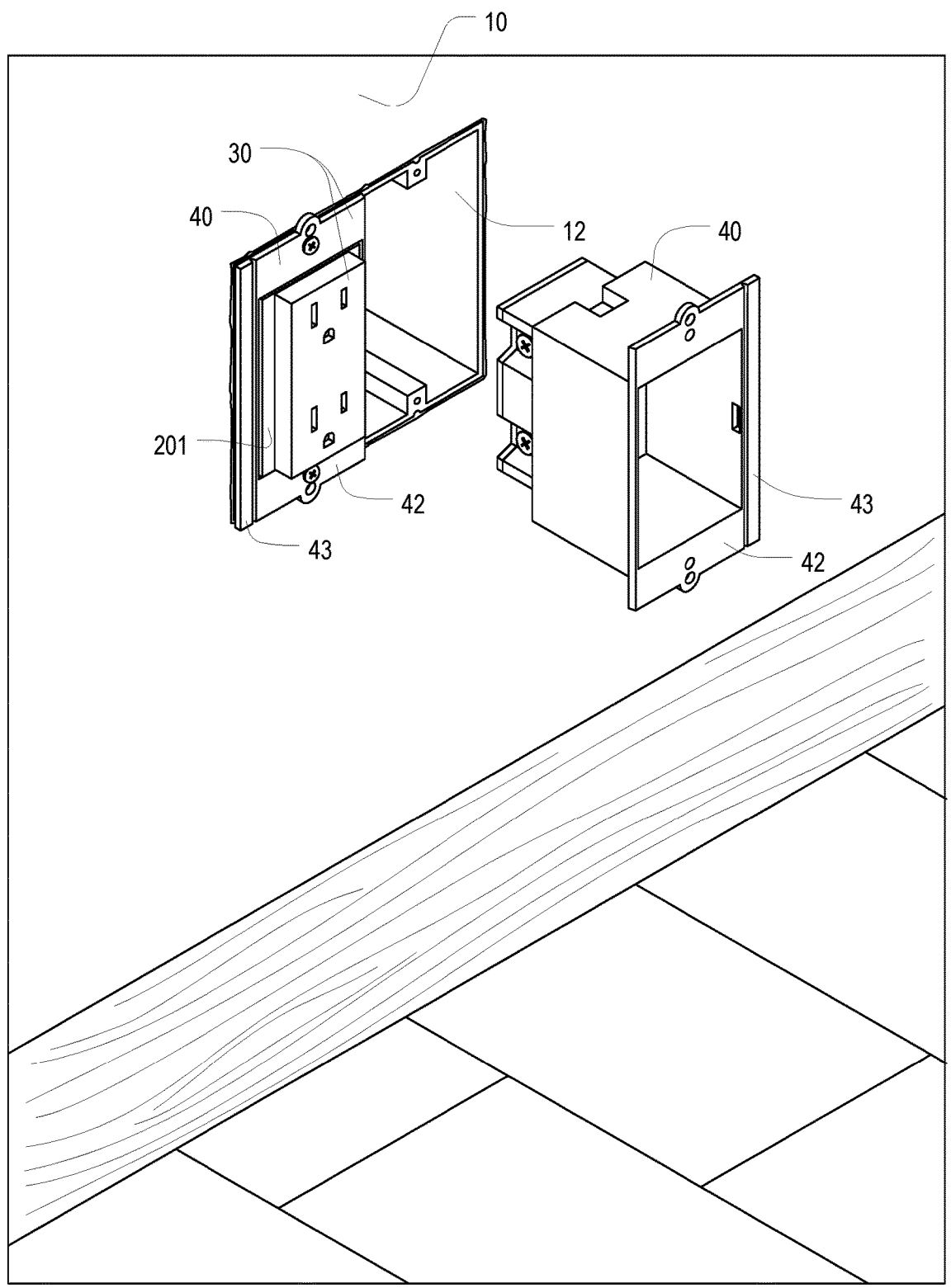
FIG. 51 is an orthogonal view of the arrangement of FIG. 50, shown with respective wings broken off to facilitate installation.
Figure 52:
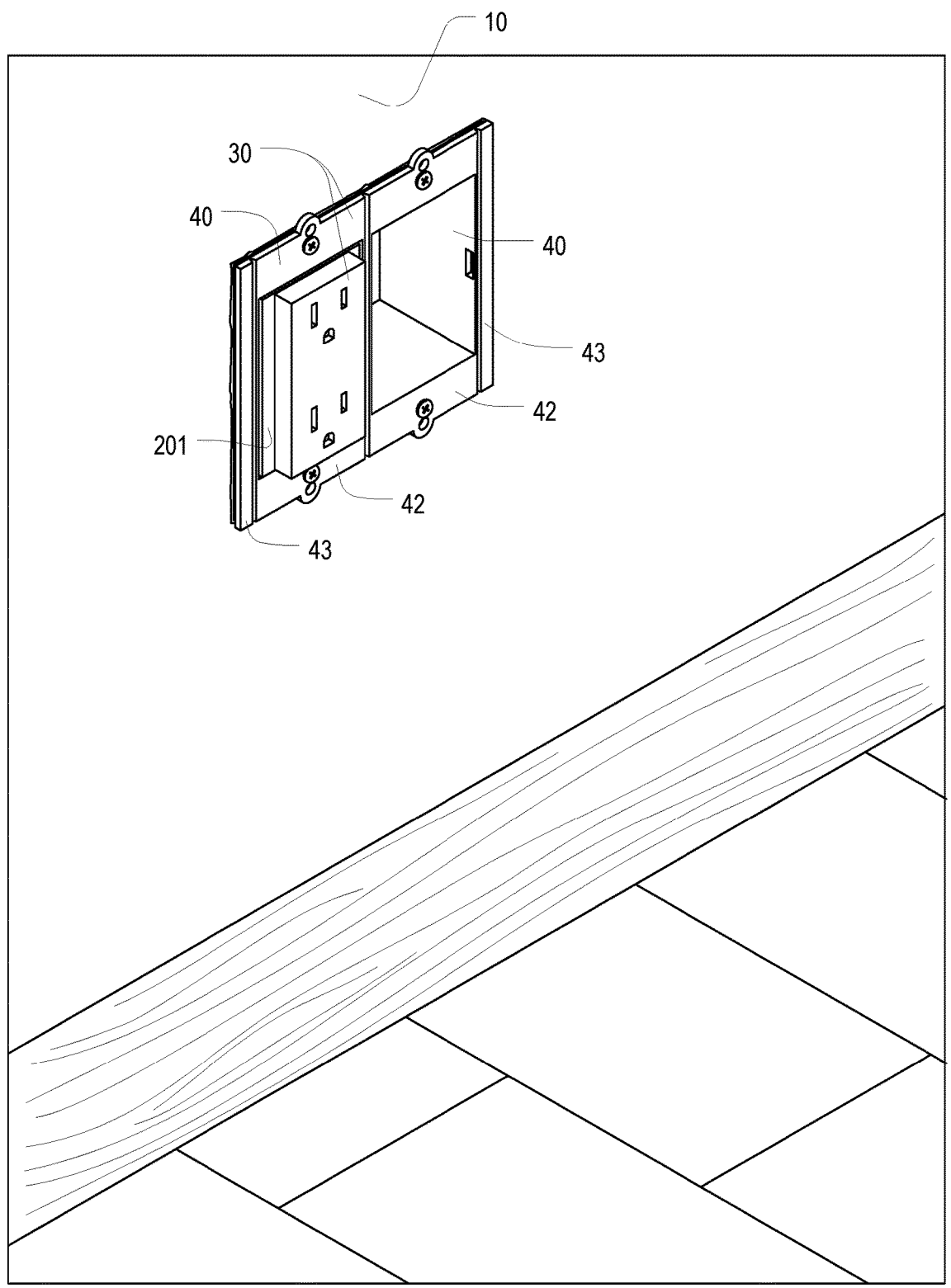
FIG. 52 is an orthogonal view of the arrangement of FIG. 51, shown with the second base unit installed in the junction box.

Although described thus far with respect to single junction boxes 12 for individual circuit device units 30, it will be appreciated that modular circuit device units 30,330 may be ganged together in conventional junction boxes of larger sizes, such as 2-gang, 3-gang, or larger. In this regard, FIG. 49 is an orthogonal view of a modular circuit device unit 30 shown installed in the left side of a conventional 2-gang junction box 12. This installation is essentially identical to the installation of the device 30 in FIG. 40, for example. However, when a second device 30 is to be installed in the right side of the junction box 12, immediately adjacent the first, then the width of the respective box liners 110 may pose a clearance problem, as shown in FIG. 50. Although in some embodiments a box liner may be designed to be narrower front face, the front faces 42 of the box liners 110 shown herein include break-off wings 43 extending respectively from the left and right sides thereof. In order to position the two devices 30 properly within the 2-gang junction box 12, the wing 43 on the right edge of the left-hand box liner 110 and the wing 43 on the left edge of the right-hand liner 110 may be broken off, as shown in FIG. 51. The two liners 110 may then be installed in their proper positions side-by-side in the junction box 12, as shown in FIG. 52.

Figure 53:
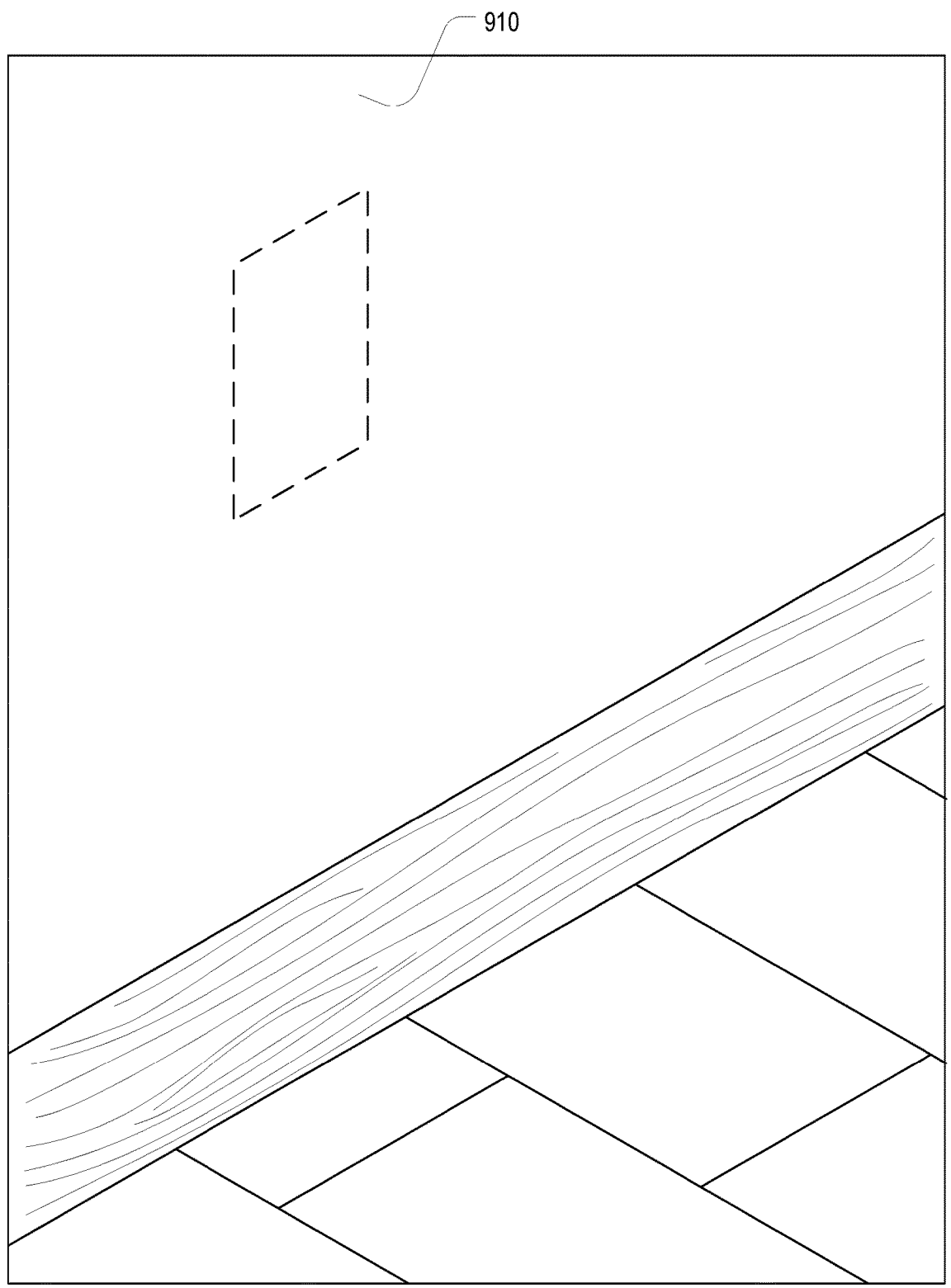
FIG. 53 is an orthogonal view of a wall in which an outlet is to be installed, with the location for a junction box marked.
Figure 54:
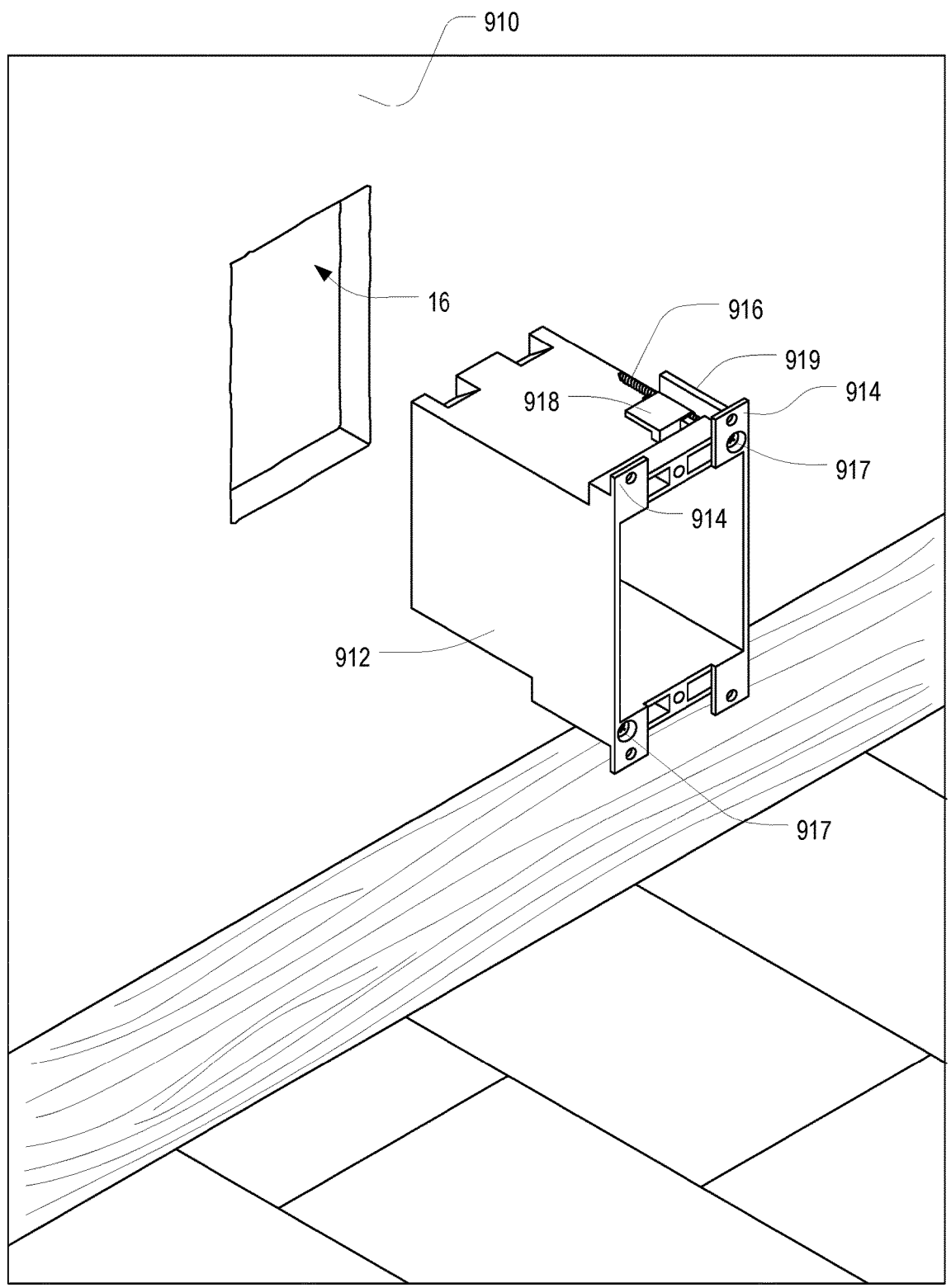
FIG. 54 is an orthogonal view of a remodel-style junction box ready for installation in an opening that has been cut into the wall of FIG. 53.
Figure 55:
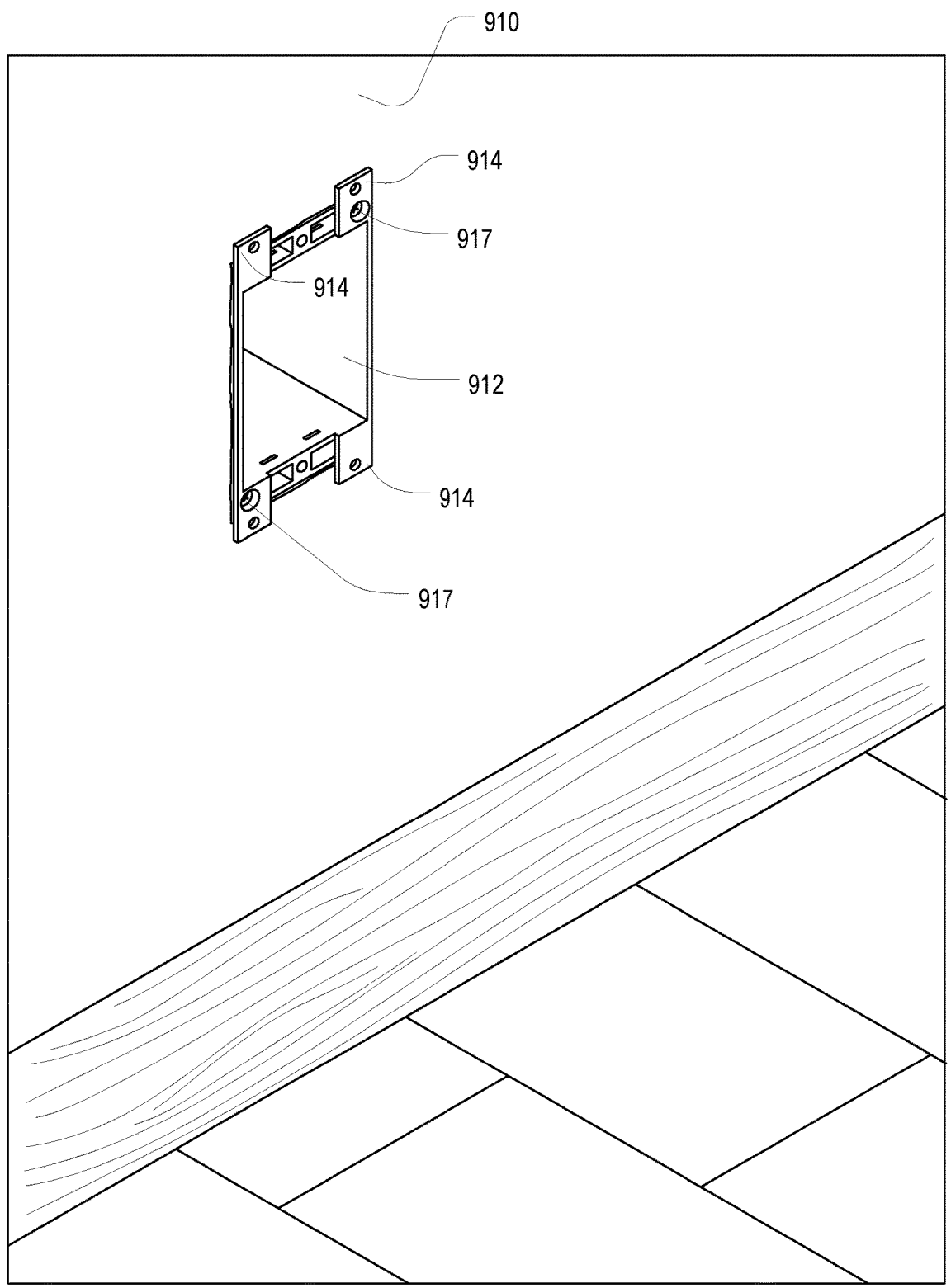
FIG. 55 is an orthogonal view of a remodel-style junction box installed in the wall opening of FIG. 54.
Figure 56:
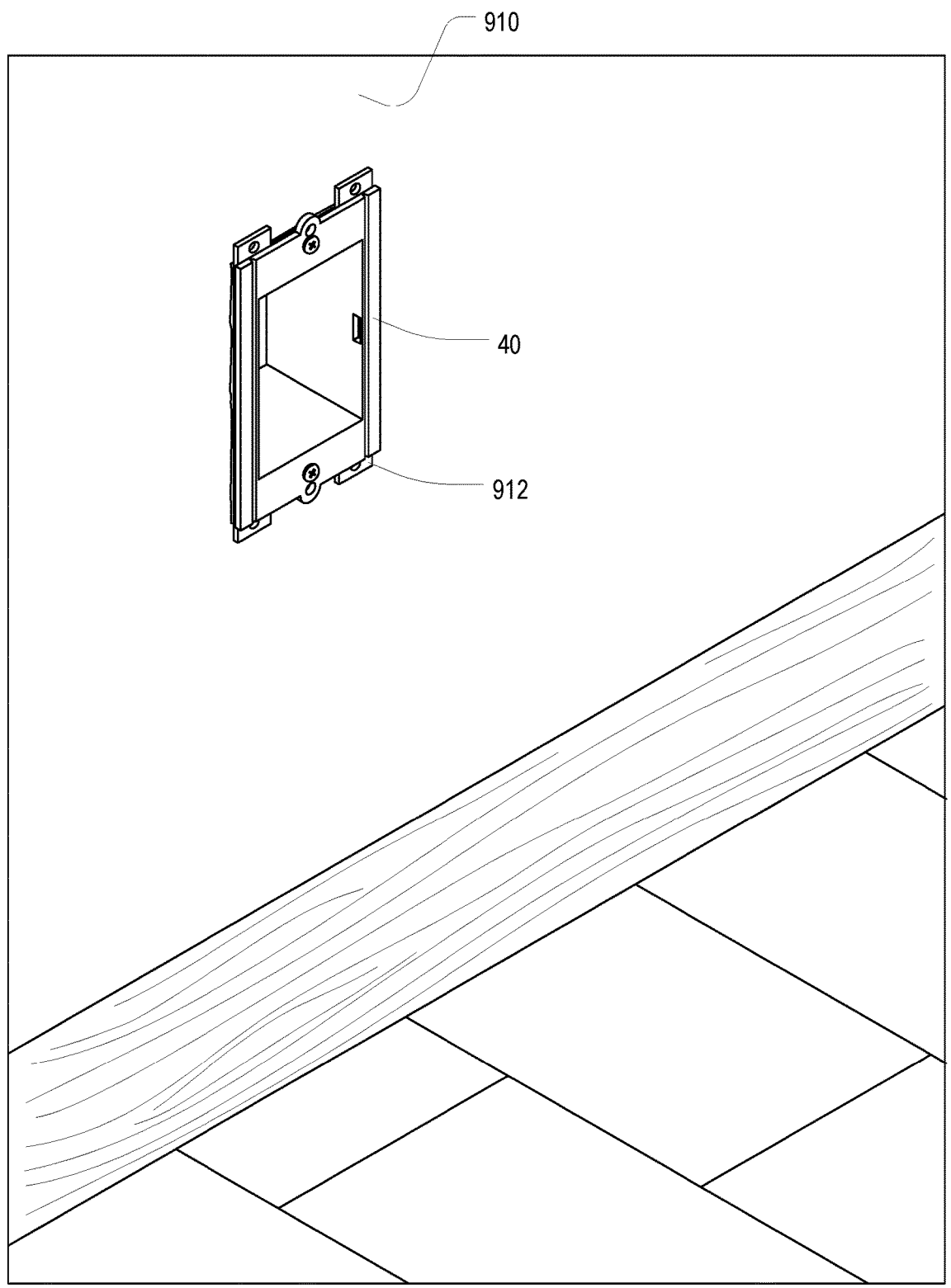
FIG. 56 is an orthogonal view of a base unit installed in the remodel-style junction box of FIG. 55.
Figure 57:
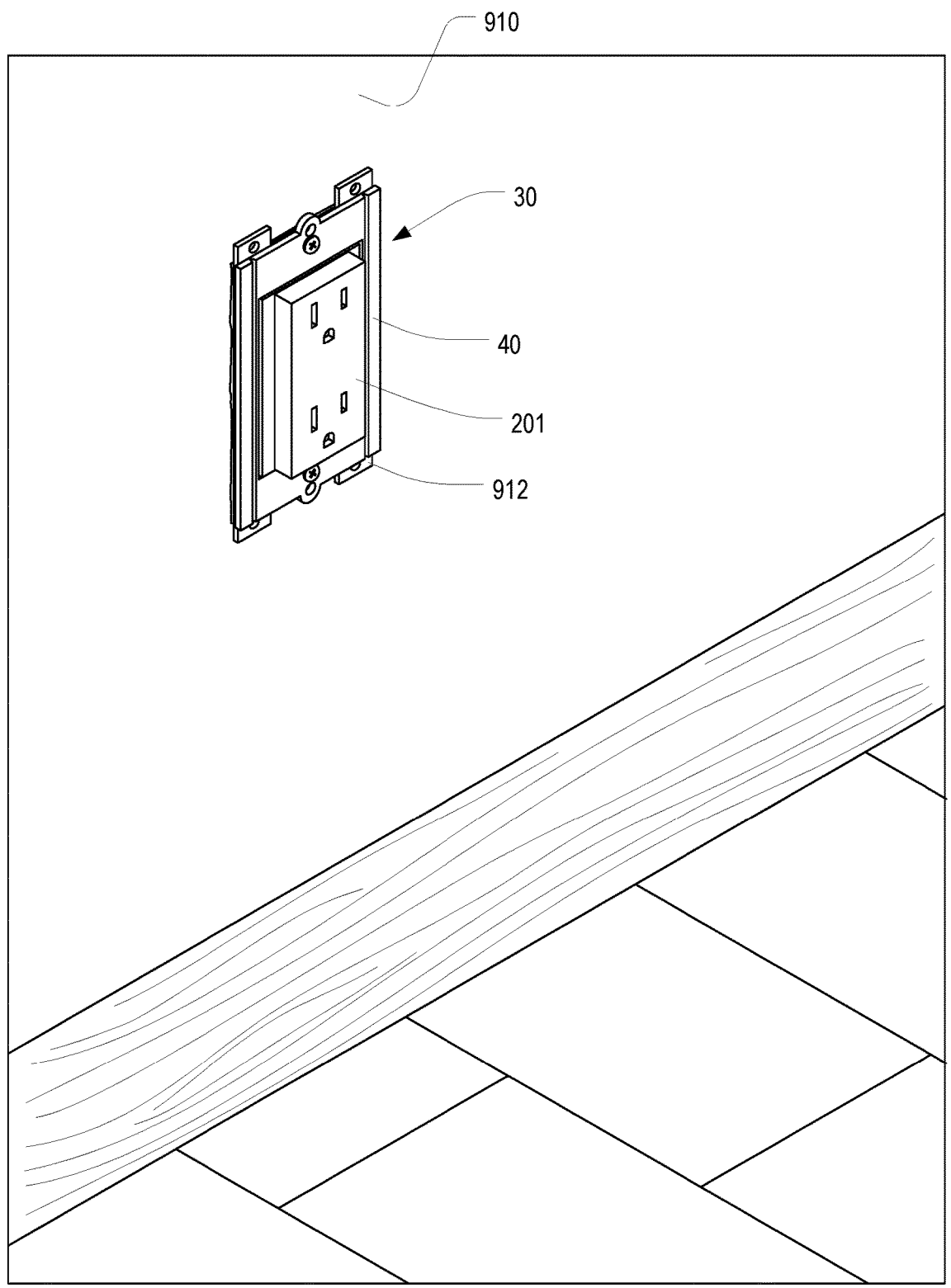
FIG. 57 is an orthogonal view of a device module installed in the base unit of FIG. 56.
Figure 58:
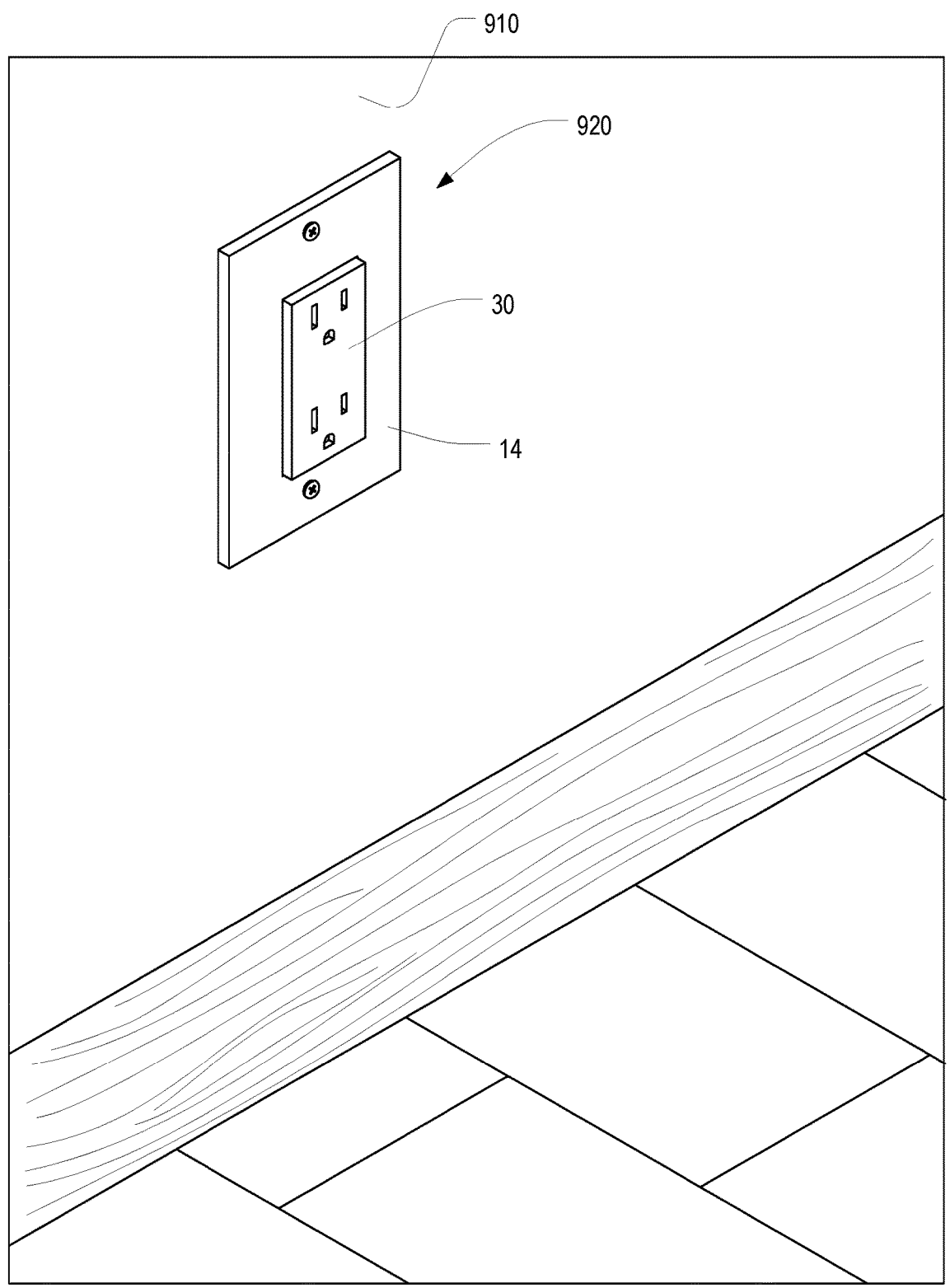
FIG. 58 is an orthogonal view of a cover plate installed on the modular circuit device unit of FIG. 57.

Although described thus far with respect to existing junction boxes 12, it will be appreciated that modular circuit device units 30,330 may likewise be installed as part of the installation of a new junction box in an existing wall. In this regard, FIG. 53 is an orthogonal view of a wall 910 in which an outlet is to be installed, with the location for a junction box marked. In FIG. 54, the opening 16 has been cut into the wall 910, and a junction box 912 designed to be installed in an existing wall is shown aligned with the opening 16. The junction box 912 is mounted to the wall 910 by clamping it around the wall board or other wall material, and includes four ears 914, a rotatable clamp member 918 mounted on a screw 916, and a structural stop 919. Once the junction box 912 is positioned in place in the opening 16 in the wall 910, as shown in FIG. 55, the screw is rotated via the screw head 917. The clamp member 918 is rotated clockwise about a quarter turn before further rotation is prevented by the structural stop 919. After that, further rotation of the screw 916 gradually moves the clamp member 918 toward the back of the wall board until contact is made, after which the screw 916 may be further tightened to clamp the wall board between the clamp member 918 and the junction box ear 914. Further installation is carried out as described previously, wherein FIG. 56 illustrates a base unit 40 installed in the junction box 912 of FIG. 55, FIG. 57 illustrates a device module 201 installed in the base unit 40 of FIG. 56, and FIG. 58 illustrates a completed modular wall-mounted electrical circuit device assembly 920, including the cover plate mounted on the modular circuit device unit 30 of FIG. 57.

Figure 59:
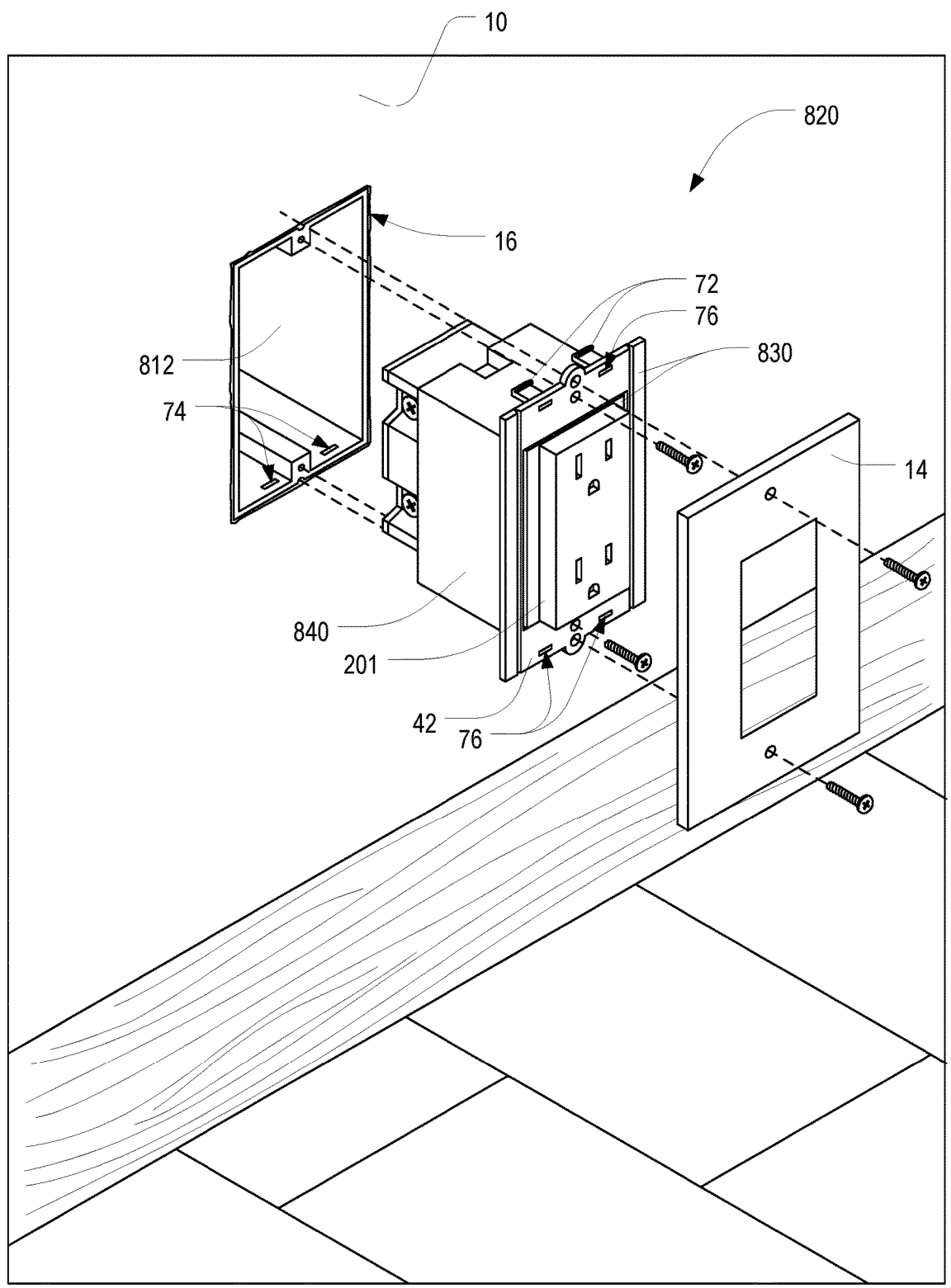
FIG. 59 is a partially exploded view of another modular wall-mounted electrical circuit device assembly in accordance with one or more preferred embodiments of the present invention.

Although described thus far with respect to existing junction boxes 12, it will be appreciated that in some embodiments, additional utility may be realized when utilized with specially-modified junction boxes that function exactly like conventional junction boxes 12, but which are adapted to make it easier to install a modular circuit device unit. In this regard, FIG. 59 is a partially exploded view of another modular wall-mounted electrical circuit device assembly 820 in accordance with one or more preferred embodiments of the present invention. The modular wall-mounted electrical circuit device assembly 820 of FIG. 59 includes a modified electrical wall box or junction box 812, a correspondingly-modified modular circuit device unit 830 (including a base unit 840 and a device module 201) and a cover plate 14. As with other embodiments discussed herein, the junction box 812 is mounted in an opening 16 in the wall 10 itself with its front surfaces typically flush with, or just inside or outside, the surface of the wall 10. Such a junction box 12 is typically attached to a wall stud via pre-mounted nails or other mounting features, but other arrangements are possible. The modular circuit device unit 830 is installed in the junction box 812, while the cover plate 14 fits over the face of the modular circuit device unit 830 and hides the junction box 812 and wall opening 16.

Figure 60:
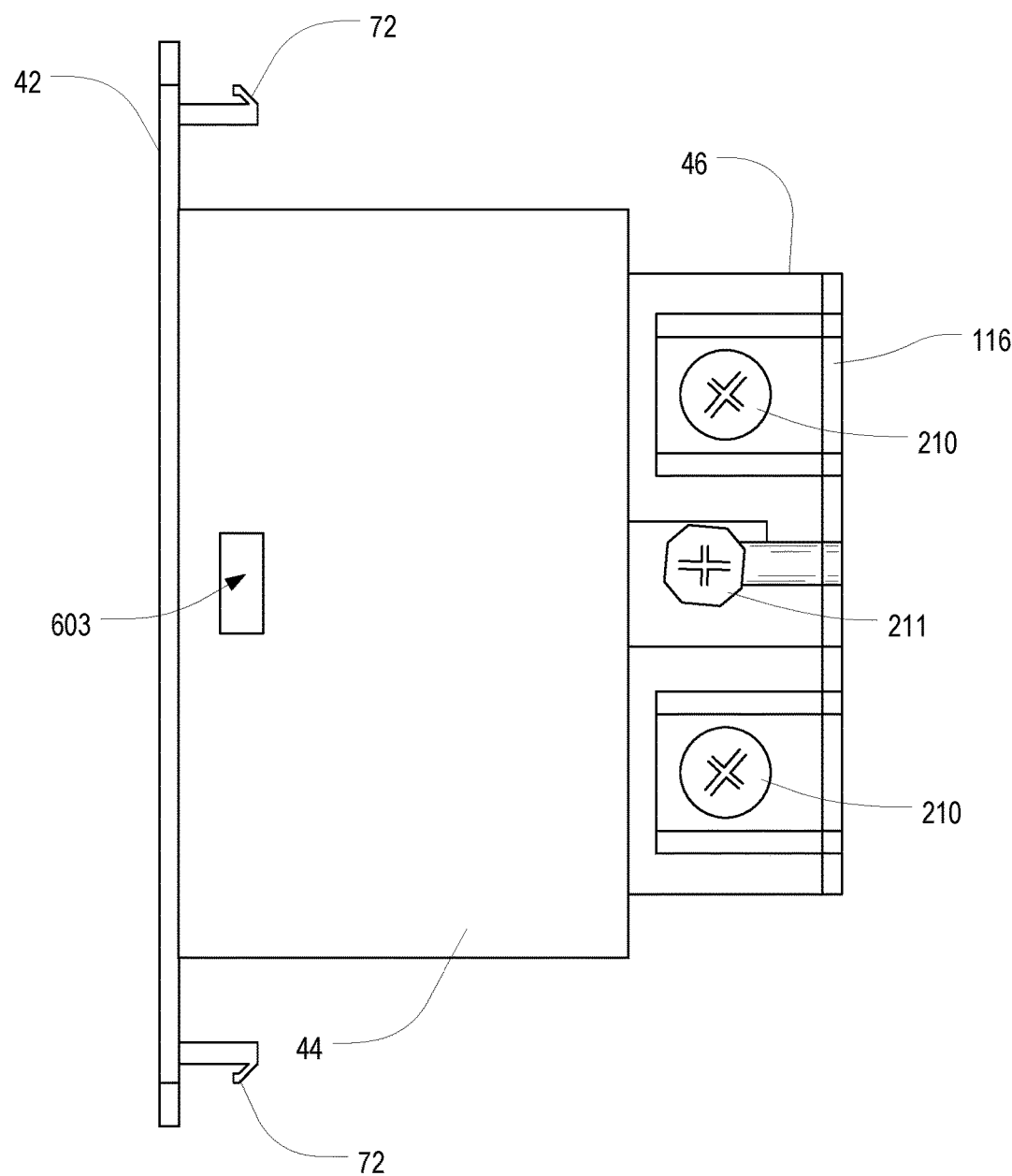
FIG. 60, which is a right side view of the base unit of FIG. 59.

Significantly, the process of installing the modular circuit device unit 830 in the junction box 812 is further facilitated through the use of a quick-latch mechanism. More particularly, a respective pair of resilient tabs extend rearward from front face 42 of the liner of the base unit 840, and a corresponding pair of slots 74 are disposed in each of the upper and lower walls of the junction box 810 and aligned with the tabs 72. The tabs 72 are perhaps better illustrated in FIG. 60, which is a right side view of the base unit 840 of FIG. 59. As the base unit 840 is inserted into the junction box 810, the angled ends of the tabs 72 eventually make contact with the front of the junction box 810. If sufficient force is applied, the tabs 72 are then deflected inward by the top and bottom walls of the junction box 810 until the ends of the tabs 72 reach the slots 74, at which point the resilient nature of the tabs 72 causes them to spring back outward with the ends seating in the slots 74. Furthermore, the ends of the tabs 72 are hooked, thus preventing the base unit 840 from being withdrawn from the junction box 810. Notably, in some embodiments, the hooked ends of the tabs 72 are sufficient to retain the base unit 840 in the box 810 by themselves, but in other embodiments, the tabs 72 are used to quickly mount the base unit 840 in place such that screws may be used to more securely attach the base unit 840 to the box 810 as previously described, for example, with respect to FIG. 11.

It will be appreciated that the quick-latch mechanism described and illustrated here depends on a junction box 810 with the necessary slots 74 having been installed. (Notably, alternative quick-latch mechanisms are likewise possible, but likewise generally require modification of a conventional junction box 12.) Initial installation of such a junction box 810 may be desirable, however, in situations where a builder wishes to make it easier for later utilization of modular circuit device units 830 by a homeowner or other user, while still permitting use of the junction box 810 in a conventional manner.

Figure 61:
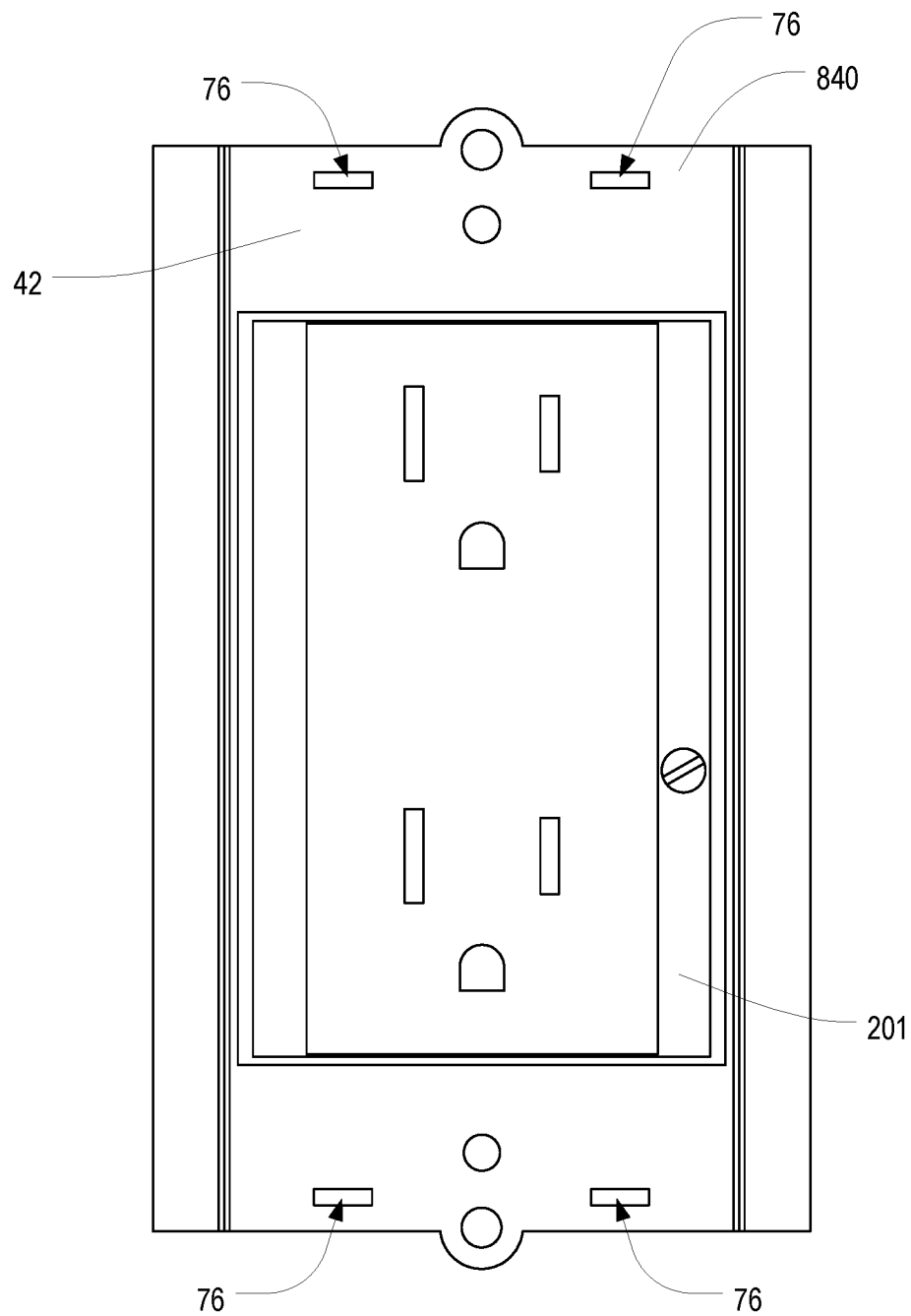
FIG. 61 is a front view of the modular circuit device unit of FIG. 59.

In some situations, it may be desirable to remove the base unit 840 after installation in the junction box 810. Although the tabs 72 may be pried from the slots 74, or in some cases broken off entirely, the liner of the base unit 840 may be further modified to make this process easier. In this regard, FIG. 61 is a front view of the modular circuit device unit 830 of FIG. 59. As shown in FIGS. 59 and 61, the front face 42 of the liner of the base unit 840 preferably includes a slot 76 immediately adjacent each tab 72 and penetrating through the face 42. The slots 76 are large enough to accommodate a small screwdriver or the like such that the tab 72 adjacent thereto may be sprung and thus released from the junction box tabs 74.

Figure 62:
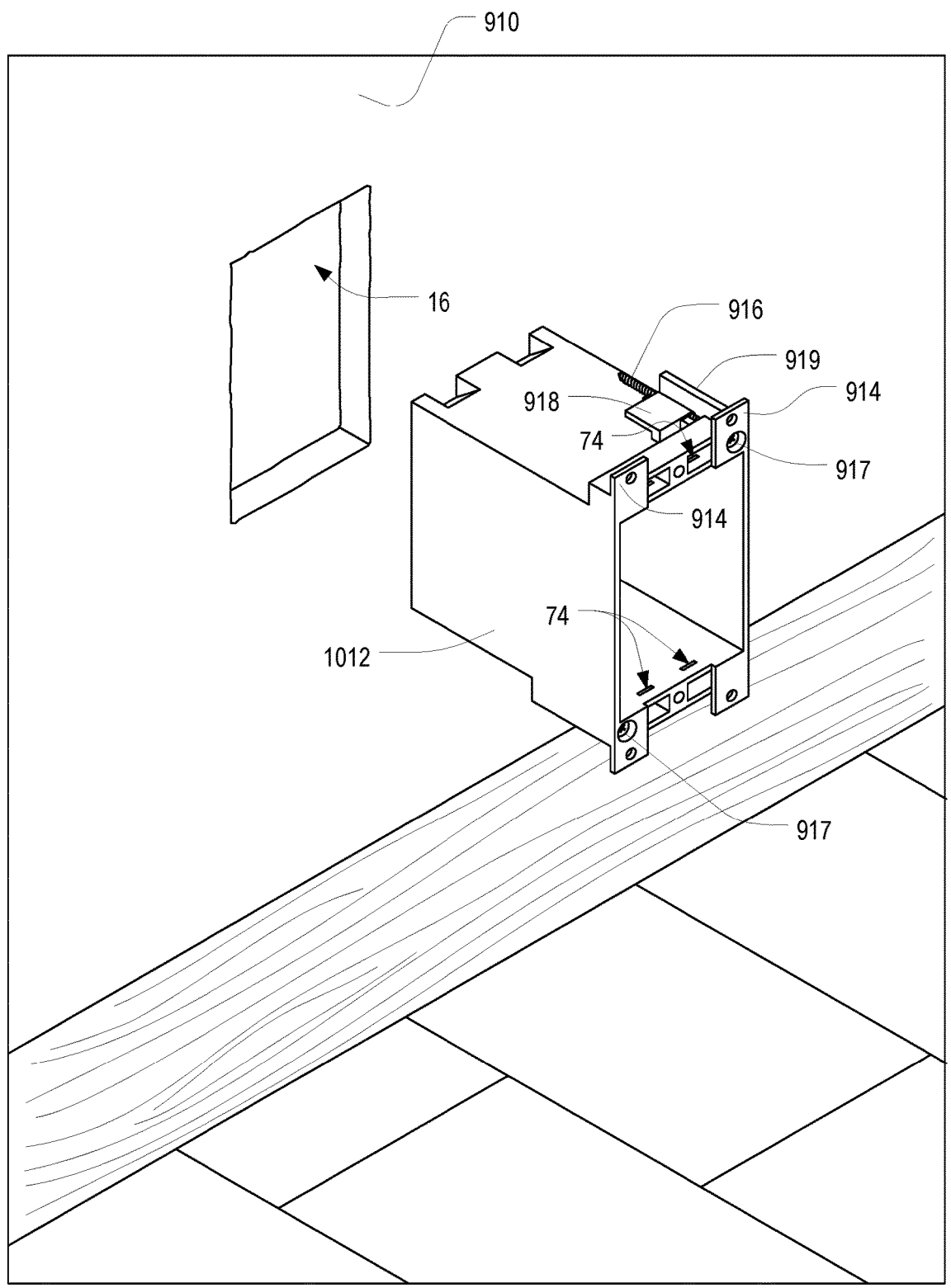
FIG. 62 is an orthogonal view of a modified remodel-style junction box ready to be installed in an opening in a wall in accordance with another preferred embodiment of the present invention.
Figure 63:
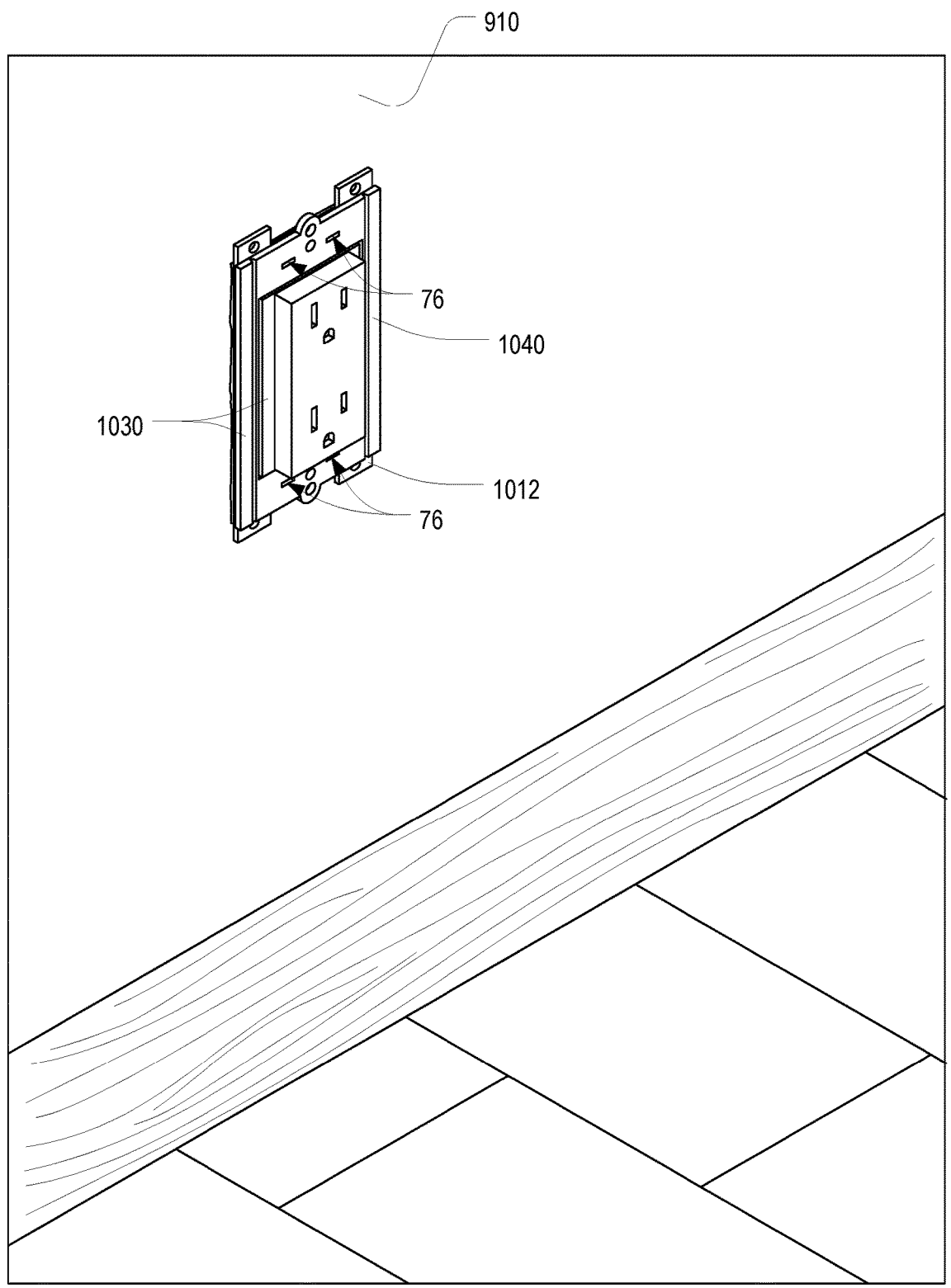
FIG. 63 is an orthogonal view of a modular circuit device unit installed in the junction box of FIG. 62.
Figure 64:
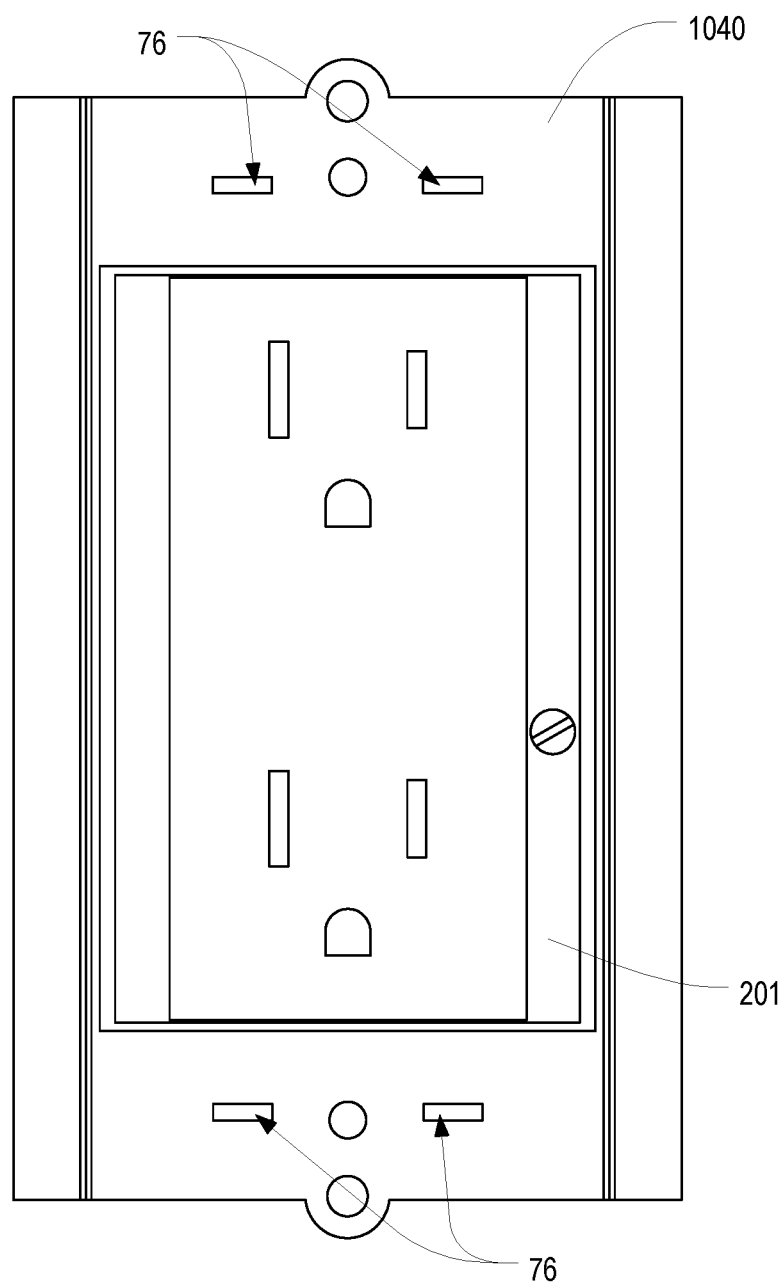
FIG. 64 is a front view of the modular circuit device unit of FIG. 63.
Figure 65:
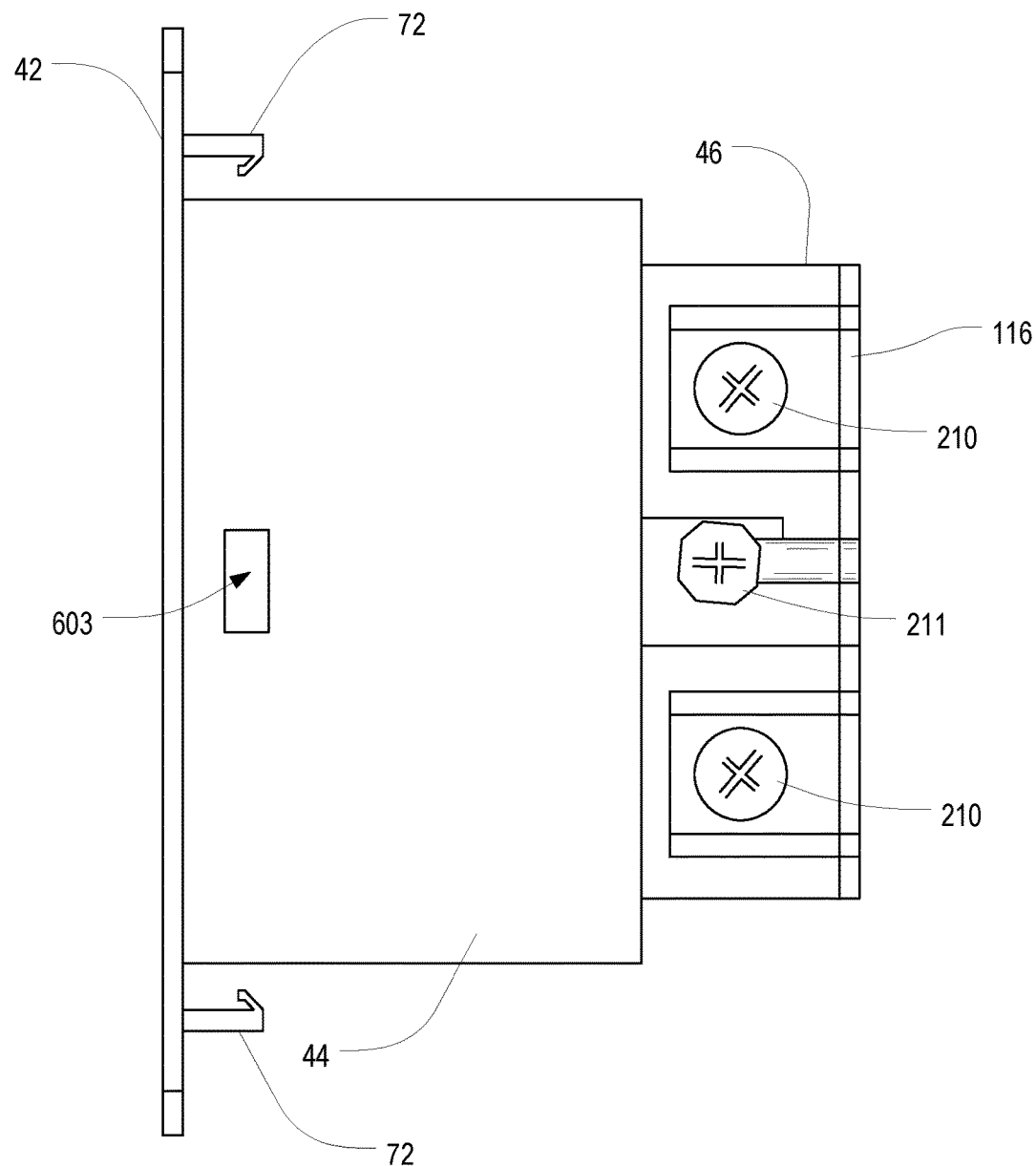
FIG. 65 is a right side view of the base unit of FIG. 63.

The exact arrangement of such a quick-latch mechanism may depend on the style or construction of the junction box. For example, a remodel-style junction box like the one shown in FIG. 54 may utilize a different construction to accommodate the rotatable clamp member 918 and the like. In that particular arrangement, it may be preferable for tabs to be located outside the top and bottom walls of the junction box instead of inside. In this regard, FIG. 62 is an orthogonal view of a modified remodel-style junction box 1012 ready to be installed in an opening 16 in a wall 910 in accordance with another preferred embodiment of the present invention, FIG. 63 is an orthogonal view of a modular circuit device unit 1030 installed in the junction box 1012 of FIG. 62, FIG. 64 is a front view of the modular circuit device unit 1030 of FIG. 63, and FIG. 65 is a right side view of the base unit 1040 of FIG. 63. As shown therein, the resilient tabs 72 on the back of the front face 42 are flipped, relative to those in the previous embodiment, such that as the base unit 1040 is pushed into the junction box 1012, the angled ends are deflected outward by the top and bottom walls of the box 1012 until the hooked portions snap into the slots 74. Furthermore, because the resilient tabs 72 must be pushed outward to release them in order for the box to be removed from the wall 910, the quick-release slots 76 may be located somewhat differently relative to the tabs 72 than those in the embodiment of FIG. 59.

Figure 66:
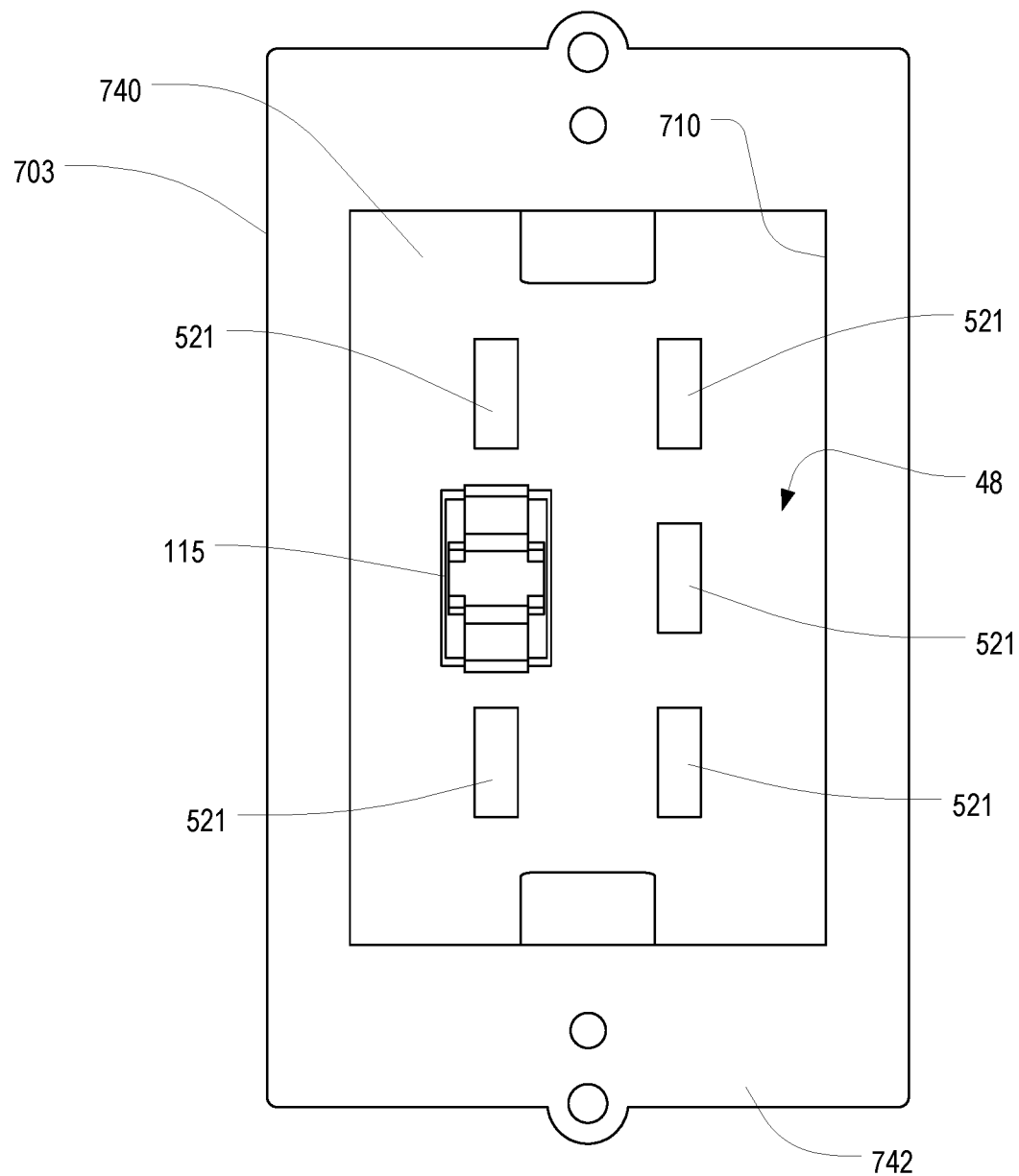
FIG. 66 is an front view of a junction box assembly having a two-part junction box enclosure arranged to encase a base unit for interchangeable circuit device units, all in accordance with one or more preferred embodiments of the present invention.
Figure 67:
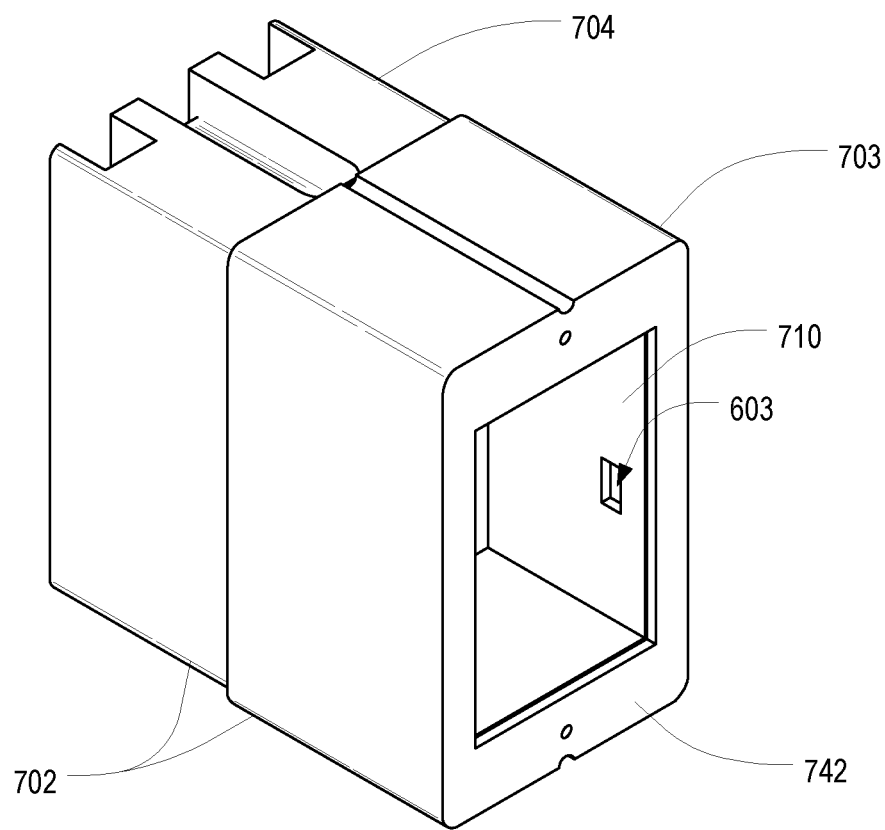
FIG. 67 is an orthogonal view of the junction box assembly of FIG. 66.
Figure 68:
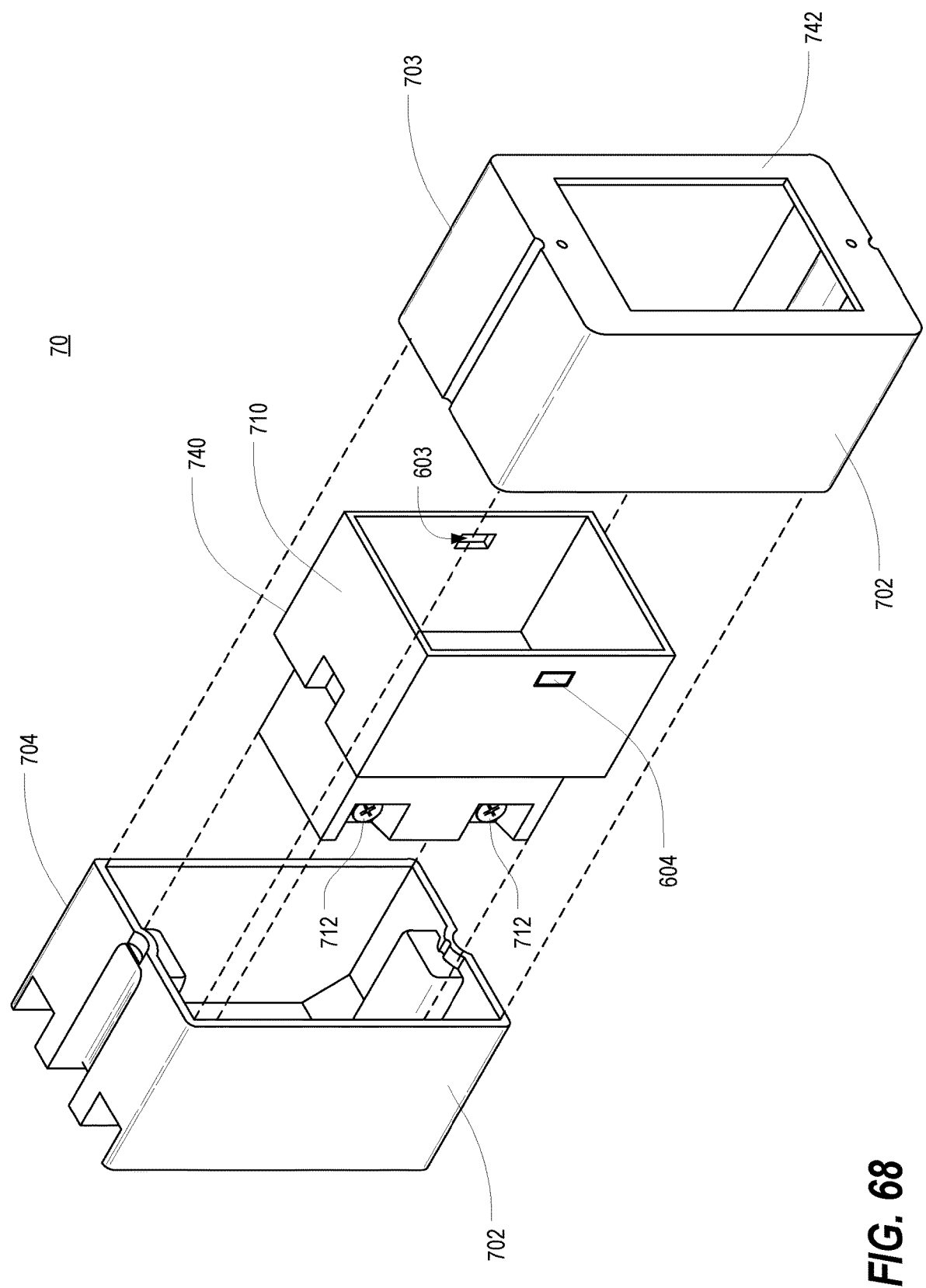
FIG. 68 is an exploded orthogonal view of the junction box assembly of FIG. 66.

Alternatively, in some embodiments, a base unit may be integrated into the junction box itself, thereby permitting an electrician or other user to install a junction box with a base unit already in place. In this regard, FIGS. 66, 67, and 68 are an orthogonal view, a front view, and an exploded orthogonal view, respectively, of a junction box assembly 70 having a two-part junction box enclosure 702 arranged to encase a base unit 740 for interchangeable circuit device units 201, all in accordance with one or more preferred embodiments of the present invention. The junction box enclosure 70 includes a front housing 703 and a rear cover 704 for enclosing the external wiring connections.

The base unit 740 is somewhat similar in construction to the base unit 40 previously described and illustrated and includes, among other features, a liner 710, a rectangular slot or other opening 603 in the side of the liner 710, a mechanical latching mechanism 115, and a plurality of exterior electrical connection points 712. The junction box liner 710 includes a primary housing, which defines a large main cavity for receiving the device module 201, and a smaller rear portion that houses an electrical interconnect assembly (not shown) and a portion of the mechanical latching mechanism 115. In at least the illustrated embodiment, however, the base unit 740 does not include a front face. Instead, a front face 742 is integrated into the front housing 703, wherein the front face 742 defines a central opening that matches large main cavity of the liner 710. Further, in some alternative embodiments, the base unit 740 is manufactured integrally with the front housing 703 of the junction box 702 or is pre-attached to the front housing 703.

The rear portion of the junction box liner 710 may or may not be backed by a base plate 116. The mechanical latch mechanism 115 may be mounted to the backing plate 116 if included, extends through (and may be supported by) the rear portion of the liner 710, and protrudes through an opening into the interior space of the main cavity of the box liner 710. The electrical connection points, including the screw/plate electrical connections 712, are adapted to connect to the building wiring (not shown). The electrical interconnect assembly in the rear portion of the junction box liner 710 includes female contacts 521 that are arranged to receive the male contacts 221 of a device module 201 through openings in the back of the main cavity of the junction box liner 710.

The exterior of the junction box 702 preferably includes pre-mounted nails or other mounting features (not shown) to facilitate easy installation of the box 702 to a wall stud or the like. In at least some embodiments, this features are disposed on the front housing 703. Wiring is routed into the junction box and connected to the screw/plate electrical connections 712. Once the wiring is electrically connected to the screw/plate electrical connections 712, the rear cover 704 is snapped in place to the back side of the front housing 703, thereby covering and enclosing the electrical connections. A recessed ledge (not shown) may be provided around the interior periphery of the rear of the front housing 703 for this purpose. A device module 201 may then be installed in the base unit 740 as described previously, including use of the latch mechanism 115, camming mechanism 102 and slot 603, and the like. Subsequently, if desired, the device module may then be removed and replaced with a different unit. The junction box assembly 70 of FIGS. 66, 67, and 68 thus provides similar functionality to that described hereinabove, but once installed does not require any further wiring. By comparison, the circuit device assembly 20 of FIG. 1 is typically wired conventionally to a conventional circuit device, at least initially, before the circuit device is removed and a base unit 40 installed.

FIG. 68 also illustrates an optional further feature of the junction box liner 710, wherein one or both side walls may be constructed such that the slot 603 is produced by breaking off, or knocking out, a small panel 604. As with conventional knock-out panels, the small panel 604 may be left in place if not needed, but may be easily removed if the slot 603 is desired. In the example shown in FIG. 68, an example of such a small panel 604 is shown in place in the left side wall of the junction box liner 710, while the panel has been removed, thereby opening the slot 603, from the right side wall. It will be appreciated that such panels 604 may be utilized in any of the junction box liners described and/or illustrated herein.

It will be appreciated that in various embodiments, the present invention is adapted for use with a wide variety of electrical circuit devices, including various charging ports, timers, dimmers, ambient lighting controls, photo sensors, infrared sensors, motion detectors, Wi-Fi enabled devices, toggle switches, rocker switches, push button switches, and the like. In fact, part of its value arises from its ability to accommodate the replacement of existing receptacles and switches with circuit device types that are not even in existence at the time of initial installation. Alternatively, the present invention allows a circuit device to be replaced with a similar circuit device of exactly the same type, but of a different color or style. All of this is possible without rewiring the circuit device but instead simply unplugging or otherwise removing the existing device module and inserting a different device module.

In various optional features, junction box liners can have additional circuitry added to accommodate newer technology such as computer network cables, environmental control circuits, closed circuit television, or the like; special 12 VDC models can be designed for use in outdoor and marine environments such as campers, RV's, boats and locations requiring low voltage supply such as laboratories, office lighting and outdoor low voltage lighting; other variants of complete wall box liner chassis can be designed for multi-box applications or outdoor lighting receptacles or CCTV camera or security circuits; blank outlet and switch modules can be designed to temporarily or permanently fill in an empty wall liner; high voltage scenarios can also be designed for commercial or industrial applications requiring more safety or power than normal home or office applications; anti-spark outlets and switches may be developed for areas where highly flammable materials are handled or stored; waterproof outlets and switch modules may be developed for high humidity/corrosive applications, environments such as marine (salt water), laboratory exhaust hoods and work benches or medical areas such as operating, patient or emergency rooms; and outlets and switches may be designed for use in environments where extremely high magnetic fields exist, such as MRI rooms, and where metallic instruments are not allowed, because the modules may be replaced without metal tools.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A modular wall-mounted electrical circuit device assembly, comprising:
   (a) an electrical junction box adapted to be mounted on or in a wall with exposed ends of building wiring disposed therein, wherein the junction box includes a top wall, a bottom wall, a right wall, a left wall, a rear wall, and an open front;
   (b) a modular circuit device installed in the junction box, through the open front thereof, wherein the modular circuit device includes:
      (i) a base unit having a junction box liner that defines a main cavity having another open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points, and
      (ii) an interchangeable device module having a housing, a forward-facing circuit device disposed at a front of the housing, a plurality of rearward-facing electrical contacts disposed at a rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together; and
   (c) a cover plate mounted to a front of the modular circuit device such that the modular circuit device and the electrical junction box are covered thereby but with the forward-facing circuit device extending therethrough to permit a user to operate said forward-facing circuit device;
   (d) wherein the electrical contacts of the interchangeable device module and the electrical contacts of the base unit each arranged in a respective pattern such that the interchangeable device module may only be operatively installed in the base unit if the pattern of the electrical contacts of the interchangeable device module matches the pattern of electrical contacts of the base unit; and
   (e) wherein the main cavity of the junction box liner is defined by a top wall, a bottom wall, a right wall, a left wall, a rear wall, and the open front thereof, and wherein the first enclosed electrical interconnect assembly is enclosed behind the rear wall.

2. The modular wall-mounted electrical circuit device assembly of claim 1, wherein the interchangeable device module is a first interchangeable device module, wherein the modular circuit device is a first circuit device, and wherein the first interchangeable device module may be unplugged from the base unit and replaced by a second interchangeable device module having a second circuit device so long as the pattern of rearward-facing electrical contacts on the second interchangeable device module is the same as the pattern of rearward-facing electrical contacts on the first interchangeable device module.

3. The modular wall-mounted electrical circuit device assembly of claim 2, wherein one pattern is distinguished from another pattern by an orientation of one or more of the electrical contacts.

4. The modular wall-mounted electrical circuit device assembly of claim 1, wherein the plurality of electrical contacts in the rear of the main cavity of the base unit are female contacts, and wherein the plurality of rearward-facing electrical contacts of the interchangeable device module are male contacts.

5. The modular wall-mounted electrical circuit device assembly of claim 1, wherein the exterior electrical connection points are in a form of electrically-conductive screws and corresponding plates, and wherein exposed ends of the building wiring are hooked around the electrically-conductive screws and clamped against the plates.

6. The modular wall-mounted electrical circuit device assembly of claim 1, wherein the junction box includes a top screw receptacle and a bottom screw receptacle, and wherein the junction box liner is attached to the junction box via screws threaded into the top and bottom screw receptacles.

7. The modular wall-mounted electrical circuit device assembly of claim 1, wherein the junction box is a new construction-style wall box that is adapted to be attached to a wall stud before wall board is attached to the wall stud.

8. The modular wall-mounted electrical circuit device assembly of claim 1, wherein the junction box is a remodel-style wall box that is adapted to be attached to a section of wall board after the wall board is attached to a wall stud.

9. The modular wall-mounted electrical circuit device assembly of claim 1, wherein the junction box liner further includes a latching mechanism that releasably couples to the interchangeable device module, thereby releasably retaining the interchangeable device module within the main cavity of the junction box liner with the electrical contacts of the interchangeable device module plugged to the electrical contacts of the base unit.

10. The modular wall-mounted electrical circuit device assembly of claim 9, wherein the latching mechanism automatically couples to the interchangeable device module when the interchangeable device module is inserted into the open front of the main cavity of the junction box liner.

11. A modular wall-mounted electrical circuit device assembly, comprising:
   (a) an electrical junction box adapted to be mounted on or in a wall with exposed ends of building wiring disposed therein, wherein the junction box includes a top wall, a bottom wall, a right wall, a left wall, a rear wall, and an open front;
   (b) a modular circuit device installed in the junction box, through the open front thereof, wherein the modular circuit device includes:
      (i) a base unit having a junction box liner that defines a main cavity having another open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points, and
      (ii) an interchangeable device module having a housing, a forward-facing circuit device disposed at a front of the housing, a plurality of rearward-facing electrical contacts disposed at a rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together; and
   (c) a cover plate mounted to a front of the modular circuit device such that the modular circuit device and the electrical junction box are covered thereby but with the forward-facing circuit device extending therethrough to permit a user to operate said forward-facing circuit device;
   (d) wherein the electrical contacts of the interchangeable device module and the electrical contacts of the base unit each arranged in a respective pattern such that the interchangeable device module may only be operatively installed in the base unit if the pattern of the electrical contacts of the interchangeable device module matches the pattern of electrical contacts of the base unit; and
   (e) wherein the exterior electrical connection points are in a form of spring-biased backwire or back-stab electrical connection points accessible via small openings, and wherein the exposed ends of the building wiring are inserted into the small openings and held in place by the spring-bias of said electrical connection points.

12. A modular wall-mounted electrical circuit device assembly, comprising:
   (a) an electrical junction box adapted to be mounted on or in a wall with exposed ends of building wiring disposed therein, wherein the junction box includes a top wall, a bottom wall, a right wall, a left wall, a rear wall, and an open front;
   (b) a modular circuit device installed in the junction box, through the open front thereof, wherein the modular circuit device includes:
      (i) a base unit having a junction box liner that defines a main cavity having another open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points, and
      (ii) an interchangeable device module having a housing, a forward-facing circuit device disposed at a front of the housing, a plurality of rearward-facing electrical contacts disposed at a rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together; and
   (c) a cover plate mounted to a front of the modular circuit device such that the modular circuit device and the electrical junction box are covered thereby but with the forward-facing circuit device extending therethrough to permit a user to operate said forward-facing circuit device;
   (d) wherein the electrical contacts of the interchangeable device module and the electrical contacts of the base unit each arranged in a respective pattern such that the interchangeable device module may only be operatively installed in the base unit if the pattern of the electrical contacts of the interchangeable device module matches the pattern of electrical contacts of the base unit;
   (e) wherein the interchangeable device module further includes a locking mechanism that releasably couples to the junction box liner, thereby releasably retaining the interchangeable device module within the main cavity of the junction box liner with the electrical contacts of the interchangeable device module plugged to the electrical contacts of the base unit; and
   (f) wherein the locking mechanism is adapted to be manually coupled to a wall of the junction box liner, while the interchangeable device module is in the junction box liner and the electrical contacts of the interchangeable device module and the electrical contacts of the base unit are plugged together, such that the interchangeable device module cannot be removed from the junction box liner without unlocking the locking mechanism.

13. The modular wall-mounted electrical circuit device assembly of claim 12, wherein the plurality of electrical contacts in the rear of the main cavity of the base unit arranged in a pattern, are female contacts, and wherein the plurality of rearward-facing electrical contacts of the interchangeable device module are male contacts.

14. A modular wall-mounted electrical circuit device assembly, comprising:
- (a) an electrical junction box adapted to be mounted on or in a wall with exposed ends of building wiring disposed therein, wherein the junction box includes a top wall, a bottom wall, a right wall, a left wall, a rear wall, and an open front;
- (b) a modular circuit device installed in the junction box, through the open front thereof, wherein the modular circuit device includes:
  - (i) a base unit having a junction box liner that defines a main cavity having another open front and a closed rear, a plurality of exterior electrical connection points, a plurality of electrical contacts disposed in the rear of the main cavity, and an enclosed first electrical interconnect assembly that electrically connects the plurality of electrical contacts to the plurality of exterior electrical connection points, wherein the exposed ends of the building wiring are electrically connected to the exterior electrical connection points, and
  - (ii) an interchangeable device module having a housing, a forward-facing circuit device disposed at a front of the housing, a plurality of rearward-facing electrical contacts disposed at a rear of the housing, and a second electrical interconnect assembly enclosed within the housing, wherein the interchangeable device module is removably installed in the main cavity of the base unit, via the open front thereof, such that the electrical contacts of the interchangeable device module and the electrical contacts of the base unit are plugged together; and
- (c) a cover plate mounted to a front of the modular circuit device such that the modular circuit device and the electrical junction box are covered thereby but with the forward-facing circuit device extending therethrough to permit a user to operate said forward-facing circuit device;
- (d) wherein the electrical contacts of the interchangeable device module and the electrical contacts of the base unit each arranged in a respective pattern such that the interchangeable device module may only be operatively installed in the base unit if the pattern of the electrical contacts of the interchangeable device module matches the pattern of electrical contacts of the base unit; and
- (e) wherein the first electrical interconnect assembly includes a circuit interrupter adapted to disable or de-energize the electrical contacts of the base unit when the electrical contacts of the interchangeable device module and the electrical contacts of the base unit are not plugged together.

15. The modular wall-mounted electrical circuit device assembly of claim 14, wherein the circuit interrupter includes a normally open switch that is closed when the interchangeable device module is removably installed in the main cavity of the base unit.

\* \* \* \* \*